(12) United States Patent
Fujino

(10) Patent No.: US 7,424,713 B2
(45) Date of Patent: Sep. 9, 2008

(54) METHOD FOR ALLOCATING PROGRAMS

(75) Inventor: Shuji Fujino, Ebina (JP)

(73) Assignee: Hitachi, Ltd., Tokyo (JP)

( * ) Notice: Subject to any disclaimer, the term of this patent is extended or adjusted under 35 U.S.C. 154(b) by 747 days.

(21) Appl. No.: 10/769,073

(22) Filed: Jan. 30, 2004

(65) Prior Publication Data

US 2004/0194061 A1   Sep. 30, 2004

(30) Foreign Application Priority Data

Mar. 31, 2003   (JP) ............................. 2003-095775

(51) Int. Cl.
*G06F 9/46* (2006.01)
*G06F 15/16* (2006.01)
*G06F 15/173* (2006.01)
*G06F 9/455* (2006.01)

(52) U.S. Cl. ........................... 718/104; 718/1; 718/105; 709/201; 709/223; 709/226

(58) Field of Classification Search ...................... 718/1, 718/100–108; 709/201–203, 223–226; 710/240
See application file for complete search history.

(56) References Cited

U.S. PATENT DOCUMENTS

| | | | |
|---|---|---|---|
| 6,298,290 B1 | 10/2001 | Abe et al. | |
| 6,308,238 B1 * | 10/2001 | Smith et al. | 710/310 |
| 6,463,454 B1 * | 10/2002 | Lumelsky et al. | 718/105 |
| 6,516,350 B1 * | 2/2003 | Lumelsky et al. | 709/226 |
| 6,523,065 B1 * | 2/2003 | Combs et al. | 709/226 |
| 6,704,489 B1 | 3/2004 | Kurauchi et al. | |
| 6,766,348 B1 | 7/2004 | Combs et al. | |
| 6,901,446 B2 * | 5/2005 | Chellis et al. | 709/226 |
| 7,000,050 B2 * | 2/2006 | Matsumoto et al. | 710/240 |

(Continued)

FOREIGN PATENT DOCUMENTS

JP   08-328880 A   12/1996

(Continued)

OTHER PUBLICATIONS

Chase et al., "Managing Energy and Server Resources in Hosting Centers", ACM, 2001, pp. 103-116.*

(Continued)

*Primary Examiner*—Meng-Ai An
*Assistant Examiner*—Jennifer N To
(74) *Attorney, Agent, or Firm*—Townsend and Townsend and Crew LLP

(57) ABSTRACT

A method of allocating programs to resources is provided. The method includes generating composition management information for a plurality of resources based on management information relating to performance and capacity of each of the resources. The composition management information includes identification information for the resources used by a plurality of programs. The method also includes searching for and locating the composition management information of a resource identified by the identification information for each of the programs, based on the composition management information of the resources. The method further includes generating program information which associates composition management information of the programs and the located resource together. Furthermore, the method includes outputting information indicating that a resource abnormality has occurred with one of the programs, where the composition management information of the resource associated with the program corresponds to one or more rules for detecting a resource abnormality in the program.

20 Claims, 49 Drawing Sheets

U.S. PATENT DOCUMENTS

| | | | |
|---|---|---|---|
| 7,069,295 B2* | 6/2006 | Sutherland et al. | 709/203 |
| 7,096,368 B2* | 8/2006 | Kouznetsov et al. | 713/189 |
| 7,133,907 B2* | 11/2006 | Carlson et al. | 709/220 |
| 7,181,743 B2* | 2/2007 | Werme et al. | 718/104 |
| 7,249,179 B1 | 7/2007 | Romero et al. | |
| 2002/0016812 A1* | 2/2002 | Uchishiba et al. | 709/104 |
| 2002/0049841 A1* | 4/2002 | Johnson et al. | 709/225 |
| 2002/0114341 A1* | 8/2002 | Sutherland et al. | 370/428 |
| 2002/0152305 A1* | 10/2002 | Jackson et al. | 709/224 |
| 2004/0064558 A1* | 4/2004 | Miyake | 709/226 |
| 2004/0111725 A1* | 6/2004 | Srinivasan et al. | 718/105 |
| 2005/0010608 A1 | 1/2005 | Horikawa | |
| 2005/0055322 A1* | 3/2005 | Masters et al. | 707/1 |
| 2005/0131982 A1 | 6/2005 | Yamasaki et al. | |
| 2005/0193115 A1* | 9/2005 | Chellis et al. | 709/226 |
| 2006/0190250 A1* | 8/2006 | Saindon et al. | 704/235 |

FOREIGN PATENT DOCUMENTS

| | | |
|---|---|---|
| JP | 2001-167071 A | 6/2001 |
| JP | 2002-207712 A | 7/2002 |
| JP | 2003-067351 A | 3/2003 |

OTHER PUBLICATIONS

Japan Patent Office (JPO) office action dated Jul. 31, 2007 for JPO patent application 2003-095775.

Japan Patent Office (JPO) office action for JPO patent application JP2003-095775 (Dec. 11, 2007).

* cited by examiner

FIG.5

| | |
|---|---|
| MANAGEMENT INFORMATION OF BUSINESS AP | ~210 |
| AP WORKING STATUS | ~211 |
| AP WORKING CONDITIONS | ~212 |
| AP WORKING HISTORY | ~213 |

FIG.6

| | |
|---|---|
| AP WORKING STATUS | ~211 |
| BUSINESS AP NAME | ~220 |
| BUSINESS AP EXECUTION DOMAIN NAME | ~221 |
| BUSINESS AP TYPE (BATCH, WEB AP, WORK FLOW) | ~222 |
| BUSINESS AP EXECUTION SERVER NAME | ~223 |
| BUSINESS AP EXECUTION USER NAME | ~224 |
| BUSINESS AP TIME SPECIFICATION INDICATOR | ~225 |
| BUSINESS AP START SCHEDULED TIME | ~226 |
| BUSINESS AP STOP SCHEDULED TIME | ~227 |
| BUSINESS AP PRIORITY | ~228 |
| BUSINESS AP STATE | ~229 |

FIG.7

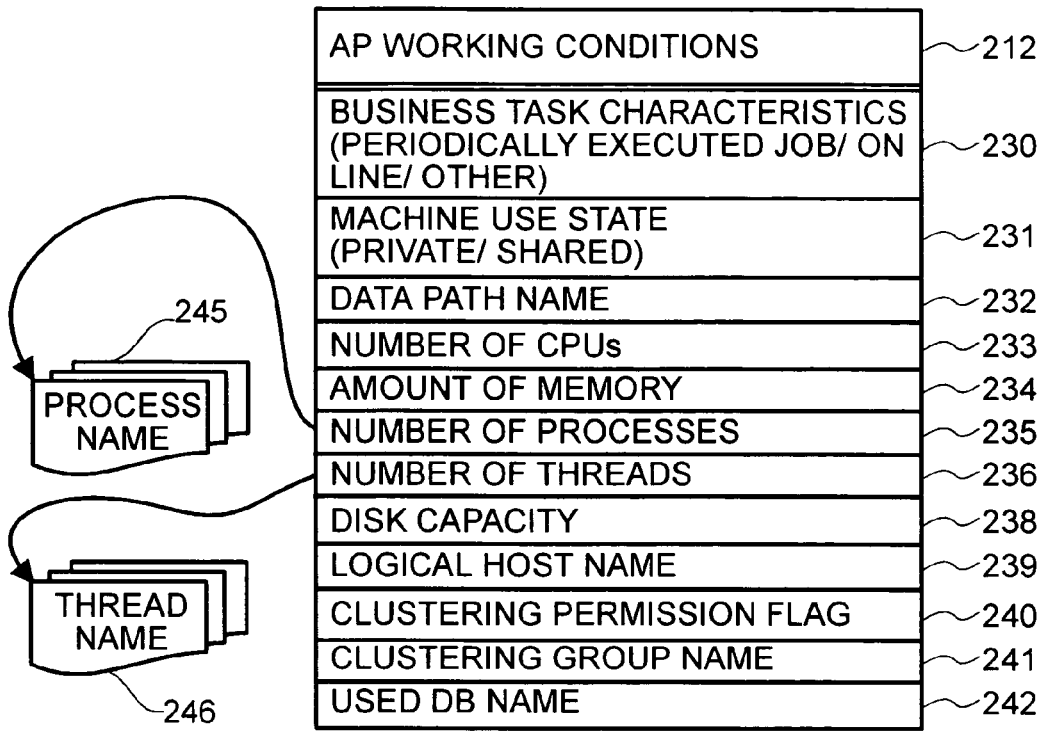

| | |
|---|---|
| AP WORKING CONDITIONS | 212 |
| BUSINESS TASK CHARACTERISTICS (PERIODICALLY EXECUTED JOB/ ON LINE/ OTHER) | 230 |
| MACHINE USE STATE (PRIVATE/ SHARED) | 231 |
| DATA PATH NAME | 232 |
| NUMBER OF CPUs | 233 |
| AMOUNT OF MEMORY | 234 |
| NUMBER OF PROCESSES | 235 |
| NUMBER OF THREADS | 236 |
| DISK CAPACITY | 238 |
| LOGICAL HOST NAME | 239 |
| CLUSTERING PERMISSION FLAG | 240 |
| CLUSTERING GROUP NAME | 241 |
| USED DB NAME | 242 |

PROCESS NAME 245

THREAD NAME 246

FIG.8

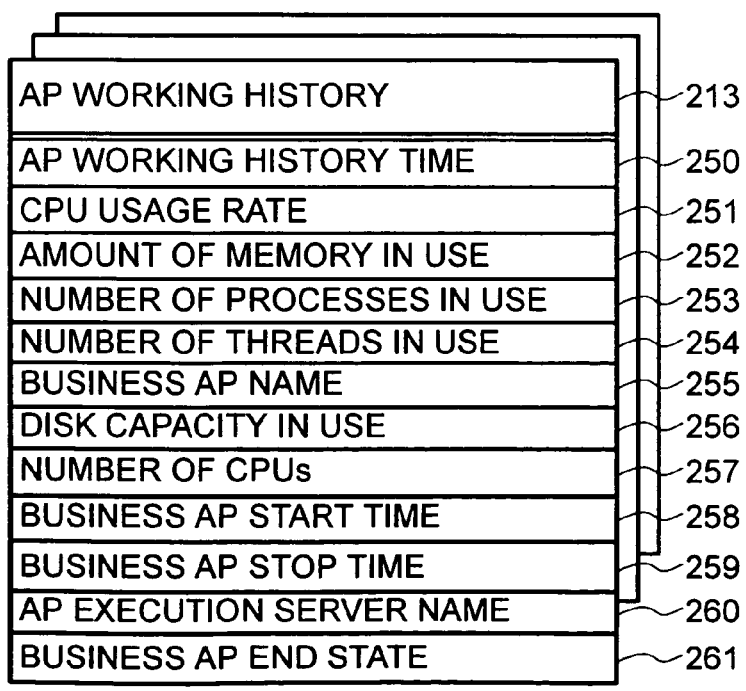

| | |
|---|---|
| AP WORKING HISTORY | 213 |
| AP WORKING HISTORY TIME | 250 |
| CPU USAGE RATE | 251 |
| AMOUNT OF MEMORY IN USE | 252 |
| NUMBER OF PROCESSES IN USE | 253 |
| NUMBER OF THREADS IN USE | 254 |
| BUSINESS AP NAME | 255 |
| DISK CAPACITY IN USE | 256 |
| NUMBER OF CPUs | 257 |
| BUSINESS AP START TIME | 258 |
| BUSINESS AP STOP TIME | 259 |
| AP EXECUTION SERVER NAME | 260 |
| BUSINESS AP END STATE | 261 |

FIG.22

ASSOCIATED BUSINESS AP INFORMATION (EXAMPLE)
                                                   2200

| BUSINESS AP NAME | | BUSINESS AP 1 | BUSINESS AP 2 | BUSINESS AP 3 |
|---|---|---|---|---|
| BUSINESS AP STATE | CPU USAGE RATE 251 | 30% | 50% | 60% |
| | AMOUNT OF MEMORY IN USE 252 | 2 GBYTE | 2 GBYTE | 2 GBYTE |
| | NUMBER OF PROCESSES IN USE 253 | 300 | 500 | 100 |
| | NUMBER OF THREADS IN USE 254 | 100 | 200 | 300 |
| | DISK CAPACITY IN USE 256 | 480 GBYTE | 250 GBYTE | 380 GBYTE |
| OS STATE | CPU USAGE RATE 366 | 50% | 60% | 99% *1 |
| | REMAINING AMOUNT OF MEMORY 354 | 5 GBYTE | 5 GBYTE | 5 GBYTE |
| | NUMBER OF REMAINING PROCESSES 357 | 1000 | 1000 | 1000 |
| | NUMBER OF REMAINING THREADS 360 | 10000 | 10000 | 10000 |
| | REMAINING DISK CAPACITY 365 | 100 GBYTE | 500 GBYTE | 500 GBYTE |
| DB STATE | DB STATE 391 | NORMAL | PARTIALLY ABNORMAL *2 | NORMAL |
| | DATA CAPACITY 393 | 500 GBYTE | 300 GBYTE | 400 GBYTE |
| STORAGE STATE | STORAGE LOGICAL UNIT CAPACITY 621 | 1000 GBYTE | 2000 GBYTE | 1500 GBYTE |
| | STORAGE LOGICAL UNIT CAPACITY IN USE 622 | 999 GBYTE | 1000 GBYTE | 500 GBYTE |
| | STORAGE LOGICAL UNIT REMAINING CAPACITY 623 | 1 GBYTE *3 | 1000 GBYTE | 1000 GBYTE |

*1 SERVER
*2 DB
*3 STORAGE

FIG.23

PROBLEMS IN FIG.22 AND COUNTERMEASURES

2300

| BUSINESS AP NAME | PROBLEM | COUNTERMEASURE |
|---|---|---|
| BUSINESS AP 1 | REMAINING CAPACITY OF STORAGE LOGICAL UNIT USED BY BUSINESS AP 1 WILL SOON RUN OUT. | ADD TO CAPACITY OF STORAGE LOGICAL UNIT. |
| BUSINESS AP 2 | PARTIAL ABNORMALITY IN DB USED BY BUSINESS AP 2 | REMOVE PARTIAL ABNORMALITY IN DB. IF IT CANNOT BE REMOVED, CLUSTER (SWITCH) BUSINESS AP 2 TO ANOTHER SERVER. |
| BUSINESS AP 3 | THE CPU USAGE RATE OF THE SERVER ON WHICH BUSINESS AP 3 IS RUNNING IS REACHING ITS LIMIT. | ADD A CPU TO THE SERVER ON WHICH BUSINESS AP 3 IS RUNNING. ALTERNATIVELY, CLUSTER (SWITCH) OTHER BUSINESS APS HAVING LOWER PRIORITY THAN BUSINESS AP 3 TO ANOTHER SERVER. ALTERNATIVELY, CLUSTER (SWITCH) THE BUSINESS AP 3 TO ANOTHER SERVER HAVING ABUNDANT RESOURCES. |

FIG.24

POLICY MANAGEMENT RULES FOR AUTOMATIC
IMPLEMENTATION OF THE COUNTERMEASURES IN FIG.23   2400

| NO. | DELIVER TO | POLICY MANAGEMENT RULE |
|---|---|---|
| 1 | COMPOSITION MANAGEMENT OF PRIVATE DOMAIN | THE COMPOSITION MANAGEMENT OF THE PRIVATE DOMAIN MUST NOT JUDGE A BUSINESS SERVER HAVING A MACHINE USE STATE SET TO PRIVATE USE TO BE A SURPLUS SERVER (ESTABLISH ACL). |
| 2 | SPACE SCHEDULER OF PRIVATE DOMAIN | THE SPACE SCHEDULER SHALL JUDGE A BUSINESS SERVER ON WHICH NO BUSINESS AP HAS OPERATED FOR ONE HOUR OR MORE TO BE A SURPLUS SERVER. |
| 3 | PERFORMANCE AND CAPACITY MANAGEMENT | ANY SERVER WHICH HAS A RESOURCE USAGE RATE EXCEEDING 95% SHALL BE REPORTED AS A RESOURCE ABNORMALITY |
| 4 | SPACE SCHEDULER OF PUBLIC DOMAIN | IN THE EVENT OF A PROVISION REQUEST FROM ANY PRIVATE DOMAIN, THE SPACE SCHEDULER OF THE PUBLIC DOMAIN SHALL PRIORITIZE AND LOAN OUT RESOURCES SUPPLIED BY THAT PRIVATE DOMAIN. |
| 5 | COMPOSITION MANAGEMENT AND PERFORMANCE AND CAPACITY MANAGEMENT OF PRIVATE DOMAIN | THE SAFETY COEFFICIENT FOR THE REMAINING AMOUNT OF MEMORY IN THE OS INFORMATION OF A BUSINESS SERVER RUNNING A BUSINESS AP HAVING TOP LEVEL PRIORITY SHALL BE SET TO 1.1. |
| 6 | PERFORMANCE AND CAPACITY MANAGEMENT | IF THE REMAINING CAPACITY OF A STORAGE LOGICAL UNIT HAVING STORAGE LOGICAL UNIT NAME m HAS FALLEN BELOW 10%, THEN STORAGE CAPACITY CORRESPONDING TO 10% OF THE REMAINING CAPACITY SHALL BE ADDED. |
| 7 | SPACE SCHEDULER OF THE PRIVATE DOMAIN | THE UPPER LIMIT OF THE AMOUNT OF MEMORY IN USE RATE FOR BUSINESS AP NAME n IS 45%, AND THE UPPER LIMIT OF CPU USAGE IS 70%. IF THESE LIMITS ARE EXCEEDED, THEN THIS SHALL BE REPORTED AS A RESOURCE ABNORMALITY. |

LOAD DISTRIBUTION AT START UP OF BUSINESS AP

FIG.27

IMAGE OF SCHEDULE RESERVATION FOR RESOURCES 2700

| BUSINESS AP EXECUTION SERVER NAME | ITEM | | TIME |
|---|---|---|---|
| SERVER 1 | BUSINESS AP | | BUSINESS AP 1 / BUSINESS AP 3 |
| | RESOURCE | AMOUNT OF MEMORY | |
| | | NUMBER OF PROCESSES | |
| | | NUMBER OF THREADS | |
| | | ⋮ | |
| SERVER 2 | BUSINESS AP | | BUSINESS AP 2 / BUSINESS AP 4 |
| | RESOURCE | AMOUNT OF MEMORY | |
| | | NUMBER OF PROCESSES | |
| | | NUMBER OF THREADS | |
| | | ⋮ | |

LOAD DISTRIBUTION AT START UP OF BUSINESS AP (1/4)

LOAD DISTRIBUTION AT START UP OF BUSINESS AP (2/4)

LOAD DISTRIBUTION AT START UP OF BUSINESS AP (4/4)

LOAD DISTRIBUTION DURING OPERATION OF BUSINESS AP (1/3)

LOAD DISTRIBUTION DURING RUNNING OF BUSINESS AP (2/3)

LOAD DISTRIBUTION DURING RUNNING OF BUSINESS AP (3/3)

JUDGEMENT OF SURPLUS SERVERS (1/2)

JUDGEMENT OF SURPLUS SERVERS (2/2)

COMPOSITION MANAGEMENT IN PRIVATE DOMAIN (2/2)

COMPOSITION MANAGEMENT OF PUBLIC DOMAIN

SPACE SCHEDULER OF PUBLIC DOMAIN

PERFORMANCE AND CAPACITY MANAGEMENT

CLUSTER/DATA PATH MANAGEMENT (1/3)

CLUSTER/DATA PATH MANAGEMENT (2/3)

CLUSTER/DATA PATH MANAGEMENT (3/3)

POLICY MANAGEMENT

REPRESENTATION OF RESOURCE USAGE STATUS FOR MACHINE AND BUSINESS AP UNITS

X: ABNORMALITY AROSE IN BUSINESS AP

PERMITTED RANGES FOR RESOURCES, IN MACHINE AND BUSINESS AP UNITS

| NUMBER | ITEM | RESOURCE USAGE RATE | | ABNORMALITY? | UPPER LIMIT FOR STABLE OPERATION (%) |
|---|---|---|---|---|---|
| | | MIN. | MAX. | | |
| 1 | MEMORY | 40 | 60 | YES (60%) | 45→65 (NOTE) |
| 2 | CPU | 30 | 70 | NO | 70 |
| 3 | DATA VOLUME | 70 | 90 | NO | 90 |

(NOTE) CORRECT IN ACCORDANCE WITH FIG.50

POLICY MANAGEMENT

METHOD FOR ALLOCATING PROGRAMS

CROSS-REFERENCES TO RELATED APPLICATIONS

This application relates to and claims priority from Japanese Patent Application No. 2003-095775, filed Mar. 31, 2003, the entire disclosure of which is incorporated herein by reference.

BACKGROUND OF THE INVENTION

The present invention relates to technology for allocating programs whereby programs are allocated to resources which are suited to their operating conditions.

Conventionally, in cases where a business application program for implementing various business processes (also called, a business program and hereinafter, called an "AP") is executed by a plurality of server processing devices, and this business service is provided to a client processing device, then the business AP is executed by allocating the business AP, and the data used by the processes thereof, to resources, such as various server processing devices having different central processing unit (CPU) capabilities and memory capacities, or various storage devices having different storage capacities, or the like.

Furthermore, the server processing devices executing the business AP, and the storage devices storing the data may be changed in accordance with the operational status of the server device executing the business AP, or the storage device, for example, in accordance with prescribed operational definitions, such as cases where the CPU usage rate of a particular server has become high, or cases where the remaining capacity of a storage device has become low, or the like.

BRIEF SUMMARY OF THE INVENTION

Heretofore, monitoring is performed with regard to the performance and capacity of a server executing various business APs, the performance and capacity of the storage device, or a cluster made up of a plurality of servers, and the like, and a business service is provided by reallocating the business AP in accordance with these monitoring results. However, since the various monitoring functions work independently, and moreover, since monitoring is carried out irrespectively of the operations being executed, it is not possible to perform allocation which is suited to various business APs in accordance with these monitoring results.

For example, if the CPU usage rate or the remaining storage capacity of a particular server has reached a prescribed value, then even if this value is a normal state for a particular business AP, there is a possibility that it may be an abnormal state for another business AP. However, since monitoring is performed without regard to the business AP, if the load has increased, then reallocation may be performed unnecessarily for that business AP, or alternatively, necessary reallocation may not be performed for the business AP.

A feature of the present invention is to resolve the aforementioned problems by providing technology which is capable of managing resources in accordance with the working conditions of respective business applications.

According to one aspect of the present invention, in a system for allocating programs whereby programs are allocated to resources that suit the operating conditions thereof, business application information associating composition management information of a business application with the composition management information of a resource is generated, and resources in use are managed in business application units.

In the system for allocating programs, composition management information for storing the operating status, operating conditions and operating history of respective business APs is generated, the management information of the respective business APs is gathered when respective business APs are executed, and the contents of the composition management information of the business APs are held and managed.

Moreover, composition management information for storing states relating to performance and capacity, for each resource, is also generated, and when the respective resources are operated, this management information is gathered, and the contents of the composition management information of the resources are held and managed.

By reading out the identification information of a resource used by a business AP, from the composition management information of the business APs, and searching for and locating the composition management information of the resource identified by this identification information, from amongst the composition management information of each resource, business AP information is generated which associates the composition management information of the business AP in question and the composition management information of the located resource.

Next, policy management rules for each business AP which are used to determine the state of each business AP are referenced, it is determined whether or not the composition management information of the resource in the business AP information corresponds to rules for detecting a resource abnormality in the relevant business AP, and if it is determined that a resource abnormality has occurred with respect to that business AP, then information indicating that a resource abnormality has occurred with that business AP is outputted.

Moreover, according to another aspect of the present invention, when a business AP is started up, or when a resource abnormality has been detected in a particular business AP, as described above, during operation of the business AP, then a resource suiting the operating conditions of that business AP is searched for and located in the composition management information of the respective resources, and clustering is performed by causing the business application to be executed by allocating or moving the business AP to the located resource. In this case, the access path to the data used by that business processing is also controlled simultaneously, such that access to that data is performed via the resource to which the application was allocated or moved.

The access paths to the clustering and data are respectively indicated by using the terms "cluster management program" and "data path management program". The "cluster management program" is a program which runs on a plurality of computers in order to provide stable operation of business APs, and it serves to monitor the state of the business AP and manage the start up and termination of the same. Furthermore, the "data path management program" is a program which manages the communications path between computer and storage, or between computer and network and storage, in order that a business AP running on a server is able to refer to, add, modify or delete business. task data. The data path management program manages the setting up and termination of communications paths, monitors the state of communications paths, and also manages the routing of the communications paths. In order to run a business AP, the "cluster management program" and the "data path management program" are used to control the business AP and the business task data used by the business AP. FIG. 53 shows one example of an illustrative diagram of a "cluster management program" and a "data path management program".

FIG. 53 shows an illustration of operation of a cluster management program and data path management program. A first server 5300 and a second server 5400 are provided. Both servers include business application programs 5302, 5402, data path management programs 5304, 5404, and cluster management programs 5306, 5406. Servers 5300 and 5400 and other servers (not shown) are coupled together to form a cluster. Business application programs 5302, 5402 may have a first routing path 5350 through routing device 5310 to reach business data 5312 stored in data storage location 5314, which may be one of a plurality of data storage locations including data storage location 5414. However, data path management programs 5304, 5404 may modify the data path used by business application programs 5302, 5402 to a second or other alternative routing path 5450 through routing device 5410 to reach business data 5312. The routing paths chosen may also reach data stored in data storage 5414.

Moreover, a private domain is defined herein as a region where the respective resources are actually located, and a public domain is defined as a region where resources are located in a virtual sense, and it is investigated whether or not surplus resources exists, such as resources which have not been operated for a prescribed period of time, by referring to the composition management information of each of the resources located in a plurality of private domains. If a surplus resource does exist, then by supplying the composition management information of that resource from the private domain to the public domain, the resource is managed as if it had been moved virtually to the public domain. When a business AP is started up, or when a resource abnormality is detected, then if a resource matching the operating conditions of that business AP cannot be found, the composition management information of a surplus resource which does match these operating conditions can be loaned out from the public domain to the private domain in question, such that a surplus resource located within one private domain can be used from another private domain.

The terminology "private domain" and "public domain" as used herein shall be described. A "private domain" is a logical unit comprising a plurality of servers and/or storages connected by a network, categorized by the fact that the resources thereof are administered by the same administrator, or the resources are delivered to the same location, or the like. For example, in a computer center in which the resources of a plurality of companies are located, the resources for company A can be managed as a single private domain, and the resource of company B can be managed as a separate private domain. Furthermore, within a single company, the resources for work site C can be managed as a single private domain, and the resource for work site D can be managed as a separate private domain. A "public domain", on the other hand, is a virtual computer system, in which surplus resources are exchanged between private domains in a virtual manner. For example, if there exist an abundance of resources at the head office of company E, then both a public domain and a private domain can be located at this head office, thereby allowing surplus resources to be loaned out to work site C or work site D.

Moreover, policy management rules including rules for detecting resource abnormalities relating to a business AP, and rules for detecting surplus resource, are managed universally, and if these rules are modified, then the modified rules are distributed to each of the private domains, thereby allowing unified policy management.

In this way, according to another aspect of the present invention, since management of each of the resources used for a business AP unit is carried out by associating the business AP information with the resources used by the business AP, then resources can be managed in a manner that suits the business task in question, for instance, by detecting resource abnormalities for each business AP, and it also becomes possible to control execution in a manner that suits the operating conditions of each business task, and to supply surplus resources, as well as performing unified management of the policy management rules used to carry out these steps.

As described above, in the system for allocating programs according to an embodiment of the present invention, since business application information which associates the composition management information of a business application with the composition management information of a resource is generated, and resources in use are managed in units of individual business applications, it is possible to manage resources in concordance with the operating conditions of each of the respective business applications.

BRIEF DESCRIPTION OF THE DRAWINGS

FIG. 5 shows an example of the composition of management information for a business AP;

FIG. 6 shows an example of the composition of AP operating information;

FIG. 7 shows an example of the composition of AP working conditions;

FIG. 8 shows an example of the composition of AP working history;

FIG. 22 shows an example of associated business AP information;

FIG. 23 shows an example of problems relating to the business AP in FIG. 22 and corresponding countermeasures;

FIG. 24 shows an example of policy management rules;

FIG. 27 shows an image of a resource schedule reservation;

DETAILED DESCRIPTION OF THE INVENTION

An exemplary embodiment of a program allocation system for allocating business APs to resources which are suited to the working conditions thereof is described.

Figure 1:
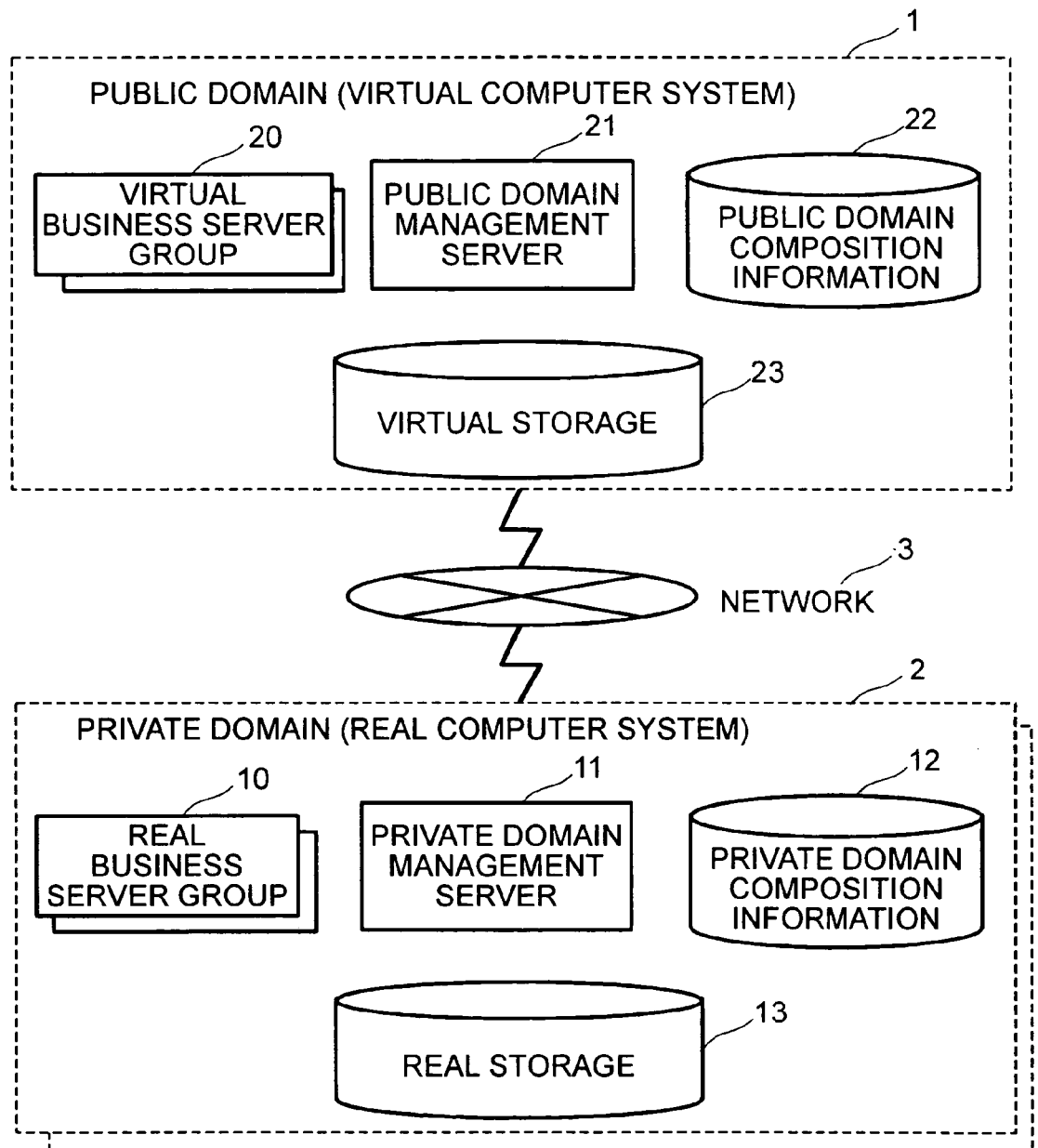
FIG. 1 shows an overview of a program allocation system according to an exemplary embodiment of the invention.

FIG. 1 shows an overview of a program allocation system according to the present embodiment. As shown in FIG. 1, the program allocation system according to the present embodiment is constituted by a plurality of private domains 2 and public domains 1, these domains being connected by a network 3.

In the present embodiment, the domain where the client operates their business is taken as the private domain 2. The private domain 2 comprises a real business server group 10 representing a plurality of servers which execute actual business tasks, a real storage 13 which may have a plurality of storage housings and stores data used in the actual business tasks, a private domain management server 11 for performing management within the private domain, and private domain composition information 12 for storing composition management information for the respective business APs and resources.

The private domain management server 11 manages the real business server group 10 and the real storage 13, and manages the composition information and status information relating to the private domain composition information 12.

The public domain 1 is managed by the public domain management server 21 and is constituted by a virtual business server group 20, a virtual storage 23 and public domain composition information 22. The public domain composition information 22 is composition management information from the private domain composition information 12, which is managed when a real business server group 10 or real storage 13 which have become surplus to the private domain 2 are loaned temporarily or permanently. Management of the public domain composition information 22 is performed with respect to the private domain composition information 12 when the loaned real business server group 10 or real storage 13 is actually returned. In other words, the substance of the virtual business server group 20 corresponds to the real application server group 10, and the substance of the virtual storage 23 corresponds to the real storage 13.

In the event of a shortage of resources in any private domain 2, resources can be loaned from the public domain 1 and the private domain 2 can also execute the public domain 1 by proxy.

Figure 2:
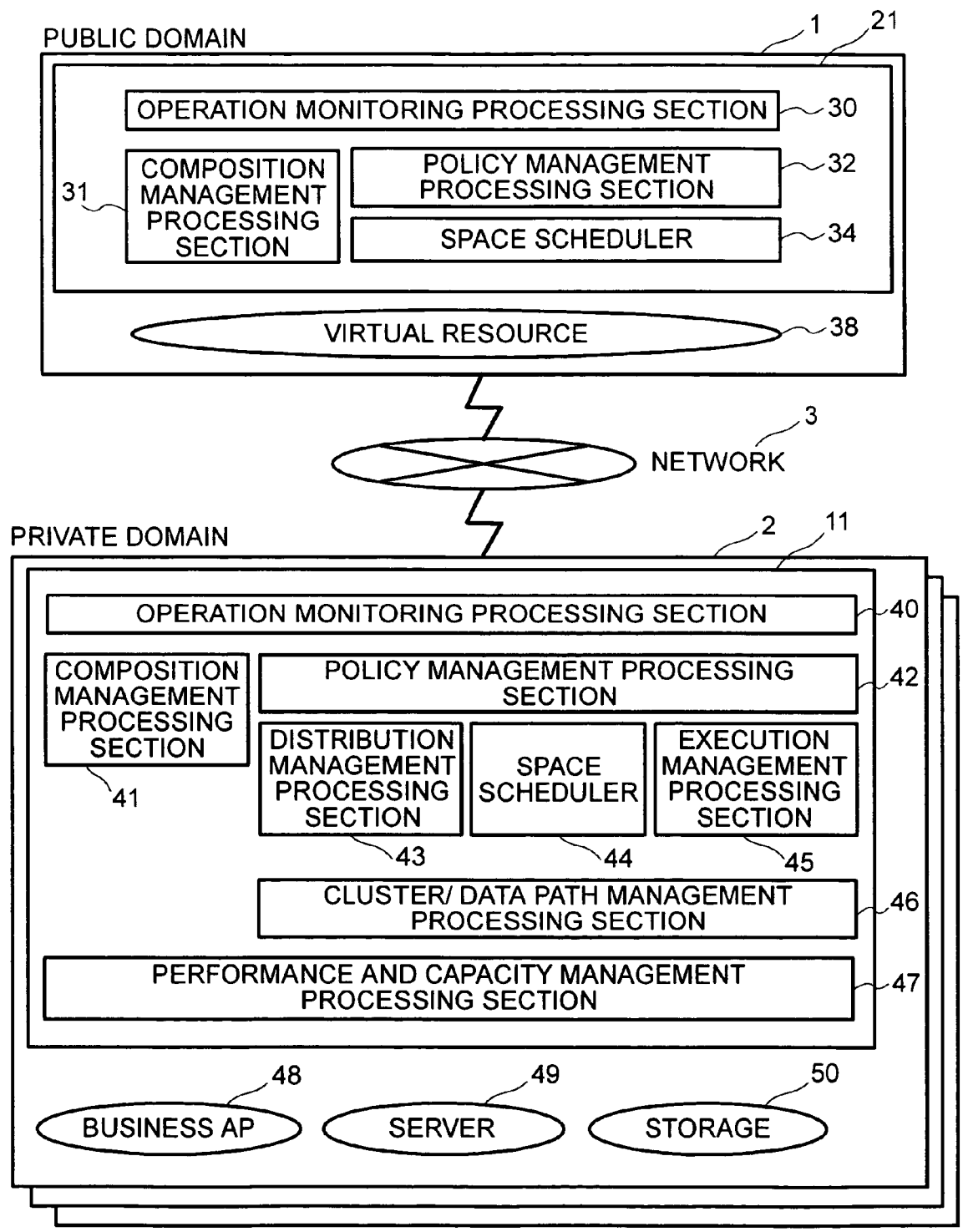
FIG. 2 illustrates the functional layers of a program allocation system according to the exemplary embodiment.

FIG. 2 illustrates the functional layers of a program allocation system according to the present embodiment. As shown in FIG. 2, the public domain management server 21 according to the present embodiment comprises an operation monitoring processing section 30, a composition management processing section 31, a policy management processing section 32 and a space scheduler 34.

The operation monitoring processing section 30 monitors the state of the composition management processing section 31, policy management processing section 32, and space scheduler 34, which are the other functional components in the public domain 1. The composition management processing section 31 receives composition management information for a resource which corresponds to rules for detecting surplus resources, from the composition management processing section 41 in the private domain 2, and it holds and manages this information as composition management information for a virtual resource 38 in the public domain 1.

The policy management processing section 32 manages the policy management rules within the public domain 1. If a resource having composition management information that satisfies the operating conditions of the business AP 48 is not found, then the space scheduler 34 receives a request to provide the resource, transmitted from the space scheduler 44 on the private domain 2 side, and it sends composition management information satisfying the operating conditions of the business AP 48 from amongst the composition management information of the virtual resources it is holding and managing.

A program for causing the public domain management server 21 to function as an operation monitoring processing section 30, a composition management processing section 31, a policy management processing section 32 and a space scheduler 34, is recorded on a storage medium, such as a compact disk read-only memory (CD-ROM), or the like, and stored on a magnetic disk, or the like, whereupon it is loaded to the memory and executed. It is also possible for a storage medium other than a CD-ROM to be used for storing the aforementioned program. Moreover, it is also possible to use the aforementioned program by installing it in the information processing device from the storage medium, and it is also possible to use the aforementioned program by accessing the storage medium via a network.

The private domain management server 11 comprises an operation monitoring processing section 40, a composition management processing section 41, a policy management processing section 42, a distribution management processing section 43, a space scheduler 44, an execution management processing section 45, a cluster/data path management processing section 46, and a performance and capacity management processing section 47.

The operation monitoring processing section 40 monitors the state of the composition management processing section 41—performance and capacity management processing section 47, which are the other functional components in the private domain 2. The composition management processing section 41 holds and manages composition management information for respective resources by referencing the management information gathered by the respective processing sections, and by referencing the composition management information including identification information for the resources used by the respective business APs 48, and locating the composition management information for the resource identified by this identification information, from the composition management information of the respective resources, it generates business AP information which associates the composition management information of the business AP 48 with the composition management information of the located resource, and if the composition management information of the resource in the business AP information corresponds to the rules for detecting a resource abnormality in the corresponding business AP 48, then it outputs information indicating that a resource abnormality has occurred with the business AP 48.

The policy management processing section 42 performs universal management of the policy management rules, including rules for detecting resource abnormalities in the business AP 48 and rules for detecting surplus resources. The distribution management processing section 43 distributes programs, such as a business AP 48, or DB management system, or the like, to any real business server 49, from the private domain management server 11.

If the composition management information of the resource associated with a business AP 48 for which a reservation has been instructed satisfies the operating conditions in the composition management information of the business AP 48, then the space scheduler 44 reserves the aforementioned resource as a resource for executing the business AP 48.

The execution management processing section 45 receives an execution request from the business AP 48, instructs reservation of the resource to be used by the business AP 48, and then continues processing for starting up the business AP 48 using the resource for which reservation has been made in the aforementioned instruction, or, in cases where an abnormality is detected in the resource during execution of the business AP 48, it searches for another resource having composition management information which satisfies the operating conditions in the composition management information of the business AP 48 which has occasioned the aforementioned resource abnormality, and then conducts processing using the resource thus located.

The cluster/data path management processing section 46 manages the composition and state of the cluster management program, and manages the composition and status of the data path between the server 49 held by the data path management program and the storage 50, and instructions for changes to the data path. The performance and capacity management processing section 47 gathers and administers management information indicating states relating to the performance of the respective servers 49 and the capacity of the storage 50, and the like.

A program for causing the private domain management server 11 to function as an operation monitoring processing section 40, a composition management processing section 41, a policy management processing section 42, a distribution management processing section 43, a space scheduler 44, an execution management processing section 45, a cluster/data path management processing section 46, and a performance and capacity management processing section 47, is recorded on a storage medium, such as a CD-ROM, or the like, and stored on a magnetic disk, or the like, whereupon it is loaded to the memory and executed. It is also possible for a storage medium other than a CD-ROM to be used for storing the aforementioned program. Moreover, it is also possible to use the aforementioned program by installing it in the information processing device from the storage medium, and it is also possible to use the aforementioned program by accessing the storage medium via a network.

As shown in FIG. 2, the private domain management server 11 of the private domain 2 comprises an operation monitoring processing section 40, a composition management processing section 41 (for managing private domain composition information 12), a policy management processing section 42, a distribution management processing section 43, a space scheduler 44, an execution management processing section 45, a cluster/data path management processing section 46, and a performance and capacity management processing section 47, and it holds and manages the business AP 48, server 49 and storage 50, which may all exist in a plural fashion.

The public domain management server 21 of the public domain 1 comprises an operation monitoring processing section 30, a composition management processing section 31 (for managing the public domain composition information 22), a policy management processing section 32, and a space scheduler 34, and it holds and manages the surplus resources of the private domain 2 as virtual resources 38.

The performance and capacity management processing section 47 collects the management information for the business AP 48, server 49 and storage 50, stores a history thereof, and returns the collected management information when management information is requested by the composition management processing section 41.

Figure 3:
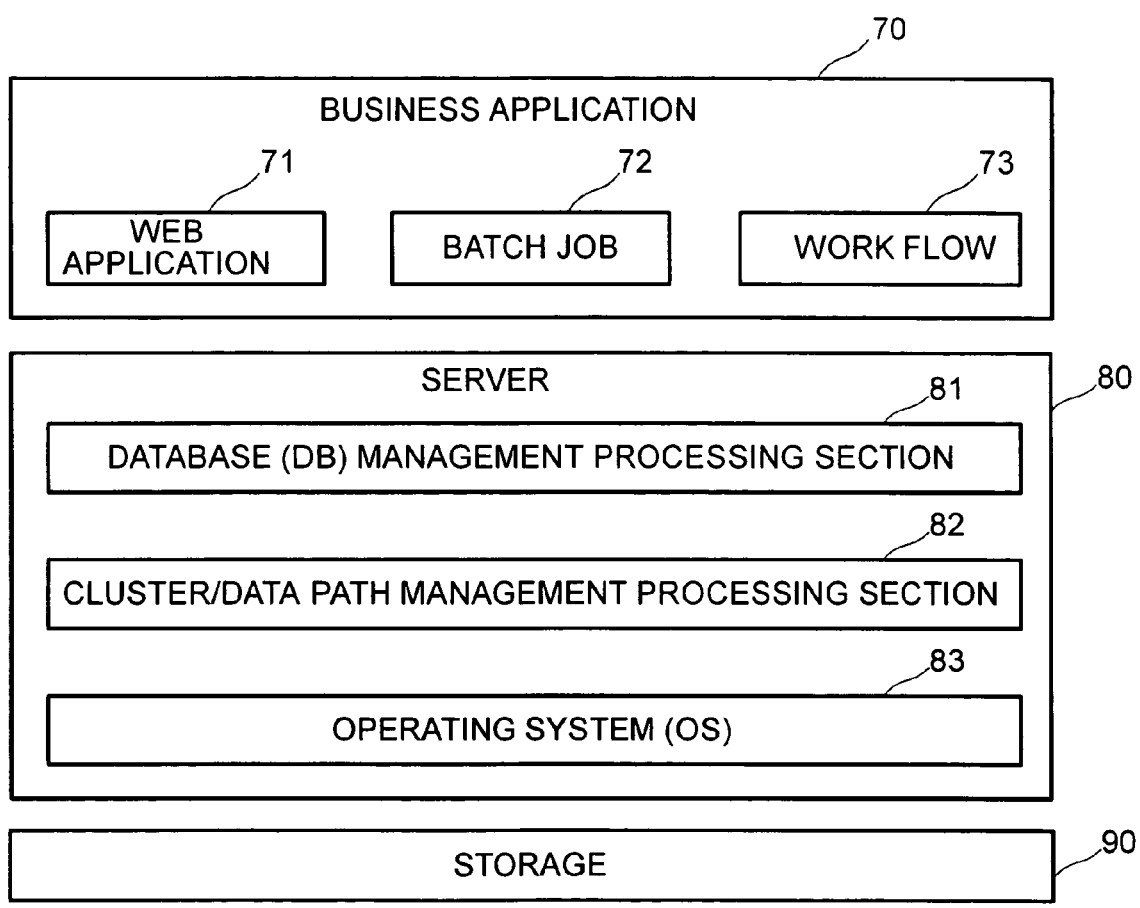
FIG. 3 shows the layer structure of the monitoring objects which are managed and controlled.

FIG. 3 shows the layer structure of the monitoring objects which are managed and controlled in the present embodiment. As shown in FIG. 3, the monitoring objects that are managed and controlled in the present embodiment comprise the respective layers of a business AP 70, a server 80 and a storage 90; the business AP 70 comprises a Web application 71, a batch job 72 and a work flow 73, and the server 80 comprises a DB management processing section 81, a cluster/data path management processing section 82, and an OS 83.

Figure 4:
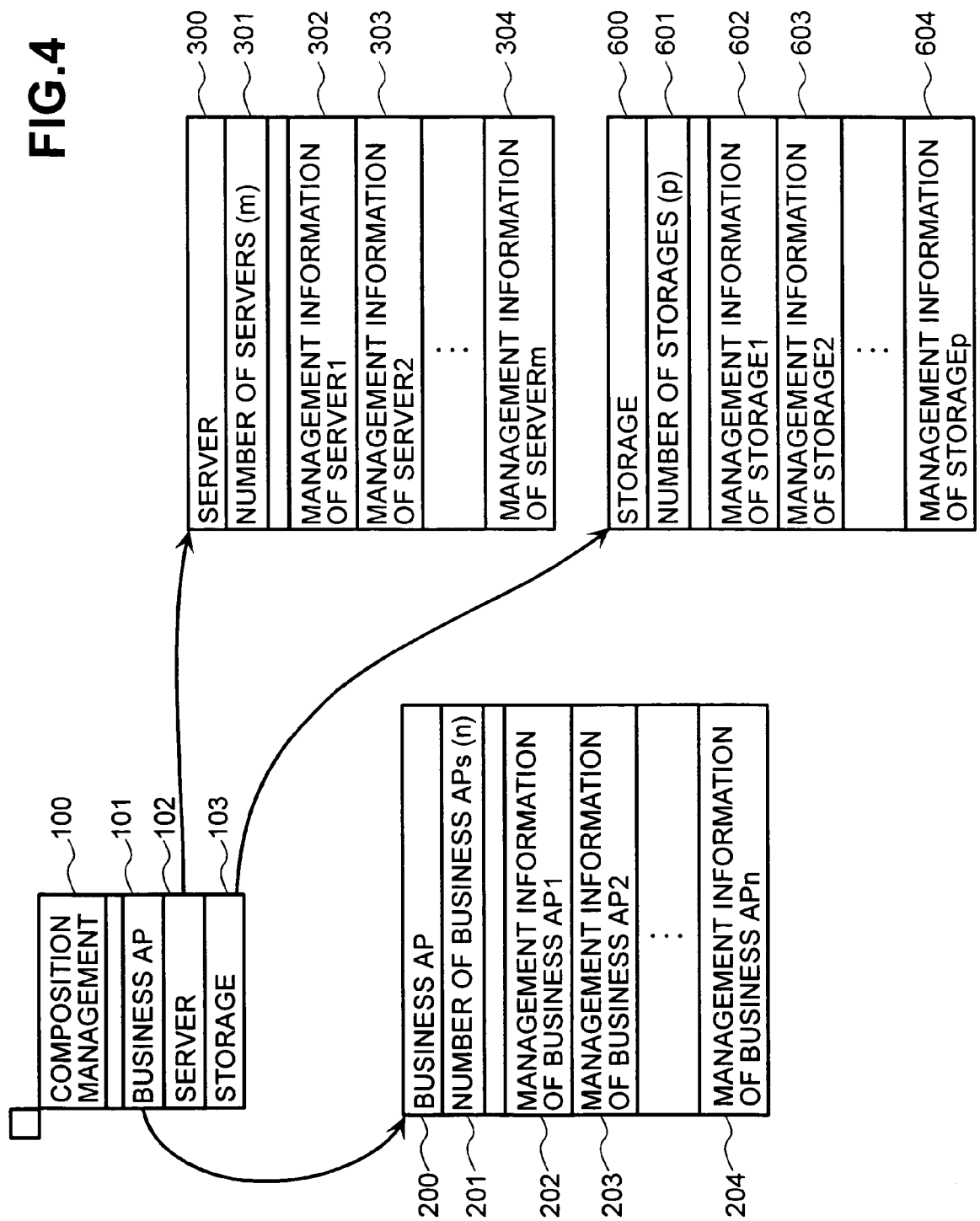
FIG. 4 shows an example of the composition of composition management information.

FIG. 4 shows an example of the composition of composition management information according to the present embodiment. As shown in FIG. 4, the composition management information 100 in the present embodiment respectively includes information for the business AP 101 (200-204), the server 102 (300-304) and the storage 103 (600-604).

FIG. 5 shows an example of the composition of management information for a business AP according to the present embodiment. As shown in FIG. 5, the management information 210 for the business AP comprises information indicating the AP working status 211, the AP working conditions 212, and the AP working history 213.

FIG. 6 shows an example of the composition of AP operating information according to the present embodiment. As shown in FIG. 6, the AP working status information 211 stores the name of the business AP 220, a business AP execution domain name 221, a business AP type 222, such as batch, Web AP, work flow, or the like, a business AP execution server name 223, a business AP execution user name 224, a business AP time specification indicator 225 which indicates whether or not there are time specifications for the business AP, a business AP start scheduled time 226, a business AP stop scheduled time 227, a business AP priority 228, and a business AP state 229.

FIG. 7 shows an example of the composition of AP working conditions according to the present embodiment. As shown in FIG. 7, the AP working conditions 212 store a business task characteristic (periodically executed job/on-line/other) 230, a machine use state (private/shared) 231, a data path name 232, the number of CPUs 233, the amount of memory 234, the number of processes 235, the number of threads 236, the disc capacity 238, the logical host name 239, a clustering permission flag 240, a clustering group name 241, and a used DB name 242. Moreover, it also stores process names 245 corresponding to the number of processes 235, and thread names 246 corresponding to the number of threads.

FIG. 8 shows an example of the composition of an AP working history according to the present embodiment. As shown in FIG. 8, the AP working history 213 stores an AP working history time 250, CPU usage rate 251, amount of memory in use 252, number of processes in use 253, number of threads in use 254, business AP name 255, disk capacity in use 256, number of CPUs 257, business AP start time 258, business AP stop time 259, AP execution server name 260, and business AP end state 261.

Figure 9:
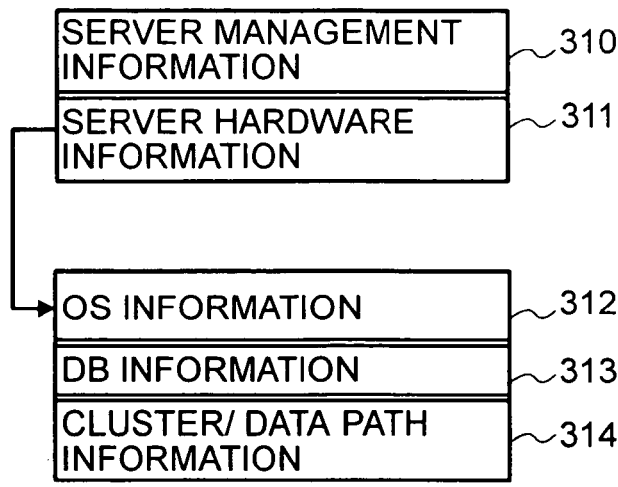
FIG. 9 shows an example of the composition of server management information.

FIG. 9 shows an example of the composition of server management information according to the present embodiment. As shown in FIG. 9, the server management information 310 stores OS information 312, DB information 313, and cluster/data path information 314 as server hardware information 311.

Figure 10:
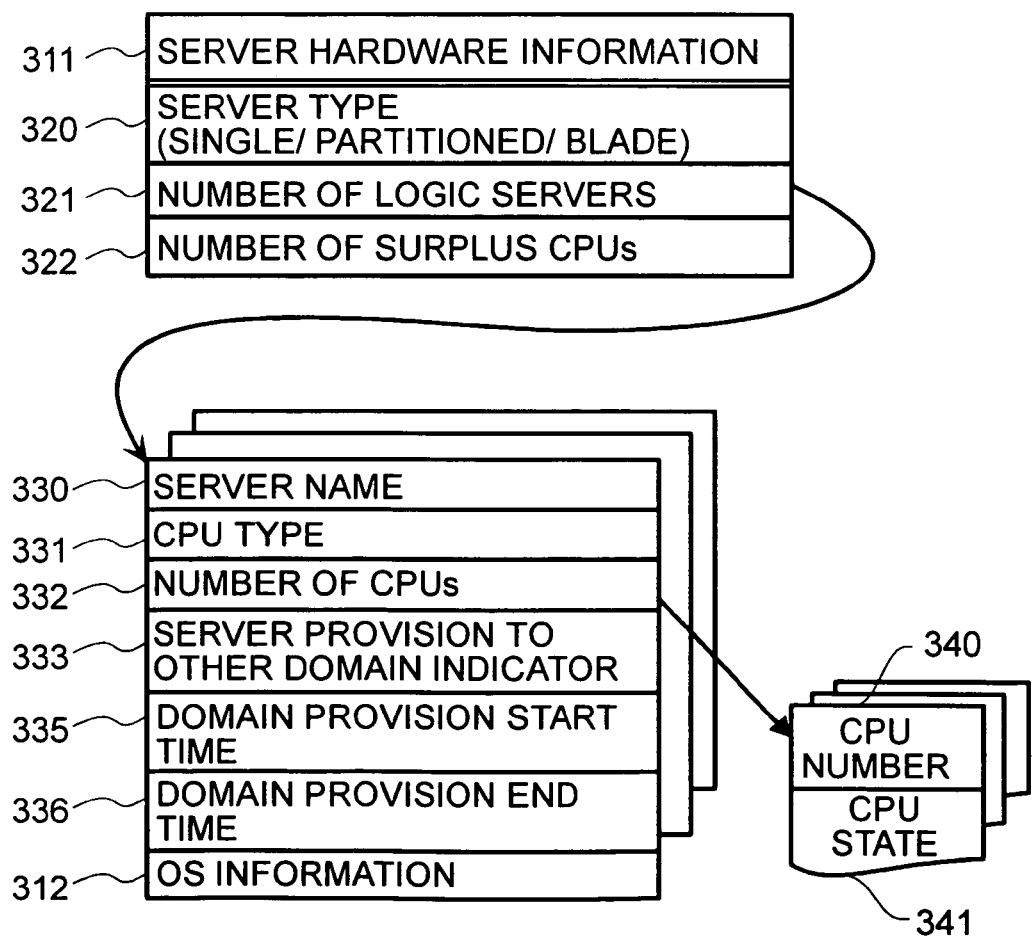
FIG. 10 shows an example of the composition of server hardware information.

FIG. 10 shows an example of the composition of server hardware information according to the present embodiment. As shown in FIG. 10, the server hardware information 311 stores a server type 320, such as a single, partitioned or blade server, the number of logic servers 321, and the number of surplus CPUs 322; and in accordance with the number of logic servers 321, it stores a server name 330, CPU type 331, number of CPUs 332, server provision to other domain indicator 333, domain provision start time 335, domain provision stop time 336, and OS information 312. Moreover, it also stores CPU numbers 340 and CPU states 341 corresponding to the number of CPUs 332.

Figure 11:
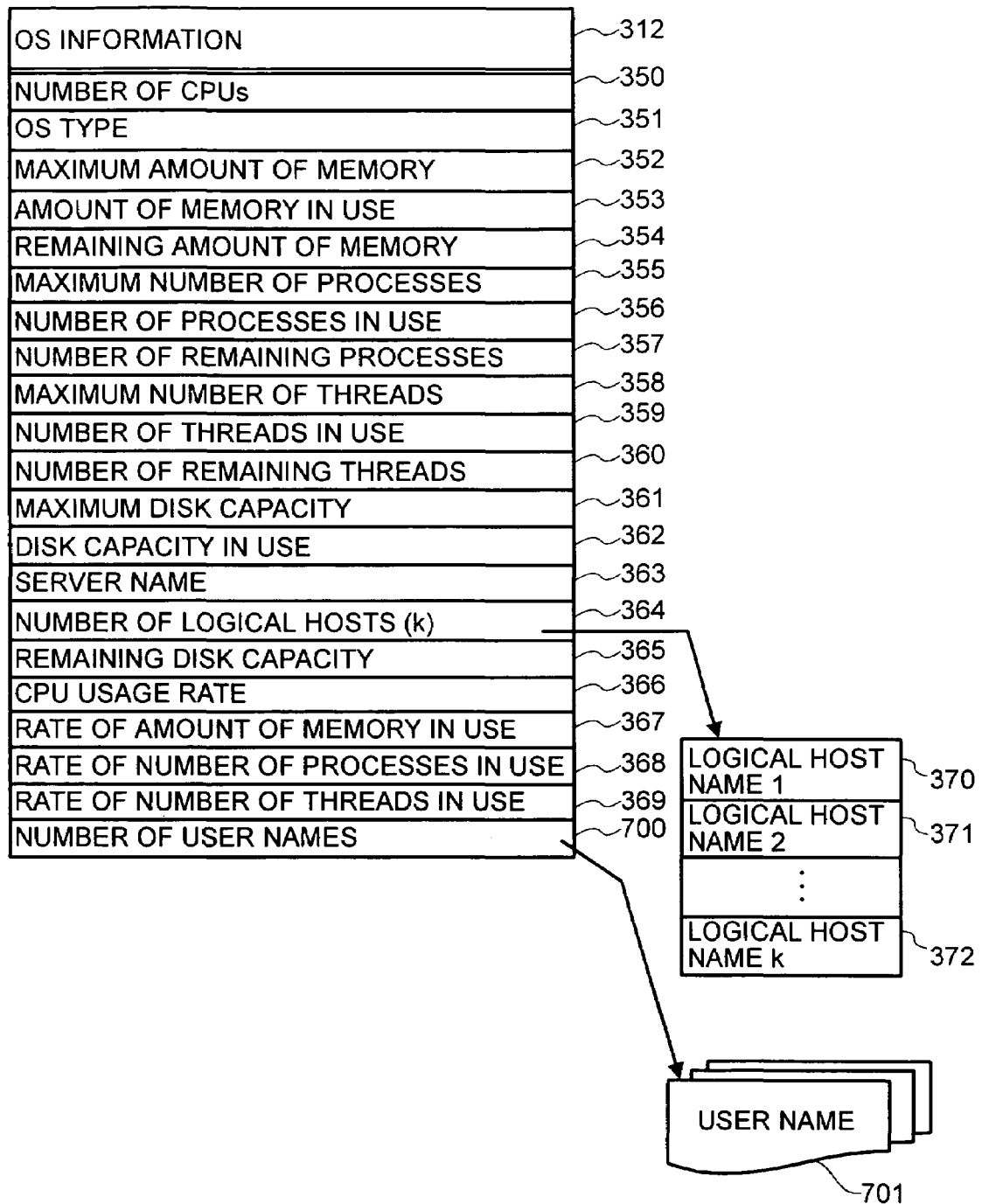
FIG. 11 shows an example of the composition of operating system (OS) information.

FIG. 11 shows an example of the composition of OS information according to the present embodiment. As shown in FIG. 11, the OS information 312 contains the number of CPUs 350, the OS type 351, the maximum amount of memory 352, the amount of memory in use 353, the remaining amount of memory 354, the maximum number of processes 355, the number of processes in use 356, the number of remaining processes 357, the maximum number of thread 358, the number of threads in use 359, the number of remaining threads 360, the maximum disk capacity 361, the disk capacity in use 362, the server name 363, the number of logical hosts (k) 364, the remaining disk capacity 365, the CPU usage rate 366, the rate of amount of memory in use 367, the rate of number of processes in use 368, the rate number of threads in use 369, and the number of user names 700; and it stores logical host names 370-372 corresponding to the number of logical hosts 364, and user names 701 corresponding to the number of user names 700.

The remaining number calculation formula for calculating the number of remaining processes 357 or the number of remaining threads 360, or the like, in FIG. 11, is set by the policy management processing section 42, and the default calculation formula is maximum number−number in use=remaining number. Here, the maximum number and the number in use are respectively the maximum number of processes 355 or the maximum number of threads 358, or the like, as described above, and the number of processes in use 356, or the number of threads 359 in use, or the like.

Figure 12:
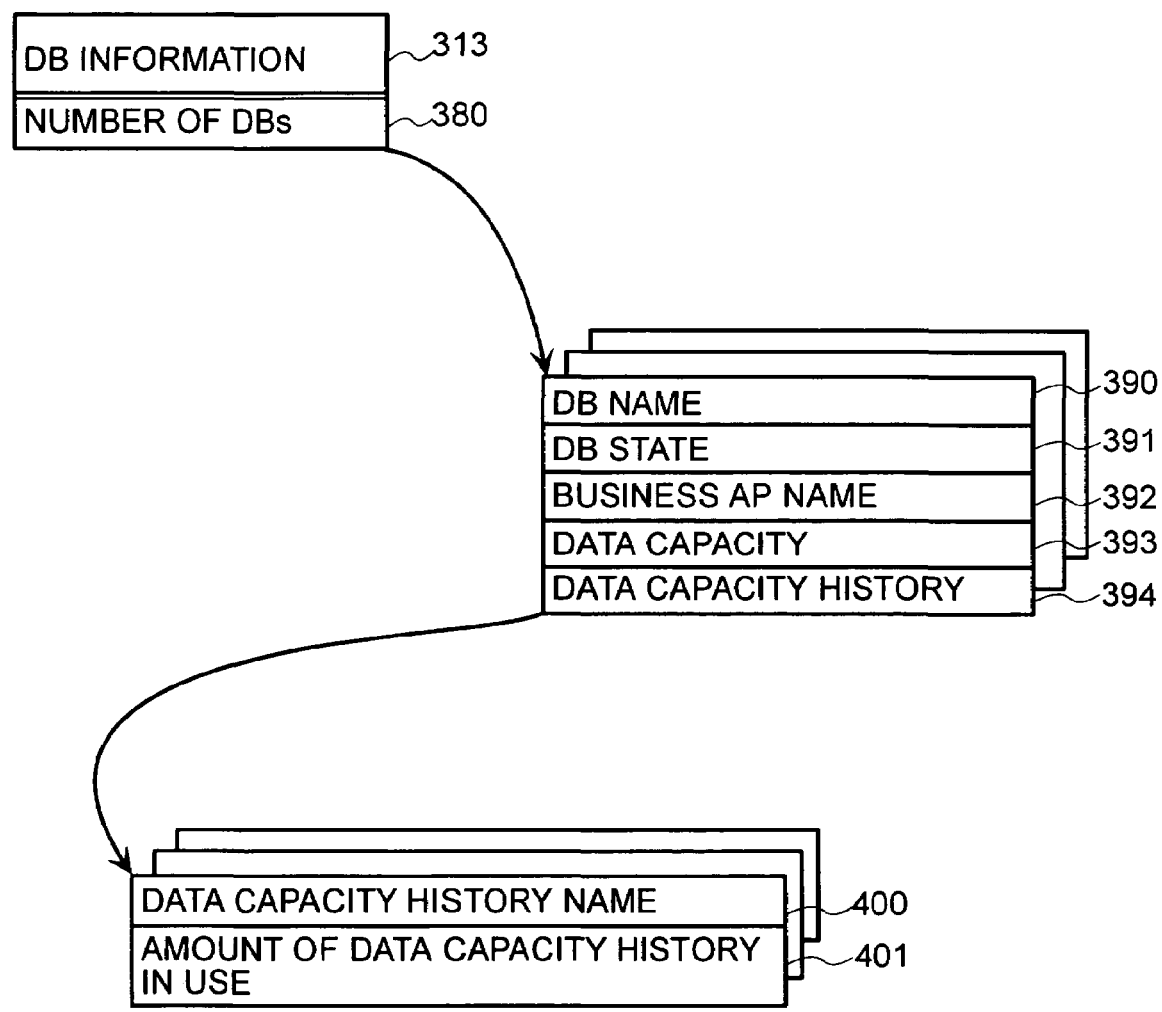
FIG. 12 shows an example of the composition of database (DB) information.

FIG. 12 shows an example of the composition of DB information according to the present embodiment. As shown in FIG. 12, the DB information 313 contains, for each one of the number of DB 380, a DB name 390, DB status 391, business AP name 392, data capacity 393, and data capacity history 394; and it stores the data capacity history time 400 and amount of data capacity history in use 401 as a data capacity history 394.

Figure 13:
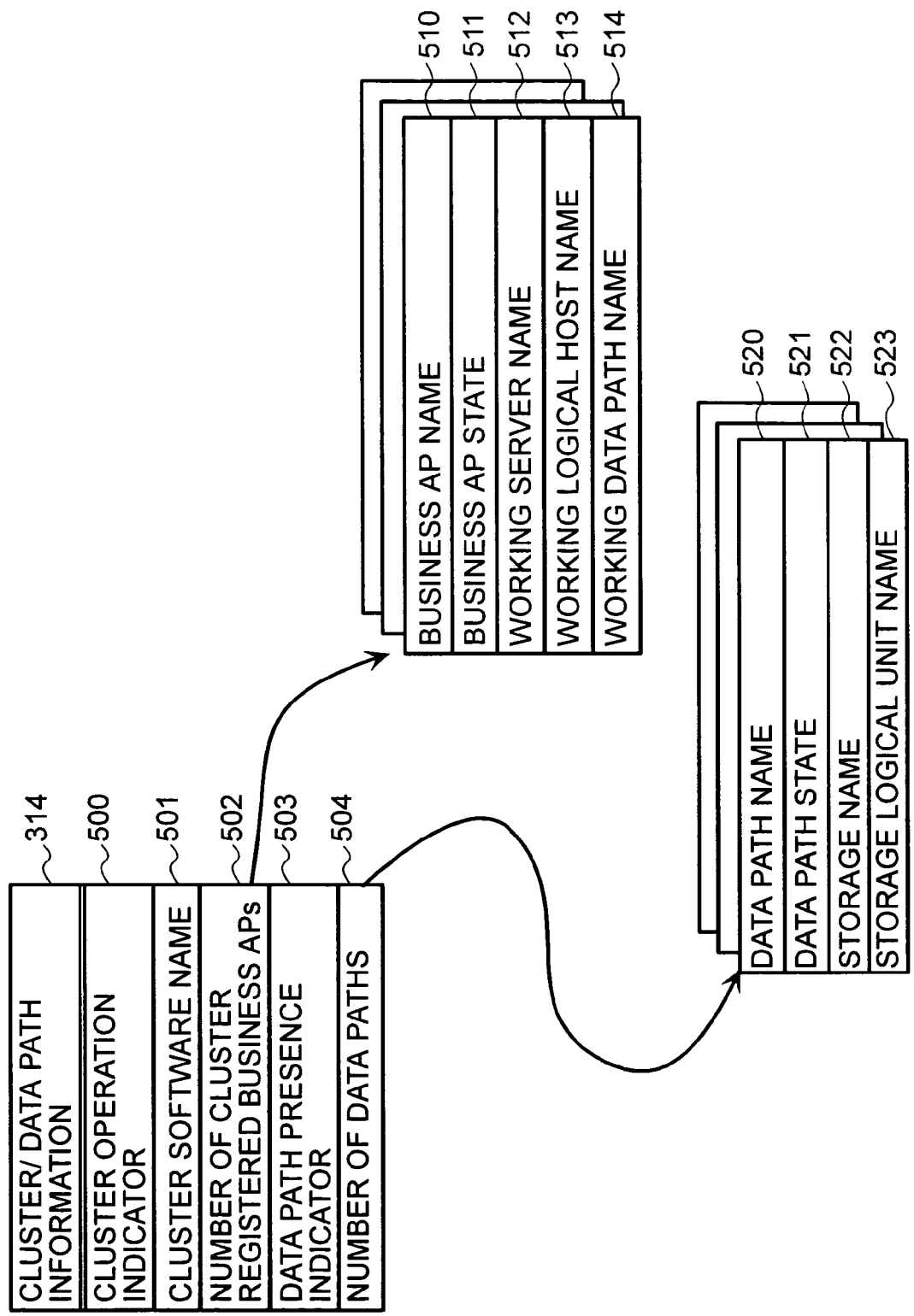
FIG. 13 shows an example of the composition of cluster/data path information.

Moreover, the cluster/data path management processing section 46 manages the composition and state of the cluster management program, and manages the composition and status of the data path between the server 49 held by the data path management program and the storage 50, and instructions for changes to the data path. FIG. 13 illustrates the cluster/data path management information.

FIG. 13 shows an example of the composition of cluster/data path information according to the present embodiment. As shown in FIG. 13, the cluster/data path information 314 contains a cluster operation indicator 500, cluster software name 501, number of cluster registered business APs 502, data path presence indicator 503, and a number of data paths 504; and furthermore, it stores, in association with each one of the number of cluster registered business APs 502, a business AP name 510, business AP state 511, working server name 512, working logical host name 513, and a working data path name 514; and moreover, it stores, in association with each one of the number of data paths 504, a data path name 520, data path state 521, storage name 522 and storage logical unit name 523.

Figure 14:
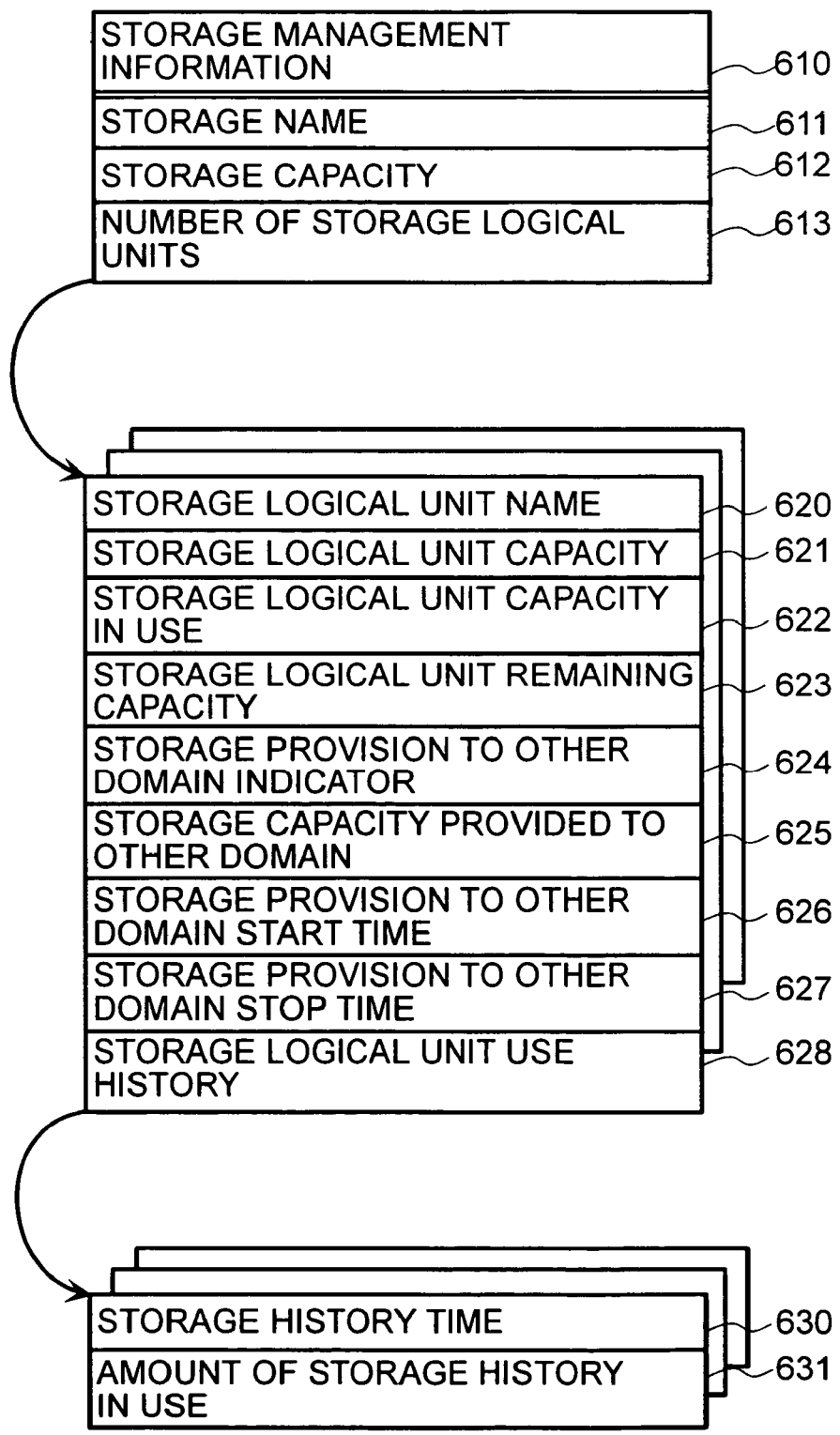
FIG. 14 shows an example of the composition of storage management information.

FIG. 14 shows an example of the composition of storage management information according to the present embodiment. As shown in FIG. 14, the storage management information 610 contains a storage name 611, a storage capacity 612 and a number of storage logical units 613; and moreover, it also stores, in accordance with the number of storage logical units 613, a storage logical unit name 620, a storage logical unit capacity 621, a storage logical unit capacity in use 622, a storage logical unit remaining capacity 623, a storage provision to other domain indicator 624, a storage capacity provided to other domain 625, a storage provision to other domain start time 626, a storage provision to other domain stop time 627, and a storage logical unit use history 628; and furthermore, it stores, in accordance with the storage logical unit use history 628, a storage history time 630 and storage history usage 631.

The composition management processing section 41 of the present embodiment holds and manages composition information by referencing the management information collected by the performance and capacity management processing section 47 and the cluster/data path management processing section 46, and it receives requests for referencing or updating the management information from other functional components of the private domain 2. In particular, the composition management information for a resource judged by the space scheduler 44 to be surplus is supplied temporarily or permanently to the composition management processing section 31 of the public domain 1.

The distribution management processing section 43 distributes programs, such as a business AP 70, or DB management processing section 81, or the like, to a desired real business server, from the private domain management server 11.

The space scheduler 44 monitors the business AP schedule, or the operational state of the server 49 or storage 50, via the composition management processing section 41, and if a resource which has become surplus arises, then this is reported to the composition management processing section 41.

The execution management processing section 45 manages the execution and termination of the business AP 70. Management information relating to the business AP start time 258 and the business AP stop time 259 in FIG. 8 is reported by the execution management processing section 45 to the composition management processing section 41.

The policy management processing section 42 establishes and changes the operating standards of the composition management processing section 41, the performance and capacity management processing section 47, the cluster/data path management processing section 46, or the space scheduler 44; and if the composition management processing section 41 has supplied a resource that has become surplus, to the composition management processing section 31 of the private domain 1, then it will have an access control list (ACL) for the purpose of judging whether the resource in question permits access rights from the composition management processing section 31.

In the performance and capacity management processing section 47, it is possible to change the calculation formulae used to calculate the remaining amount of memory 354, the number of remaining processes 357, the number of remaining threads 360, or the remaining disk capacity 365 in FIG. 11. For example, the default calculation formula for the remaining amount of memory 354 is (remaining amount of memory 354)=(maximum amount of memory 352)−(amount of memory in use 353), but if a safety coefficient α is set for the amount of memory in use 353, in accordance with the policy management, then the remaining amount of memory can be changed, for instance, to (remaining amount of memory 354) =(maximum amount of memory 352)−(amount of memory in use 353)×(safety coefficient α). Moreover, in a similar manner, the space scheduler 44 is also able to change the judgment of surplus resources by taking a safety coefficient into consideration.

In the cluster/data path management processing section 46, it is possible to change the selection of a business AP 70 to be subjected to clustering by altering the business AP priority 228 in FIG. 6 in accordance with time bands, or to change the clustering destination server in accordance with the remaining amount of a particular resource.

Furthermore, the operation monitoring processing section 40 monitors the state of the other functional components in the private domain 2.

On the other hand, the public domain 1 is constituted by the operation monitoring processing section 30, the composition management processing section 31 (which manages the public domain composition information 22), the policy management processing section 32 and the space scheduler 34, and it holds and manages the virtual resource 38 via composition management.

The composition management processing section 31 holds and manages a resource supplied by the composition management processing section 41 of at least one private domain 2, as a virtual resource 38. In other words, the composition management processing section 31 receives a notification of a resource having reached its loan time limit from the composition management processing section 41 of a particular private domain 2, or a notification that the use of a resource by the space scheduler 34 has terminated, and it returns the resource in question to the composition management processing section 41 of the private domain 2 which originally supplied it.

The space scheduler 34 holds and manages the virtual resources 38 present in the composition management processing section 31 whilst taking account of their loan time limits, and when it receives a resource supply request, it supplies a virtual resource which matches the corresponding request conditions. Moreover, the space scheduler 34 notifies the composition management processing section 31 with respect to a virtual resource that has reached its use time limit.

The policy management processing section 32 establishes and changes the operating standards of the space scheduler 34, and it is able to change which of the private domains 2 is given preference, in cases where the space scheduler 34 has received virtual resource supply requests from a plurality of private domains 2. Furthermore, the operation monitoring processing section 30 monitors the states of the other functional components in the public domain 1.

Next, a description is given of the processing in the program allocation system according to the present embodiment, whereby management of the respective resources used in each business AP unit is performed by associating the composition management information of the business AP with the composition management information of the resource, and stable operation of the business AP is achieved by executing resource management which is suited to the business task in question, for instance, detecting resource abnormalities for each business AP.

The composition management processing section 41 of the private domain management server 11 according to the present embodiment holds and manages composition management information for respective resources by referencing the management information gathered by the respective processing sections, and by referencing the composition management information including identification information for the resources used by the respective business APs 48, and locating the composition management information for the resource identified by this identification information, from amongst the composition management information of the respective resources, it generates business AP information which associates the composition management information of the business AP 48 with the composition management information of the aforementioned located resource, and if the composition management information of the resource in the business AP information corresponds to the rules for detecting a resource abnormality in the corresponding business AP 48, then it outputs information indicating that a resource abnormality has occurred with the business AP 48. Stable operation of the business AP can be achieved by implementing countermeasures with respect to resource abnormalities, such as clustering to a server which satisfies the operating conditions, or the like.

Figure 15:
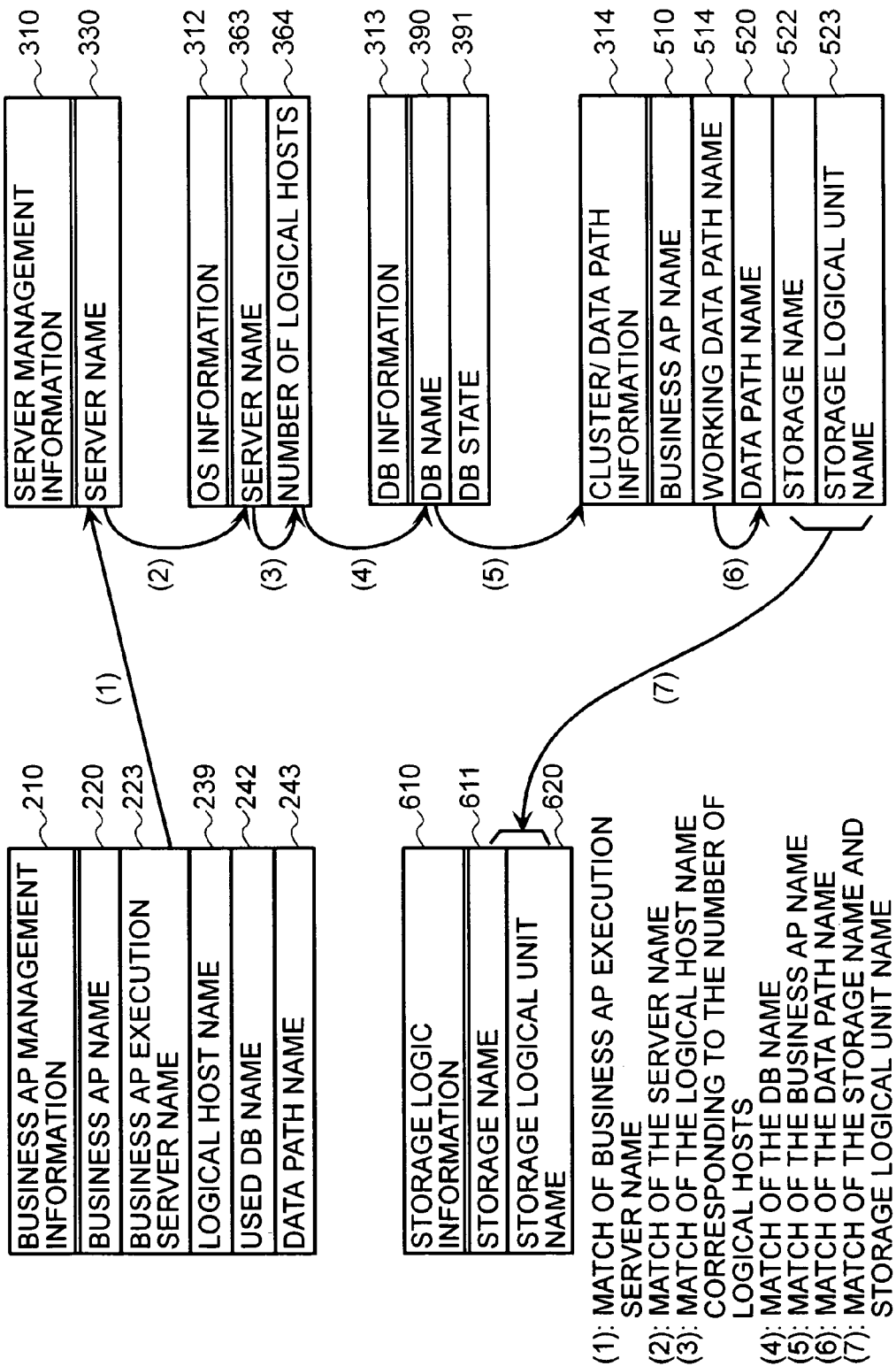
FIG. 15 shows an overview of the associations of management information.

FIG. 15 shows an overview of the associations between management information in the present embodiment. As seen in FIG. 15, associations between the respective management information are made by searching for matching information in the following order, (1) match of business AP execution server name, (2) match of the server name, (3) match of the logical host name corresponding to the number of logical hosts, (4) match of the DB name, (5) match of the business AP name, (6) match of the data path name, and (7) match of the storage name and storage logical unit name.

Figure 16:
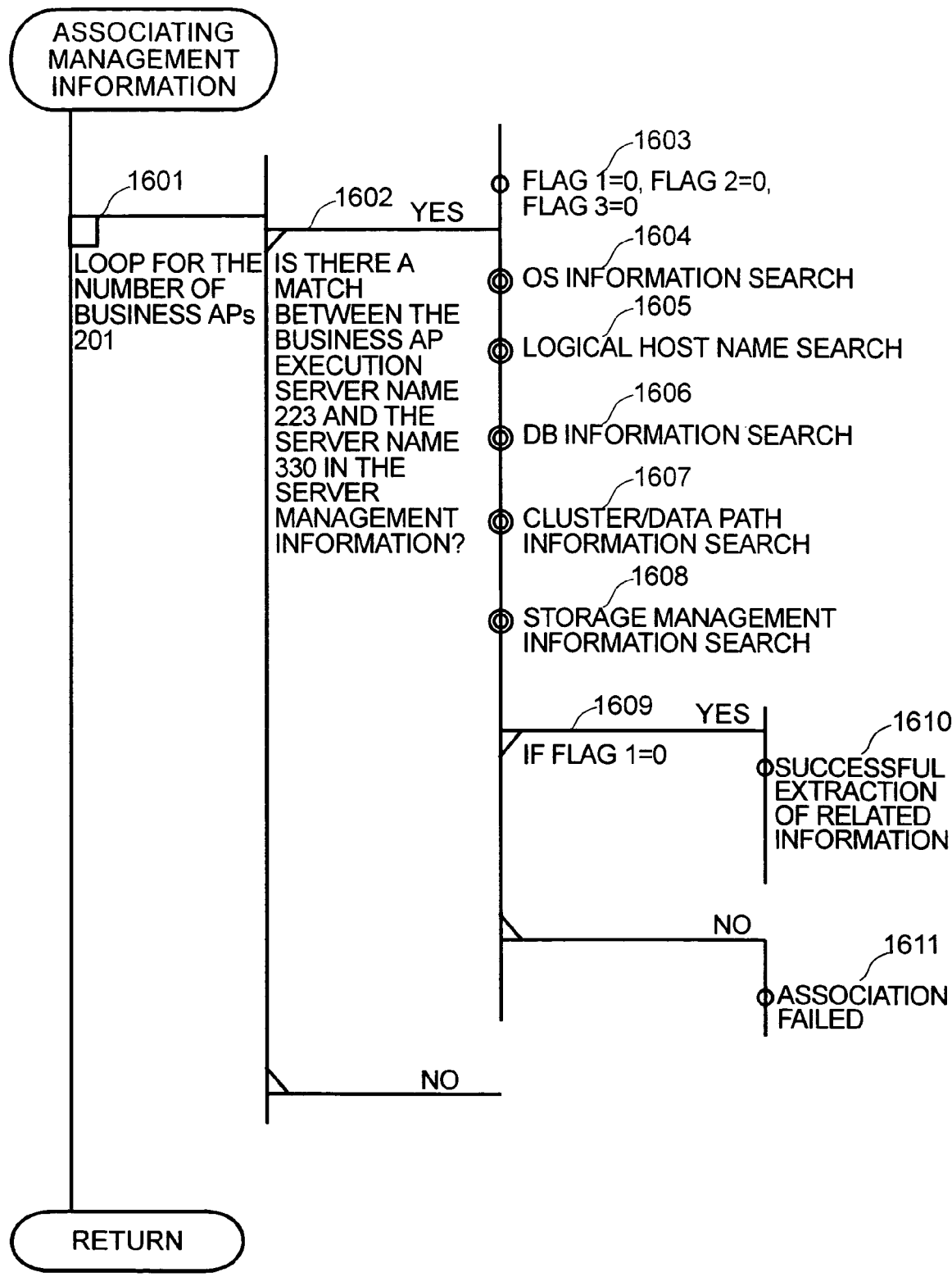
FIG. 16 illustrates processing for associating management information.

FIG. 16 illustrates processing for associating management information in the present embodiment. At step 1601, the composition management processing section 41 of the private domain management server 11 performs loop control corresponding to the number indicated by the number of business APs 201.

At step 1602, it is investigated whether or not there is a match between the business AP execution server name 223 and the server name 330 in the server management information, and if they are matching, then the processing from step 1603 onwards is executed.

At step 1603, after ensuring a region in the memory for storing the value of flag 1, flag 2 and flag 3, the respective flag values are set such that flag 1=0, flag 2=0 and flag 3=0.

At step 1604 to step 1608, respective processing is executed for an OS information search, a logical host name search, a DB information search, a cluster/data path information search and a storage management information search (FIGS. 17-21).

Thereupon, at step 1609, the value of flag 1 is examined, and if this value is "0", then the procedure advances to step 1610, whereas if it is not "0", then the procedure advances to step 1611.

At step 1610, business AP information which associates the composition management information of the business AP 48 with the composition management information of the extracted resource is generated from the information extracted as a result of the successful extraction of related information. On the other hand, at step 1611, the fact that correlation has failed is outputted to an output device, such as a display device, or the like, thereby reporting same to the administrator.

Figure 17:
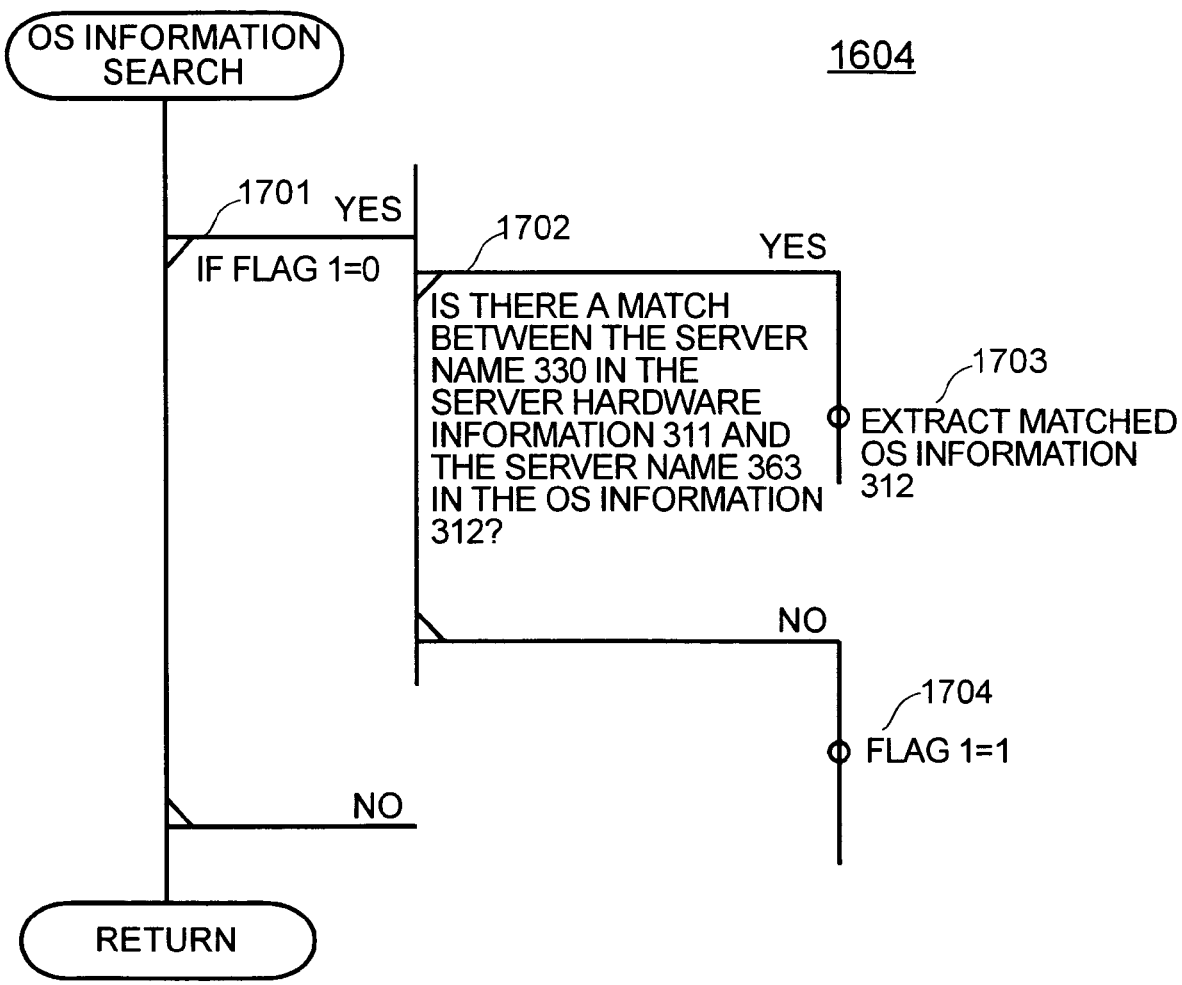
FIG. 17 shows OS information search processing.

FIG. 17 illustrates processing for searching of OS information (1604) according to the present embodiment. At step 1701, the value of flag 1 set in the processing thus far is investigated, and if this flag is "0", then the procedure advances to step 1702.

At step 1702, it is investigated whether or not there is any OS information 312 having a server 363 which matches that of the server name 330 in the server hardware information 311, and if there is matching information, then the procedure advances to step 1703, whereas if there is no matching information, then the procedure advances to step 1704. At step 1703, the matching OS information 312 is extracted, and at step 1704, flag 1 is set to "1".

Figure 18:
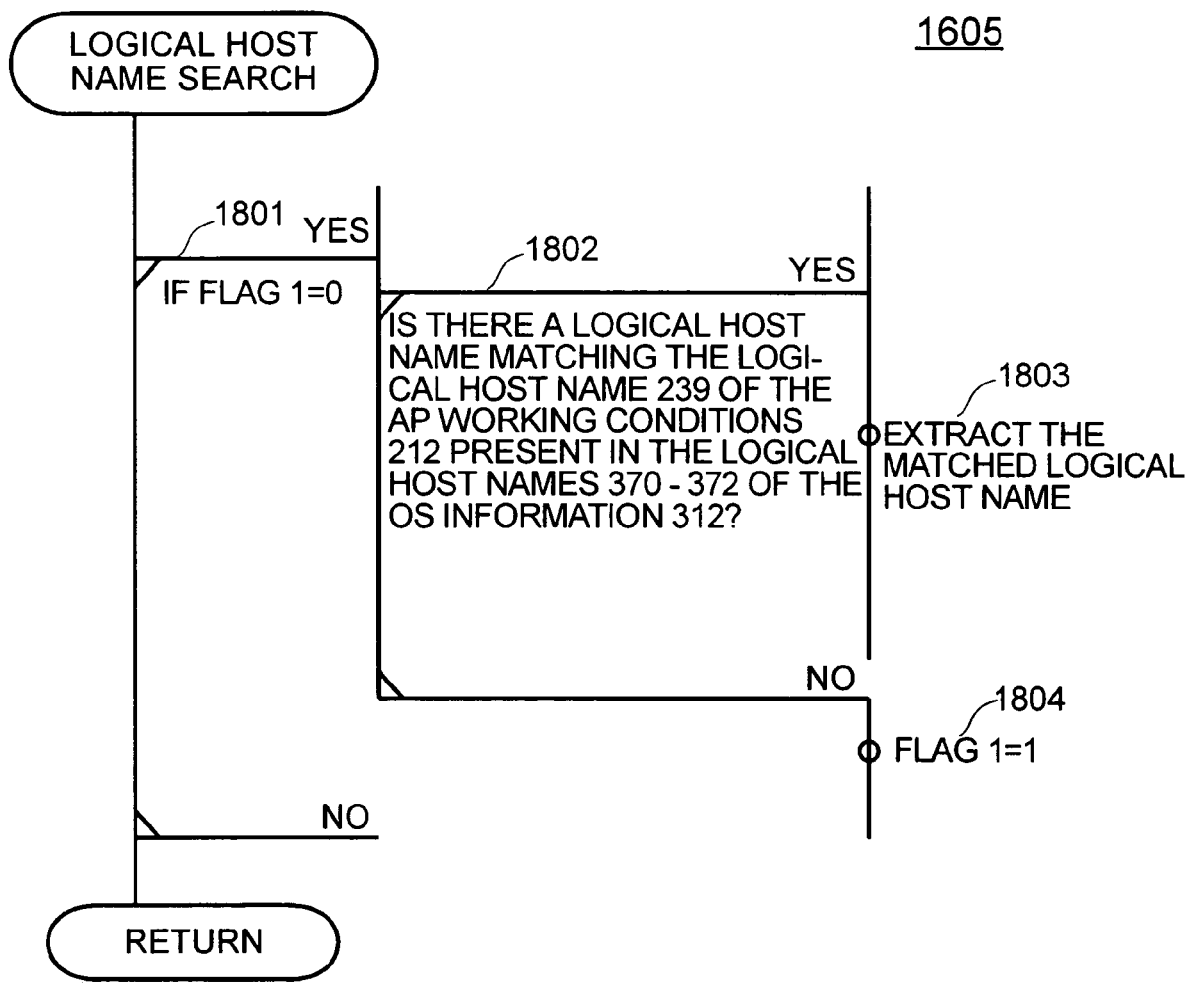
FIG. 18 shows logical host name search processing.

FIG. 18 illustrates processing for logical host name searching (1605) according to the present embodiment. At step 1801, it is investigated whether or not the flag 1 is set to "0", and if flag 1 is "0", then the procedure advances to step 1802.

At step 1802, it is investigated whether or not there exists, amongst the logical host names 370-372 of the OS information 312, a logical host name which matches the logical host name 239 of the AP working conditions 212, and if there is a matching host name, then the procedure advances to step 1803, whereas if there is no matching host name, then it advances to step 1804. At step 1803, the matching logical host name is extracted, and at step 1804, flag 1 is set to "1".

Figure 19:
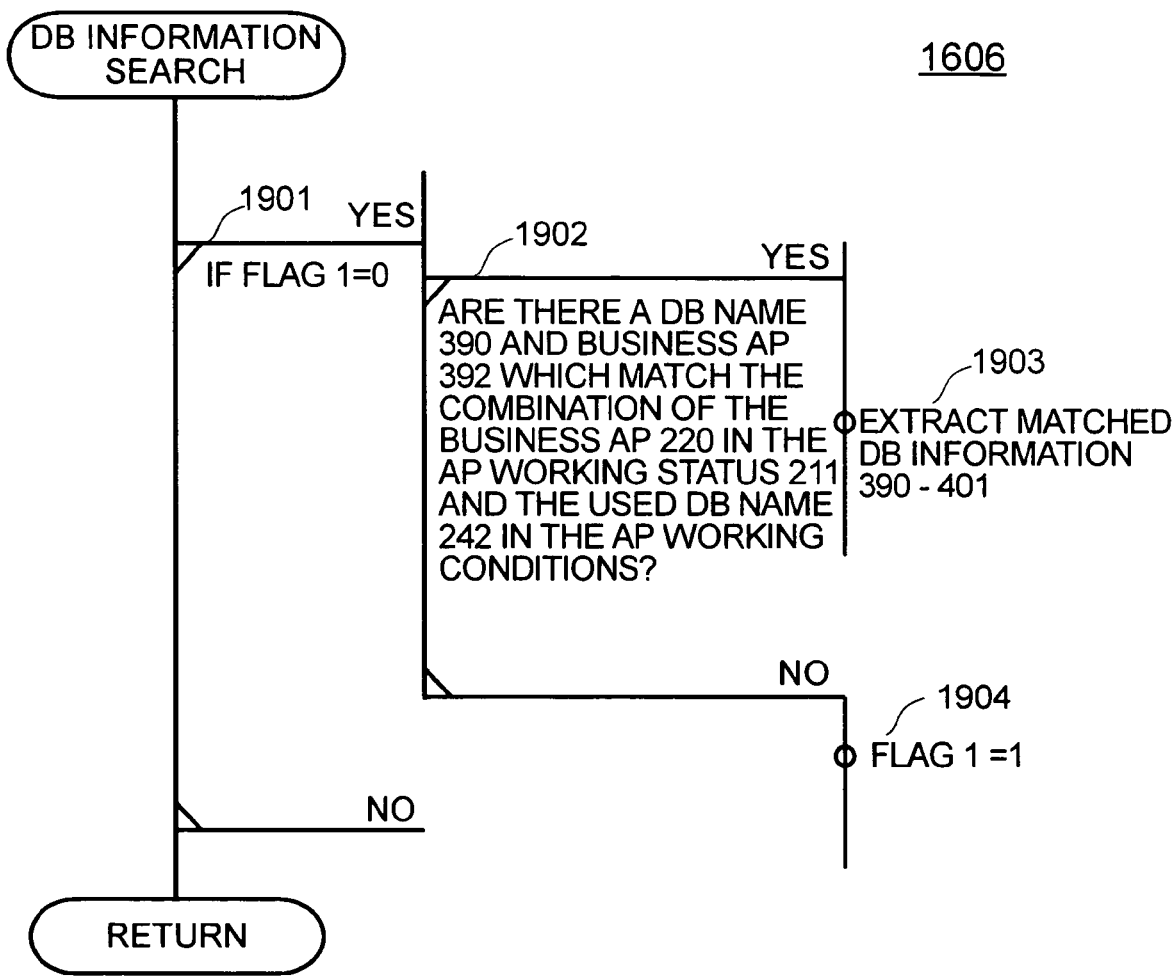
FIG. 19 shows DB information search processing.

FIG. 19 illustrates DB search processing (1606) according to the present embodiment. At step 1901, it is investigated whether or not the flag 1 is set to "0", and if flag 1 is "0", then the procedure advances to step 1902.

At step 1902, it is investigated whether or not there exists a DB name 390 and business AP 392 which match the combination of the business AP name 220 in the AP working status 211 and the used DB name 242 in the AP working conditions 212, and if there are matching items, then the procedure advances to step 1903, whereas if there are no matching items, then it advances to step 1904. At step 1903, the matching DB information 390-401 is extracted, and at step 1904, flag 1 is set to "1".

Figure 20:
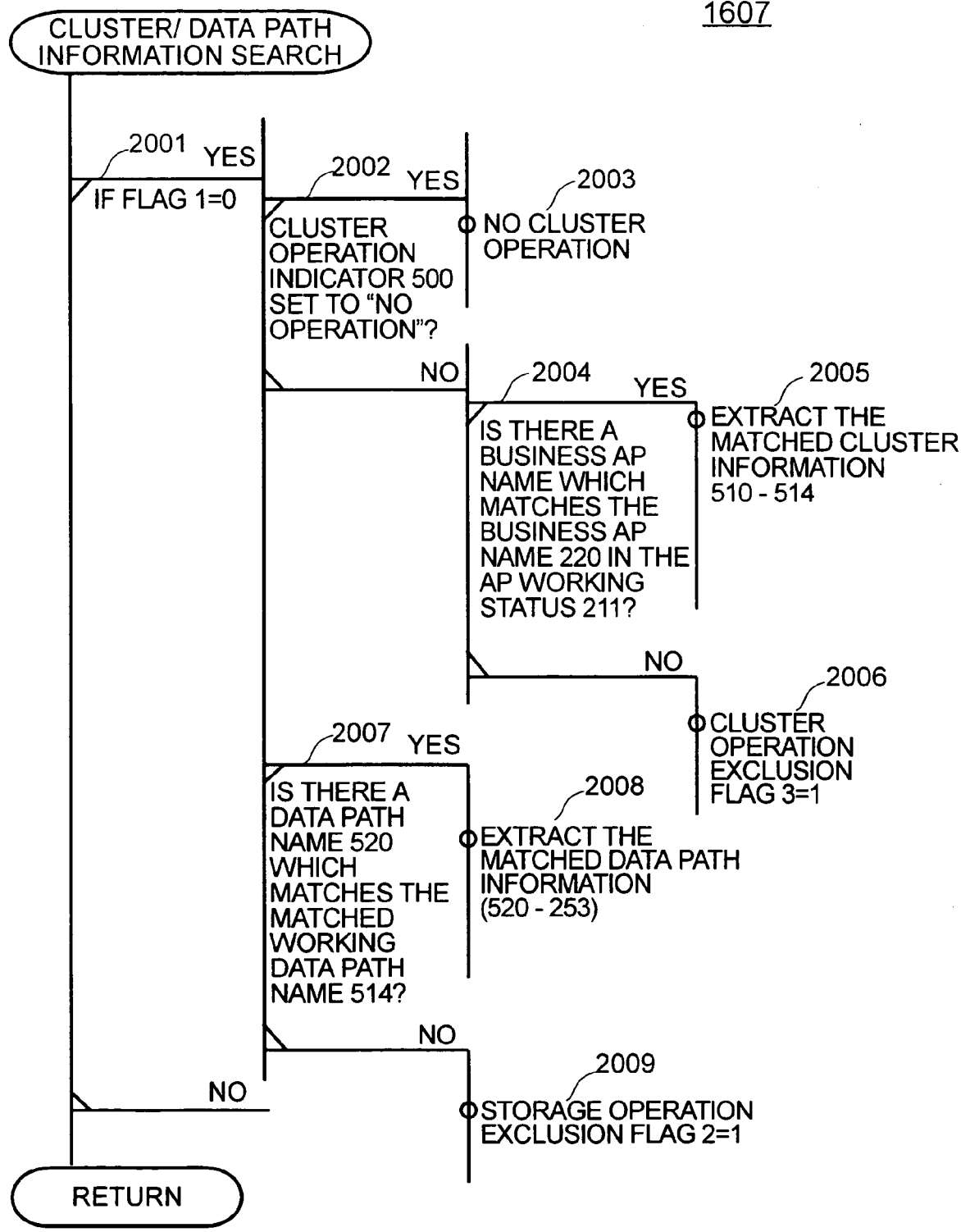
FIG. 20 shows cluster/data path information search processing.

FIG. 20 illustrates processing for searching cluster/data path information (1607) according to the present embodiment. At step 2001, it is investigated whether or not the flag 1 is set to "0", and if flag 1 is "0", then the procedure advances to step 2002.

At step 2002, it is investigated whether or not the cluster operation indicator is set to "no operation", and if it is set to "no operation", then the procedure advances to step 2003, and at step 2003, a return value indicating that there is no cluster operation is established.

At step 2004, it is investigated whether or not there exists a business AP name which matches the business AP name 220 in the AP working conditions 211, and if there is matching information, then the procedure advances to step 2005, whereas if there is no matching information, then the procedure advances to step 2006. At step 2005, matching cluster information 510-514 is extracted, and at step 2006, flag 3 is set to "1" to indicate exclusion from cluster operation.

At step 2007, it is investigated whether or not there exists a data path name 520 which matches the matched working data path name 514, and if there is matching name, then the procedure advances to step 2008, whereas if there is no matching name, then the procedure advances to step 2009. At step 2008, the matching data path information (520-523) is extracted, and at step 2009, flag 2 is set to "1" to indicate exclusion from storage operation.

Figure 21:
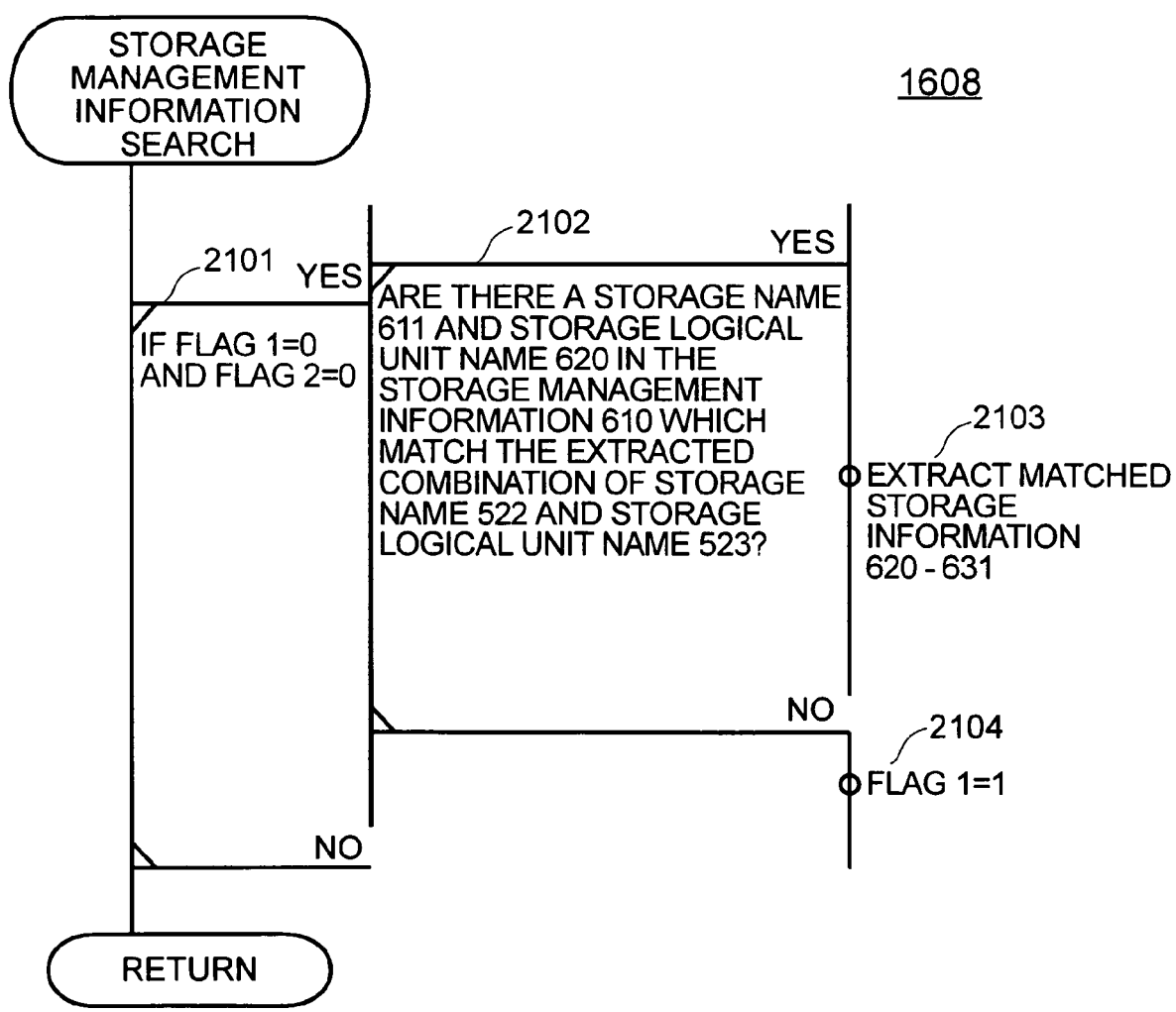
FIG. 21 shows storage management information search processing.

FIG. 21 illustrates storage management information search processing (1608) according to the present embodiment. At step 2101, it is investigated whether or not flag 1 is "0" and flag 2 is "0", and if both flag 1 and flag 2 are "0", then the procedure advances to step 2102.

At step 2102, it is investigated whether or not there exist a storage name 611 and storage logical unit name 620 in the storage management information 610 which match the combination of the extracted storage name 522 and storage logical unit name 523, and if they do exist, then the procedure advances to step 2103, whereas if they do not, then it advances to step 2104. At step 2103, the matched storage information 620-631 is extracted, and at step 2104, flag 1 is set to "1".

FIG. 22 shows an example of associated business AP information according to the present embodiment. As shown in FIG. 22, in the business AP information 2200, the composition management information for each business AP is associated with the composition management information of the resources.

By referencing the policy management rules for each business AP which serve to determine the state of each business AP and determining whether or not the resource composition management information in the business AP corresponds to the rules for detecting a resource abnormality in the relevant business AP, it is possible to determine whether or not a resource abnormality has occurred in that business AP, and if it is determined that a resource abnormality has occurred, then for example, the indications *1-*3 in FIG. 22 are marked and information indicating that a resource abnormality has occurred is output for each business AP.

FIG. 23 shows an example 2300 of problems relating to the business AP in FIG. 22 and corresponding countermeasures, according to the present embodiment. If a resource abnormality of the kind shown in the problems in FIG. 23 is detected, then the policy management rules are used.

FIG. 24 shows an example 2400 of policy management rules according to the present embodiment. FIG. 24 shows an example of policy management rules used in the event of the occurrence of the problems or countermeasures in FIG. 23.

Next, a description is given of the processing in the program allocation system according to the present embodiment whereby integrated management is carried out by distributing policy management rules as illustrated in FIG. 24 to each of the functional components, and automatic operation of program allocation is implemented.

In the present embodiment, the policy management processing section 42 of the private domain management server 11 and the policy management processing section 32 of the public domain management server 21 perform universal management of policy management rules, which include rules for detecting resource abnormalities in the business AP 48 and rules for detecting surplus resources.

Figure 25:
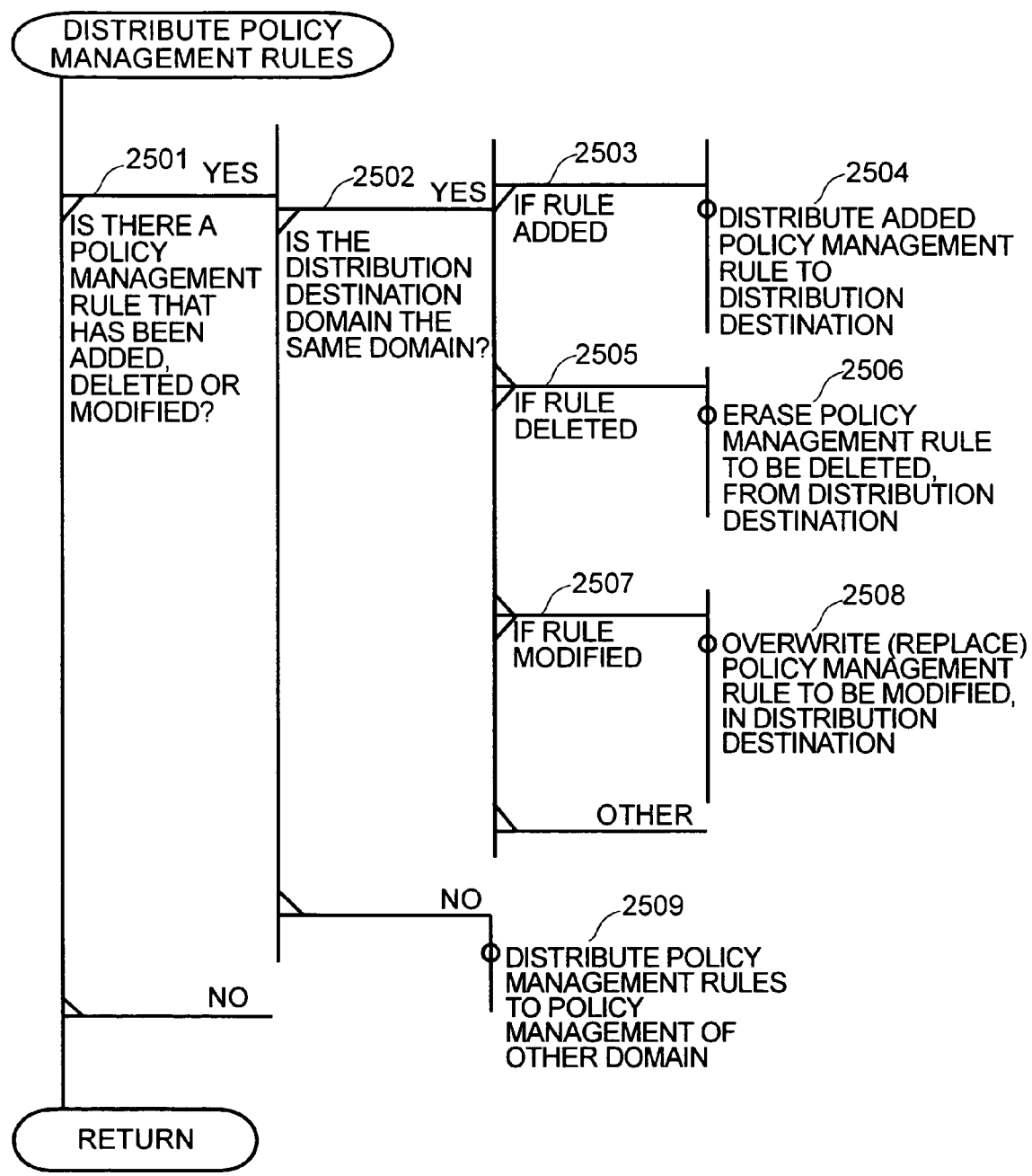
FIG. 25 shows processing for the distribution of policy management rules.

FIG. 25 illustrates processing for the distribution of policy management rules according to the present embodiment. At step 2501, the policy management processing section 42 of the private domain management server 11 investigates whether or not there is any policy management rule which has been added, deleted or modified, and if there is, then it advances to step 2502.

At step 2502, it is investigated whether or not the distribution destination domain is the same domain, and if it is the same domain, then the procedure advances to step 2503, whereas if it is not, then it advances to step 2509.

At step 2503, it is investigated whether or not the processing applied to the policy management rules relates to addition of a policy management rule, and if a rule has been added, then the procedure advances to step 2504, and the added policy management rule is distributed to the distribution destinations.

At step 2505, it is investigated whether or not the processing applied to the policy management rules relates to deletion of a policy management rule, and if a rule has been deleted, then the procedure advances to step 2506, and the deleted policy management rule is erased from the policy management rules of the destination.

At step 2507, it is investigated whether or not the processing applied to the policy management rules relates to modification of a policy management rule, and if a rule has been modified, then the procedure advances to step 2508, and the modified policy management rule is distribution by overwriting at the destination (thus replacing the related policy management rule at the destination).

At step 2509, the policy management rules are distributed to the policy management processing sections 42 of other domains.

Next, a description is given of execution control for selecting a resource which suits the operating conditions of the business AP on start up, in the program allocation system according to the present embodiment, by associating the composition management information of the business AP with the composition management information of the resource.

The execution management processing section 45 of the private domain management server 11 according to the present embodiment receives an execution request for the business AP 48 and instructs reservation of a resource to be used by the business AP 48, whereupon the business AP 48 is started up using the resource reserved by this instruction. If the composition management information of the resource associated with the aforementioned business AP 48 for which a reservation has been instructed satisfies the operating conditions in the composition management information of the business AP 48, then the space scheduler 44 reserves the aforementioned resource as a resource for executing the business AP 48.

Thereupon, the distribution management processing section 43 distributes programs, such as the aforementioned started up business AP 48, or the DB management system, or the like, to the real business server 49 corresponding to the reserved resource described above.

Figure 26:
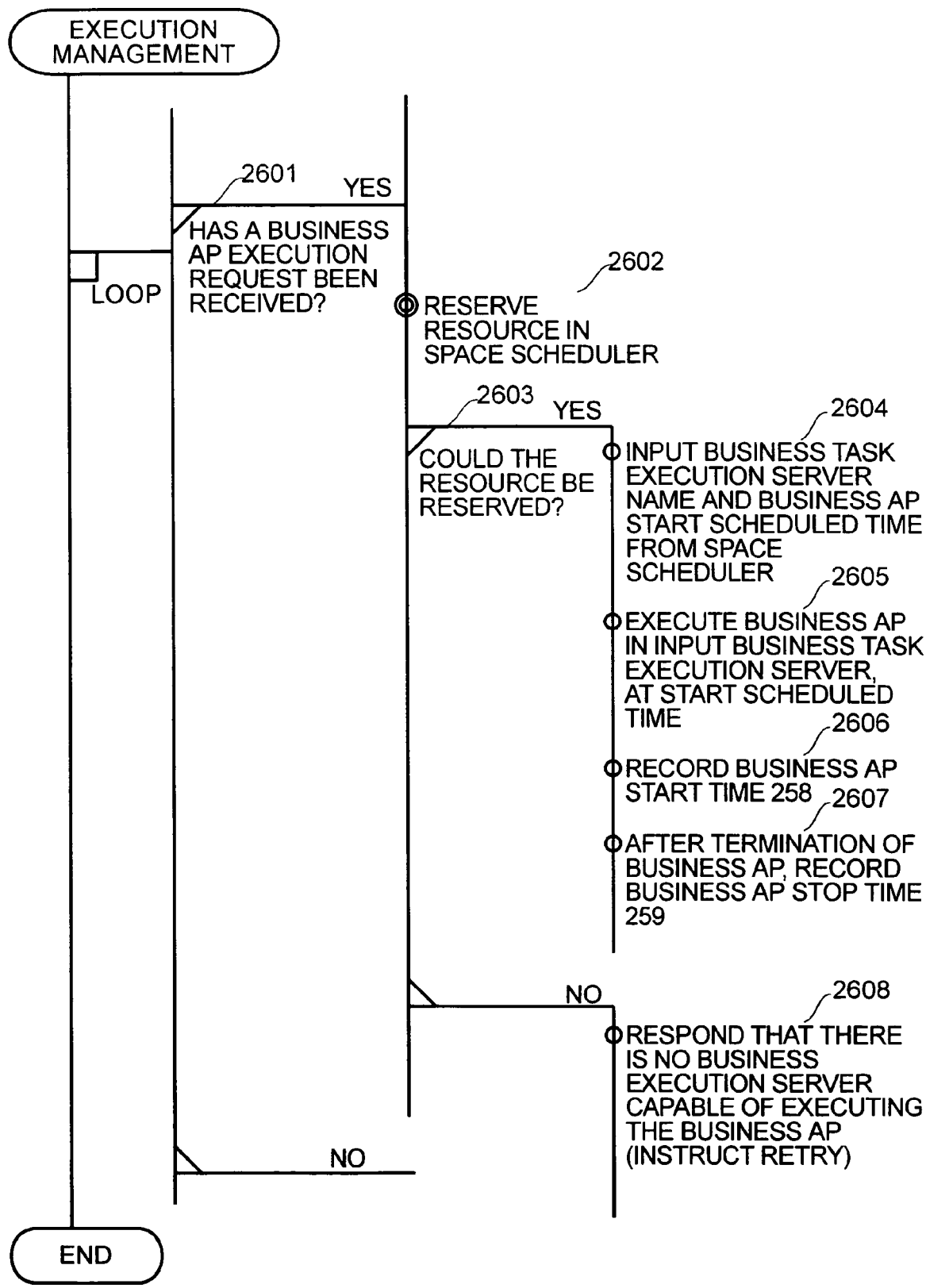
FIG. 26 illustrates execution management processing at the start up of a business AP.

FIG. 26 illustrates execution management processing at the start up of a business AP according to the present embodiment. At step 2601, the execution management processing section 45 of the private domain management server 11 investigates whether or not an execution request for the business AP has been received, and if such a request has been received, then it advances to step 2602.

At step 2602, resource reservation processing is performed with respect to the space scheduler 44, and at step 2603, it is investigated whether or not the resource could be reserved by the processing at step 2602, and if it could be reserved, then the procedure advances to step 2604, whereas if it could not be reserved, then the procedure advances to step 2608.

At step 2604, the business execution server name 223 and the business AP start scheduled time 226 are input from the space scheduler 44; at step 2605, schedule reservation information is generated for executing the business AP at the start scheduled time in the input business execution server; at step 2606, the business AP start time 258 is recorded; and at step 2607, after the business AP has terminated, the business AP stop time 259 is recorded.

At step 2608, a response is issued indicating that there is no business execution server which is able to execute the business AP in question, and a retry is instructed.

FIG. 27 shows an image 2700 of a resource schedule reservation according to the present embodiment. In the present embodiment, schedule reservations are made for resources as illustrated in FIG. 27.

Figure 28:
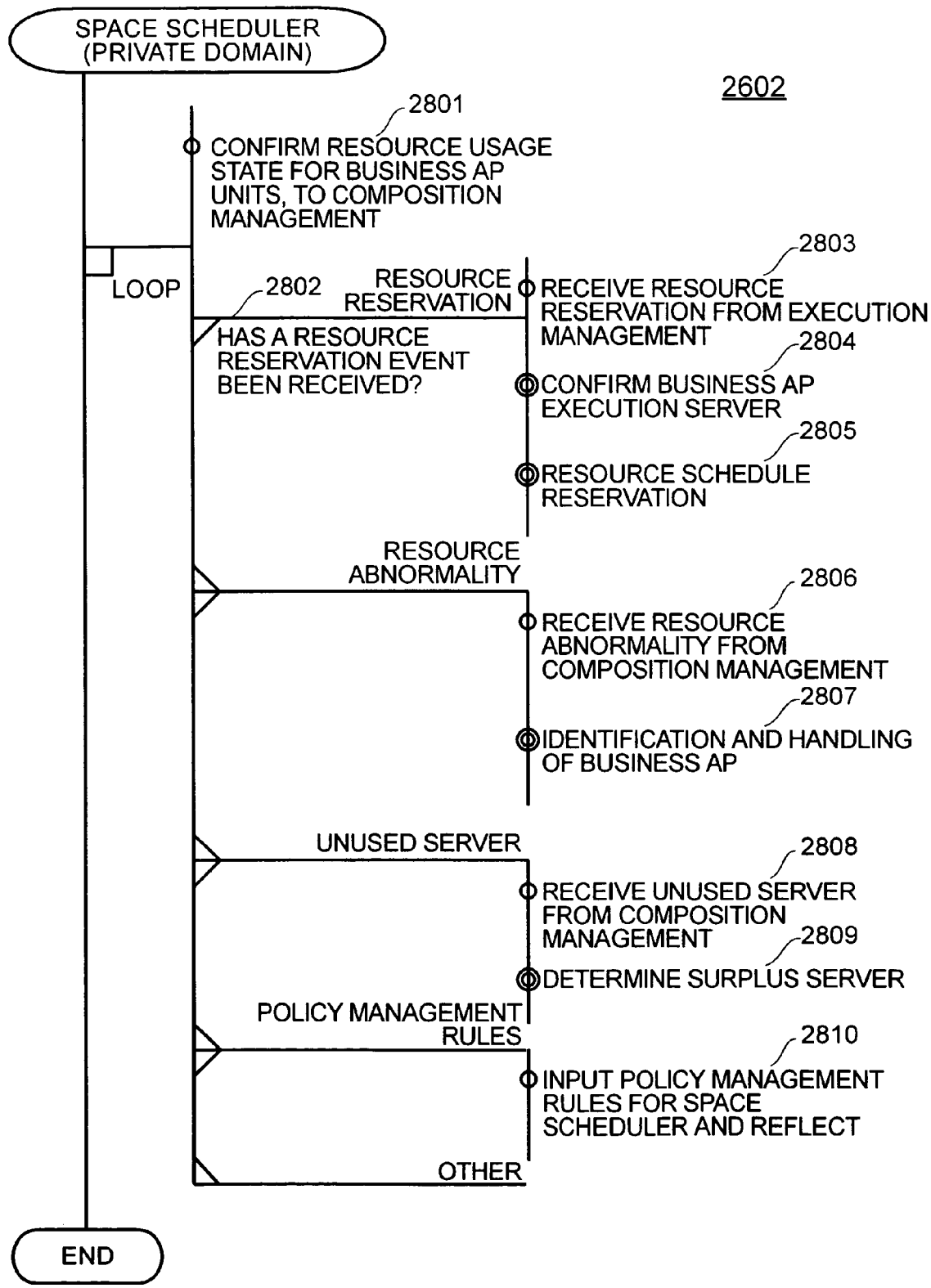
FIG. 28 illustrates processing in the space scheduler 44 of the private domain 2.

FIG. 28 illustrates processing (2602) in the space scheduler 44 of the private domain 2 according to the present embodiment. At step 2801, the resource usage status for each business AP unit is confirmed to the composition management processing section 41.

At step 2802, the contents of a received event are examined; and if a resource reservation notification has been received, then the procedure advances to step 2803; if a resource abnormality notification has been received, then it advances to step 2806; if a server not in use notification has been received, then it advances to step 2808; and if a policy management rules notification has been received, then it advances to step 2810.

At step 2803, the contents of the resource reservation are received from the execution management processing section 45; at step 2804, business AP execution server confirmation processing is executed; and at step 2805, resource schedule reservation processing is executed.

At step 2806, the details of a resource abnormality are received from the composition management; and at step 2807, business AP identification and handling processing is executed.

At step 2808, the identification information for an unused server is received from the composition management processing section 41; and at step 2809, judgment processing for surplus servers is executed.

At step 2810, the policy management rules used by the space scheduler are inputted and reflected (the rules are updated).

Figure 29:
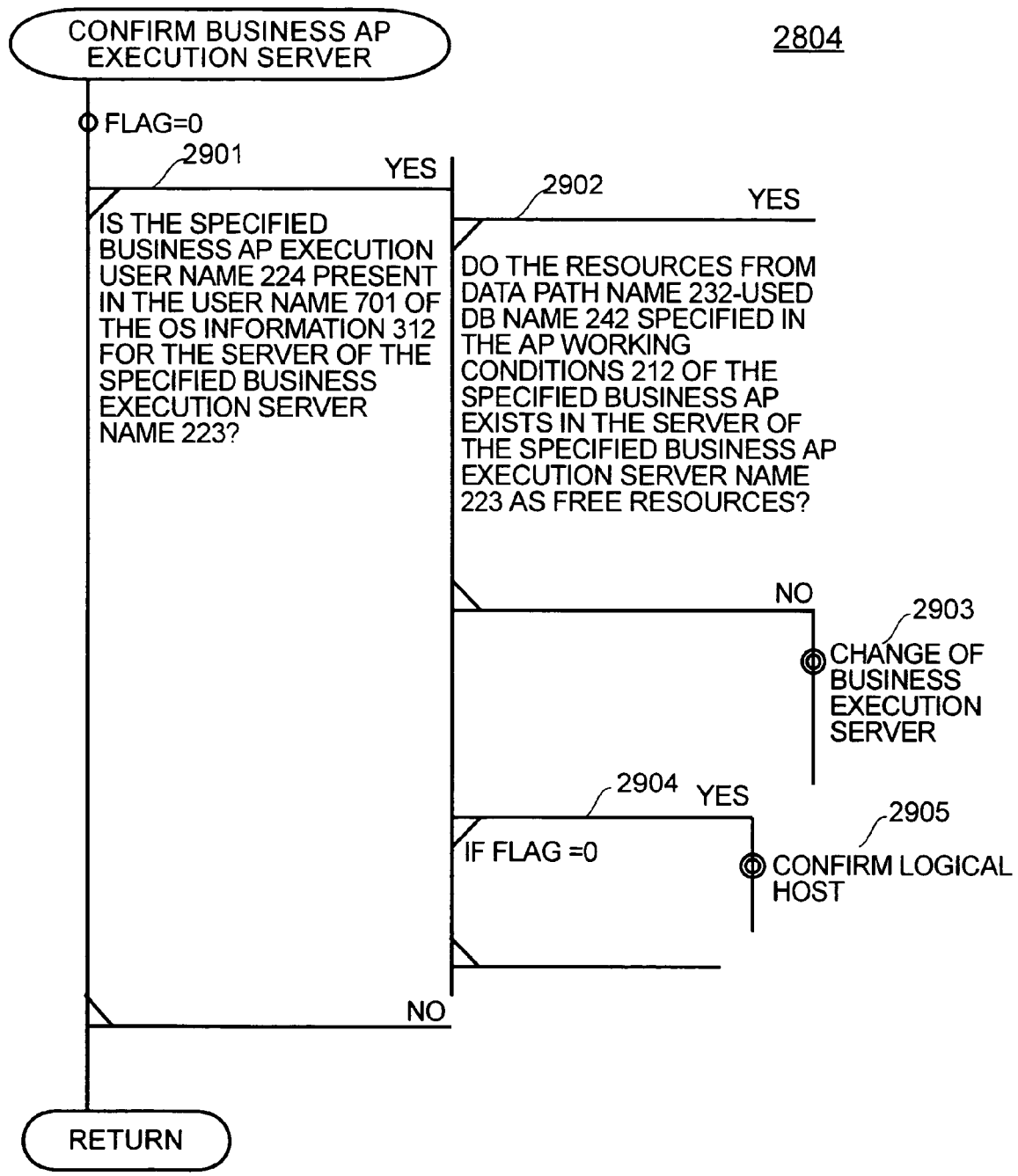
FIG. 29 shows processing for confirming a business AP execution server.

FIG. 29 illustrates confirmation processing (2804) for a business AP execution server according to the present embodiment. At step 2901, it is investigated whether or not the specified business AP execution user name 224 is present in the user names 701 contained in the OS information 312 of the server having the specified business AP execution server name 223, and if it is present then the procedure advances to step 2902.

At step 2902, it is investigated whether or not the resources of the data path name 232—used DB name 242 specified in the AP working conditions 212 of the specified business AP are present as free resources in the server of the specified business AP execution server name 223, and if they are not present, then the procedure advances to step 2903. At step 2903, processing for changing the business execution server is implemented.

At step 2904, it is investigated whether or not the flag is "0", and if the flag is "0", then the procedure advances to step 2905, where logical host confirmation processing is carried out.

Figure 30:
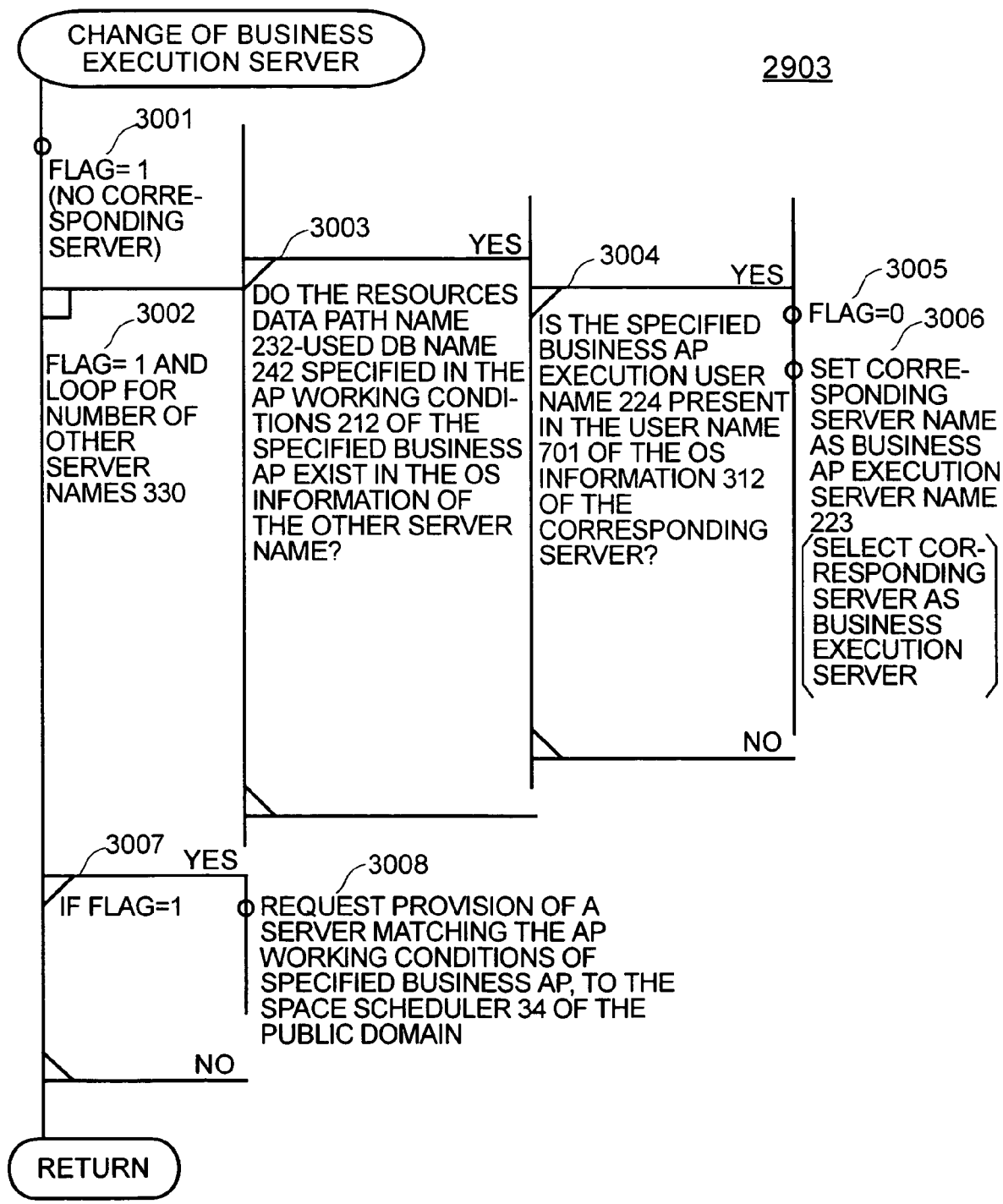
FIG. 30 shows processing for changing a business execution server.

FIG. 30 illustrates business execution server change processing (2903) according to the present embodiment. At step 3001, the flag 1 which indicates the absence of the server in question is set to "1", and at step 3002, processing is performed for a number of loops corresponding to the number of other server names 330, as long as the flag is "1".

At step 3003, it is investigated whether or not the resources of the data path name 232—used DB name 242 specified in the AP working conditions 212 of the specified business AP are present in the OS information of the other server names, and if they are present, then the procedure advances to step 3004.

At step 3004, it is investigated whether or not the specified business AP execution user name 224 is present in the user names 701 in the OS information 312 of the server in question, and if it is present, then the procedure advances to step 3005.

At step 3005, the flag is set to "0", and at step 3006, the server name is set as the business AP execution server name 223, and the server in question is selected as the business execution server.

At step 3007, it is investigated whether or not the flag is "1", and if the flag is "1", then the procedure advances to step 3008, and a request for provision of a server matching the AP working conditions of the specified business AP is made to the space scheduler 34 of the public domain.

Figure 31:
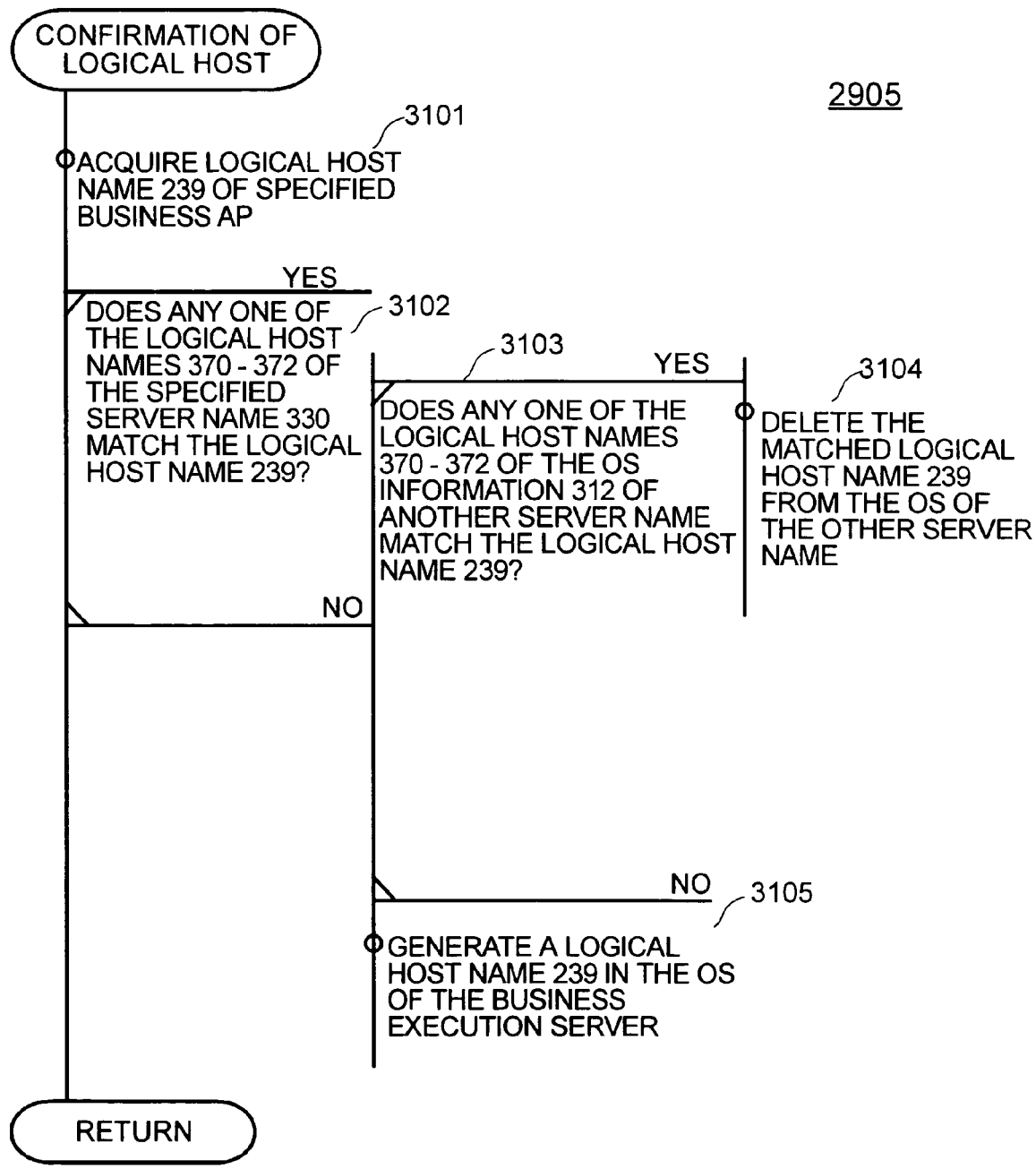
FIG. 31 illustrates the details of logical host confirmation processing.

FIG. 31 illustrates logical host confirmation processing (2905) according to the present embodiment. At step 3101, the logical host name 239 of the specified business AP is acquired.

At step 3102, it is investigated whether or not one of the logical host names 370-372 of the specified server name 330 matches this logical host name 239, and if there is no matching host name, then the procedure advances to step 3103.

At step 3103, it is investigated whether or not any of the logical host names 370-372 contained in the OS information 312 of the other server names matches the logical host name 239, and if there is a matching host name, then the procedure advances to step 3104.

At step 3104, the matched logical host name 239 is deleted from the OS of the other server names, and at step 3105, a logical host name 239 is generated in the OS of the business execution server.

Figure 32:
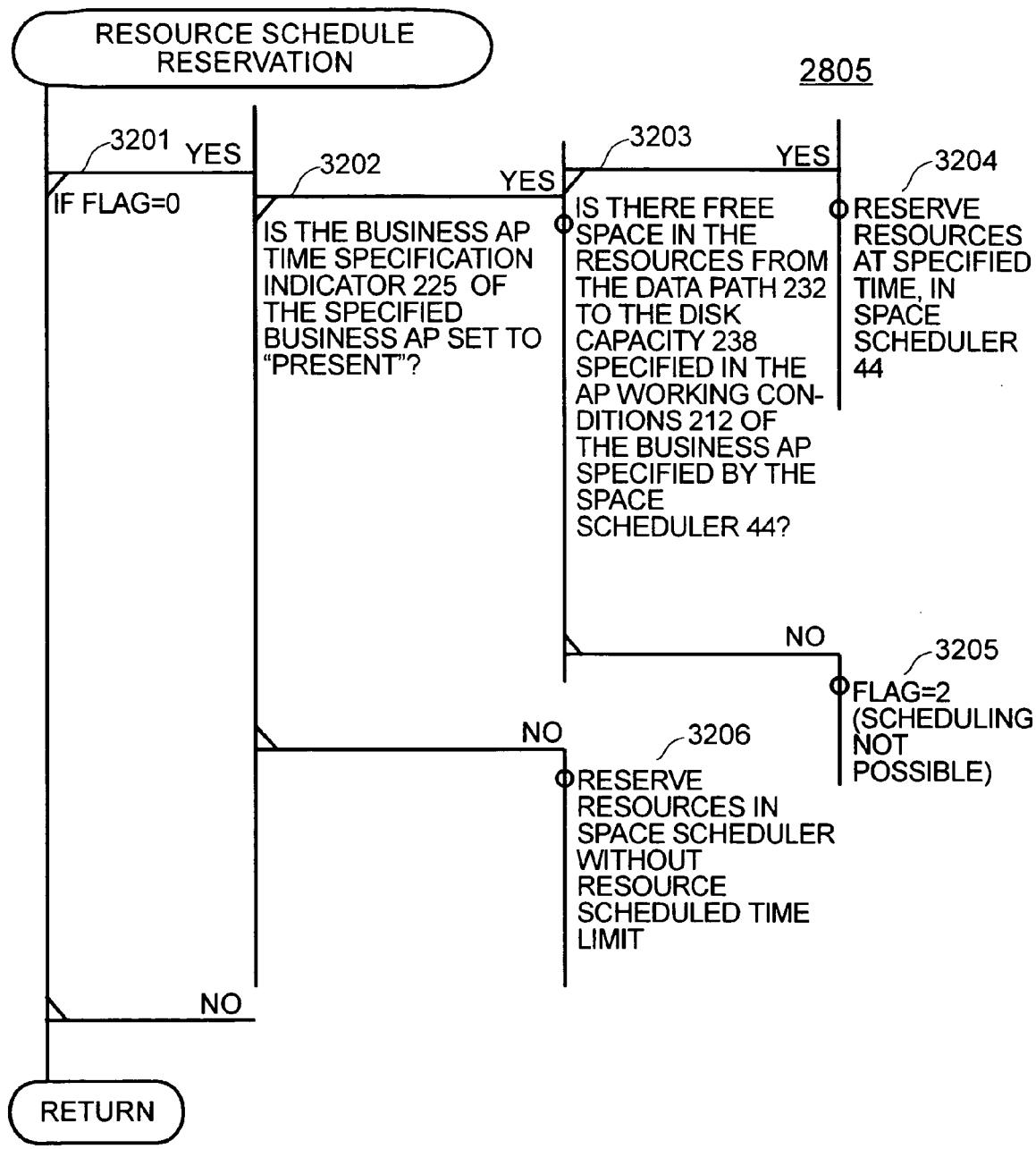
FIG. 32 shows resource schedule reservation processing.

FIG. 32 shows resource schedule reservation processing (2805) according to the present embodiment. At step 3201, it is investigated whether or not the flag is set to "0", and if the flag is "0", then the procedure advances to step 3202.

At step 3202, it is investigated whether or not the business AP time specification indicator 225 of the specified business AP is set to "present", and if it is set to "present", then the procedure advances to step 3203, whereas it this is not the case, then it advances to step 3206.

At step 3203, it is investigated whether or not there is a free space in the resources from the data path 232 to the disk capacity 238 specified by the AP working conditions 212 of the business AP specified by the space scheduler 44, and if there is such a space, then the procedure advances to step 3204, whereas if there is not, then it advances to step 3205.

At step 3204, the resource is reserved by the time specification in the space scheduler 44, and at step 3205, the flag is set to a value of "2" which indicates that scheduling was not possible.

Moreover, at step 3206, the resource is reserved in the space scheduler 44 without a resource scheduled time limit.

Next, a description is given of execution control for performing clustering by selecting resources which suit the operating conditions of a business AP which is running, by associating the composition management information of the business AP with the composition management information of the resource, in the program allocation system according to the present embodiment.

If an abnormality has been detected in a resource during the execution of the business AP 48, then the execution management processing section 45 of the private domain management server 11 according to the present embodiment locates another resource having composition management information that satisfies the operating conditions in the composition management information of the business AP 48 which has occasioned this resource abnormality, and it continues processing of the business AP 48 using the resource thus located. Thereupon, the distribution management processing section 43 distributes programs, such as the business AP 48 occasioning the resource abnormality, or the DB management system, or the like, to the real business server 49 corresponding to the located resource described above.

Figure 33:
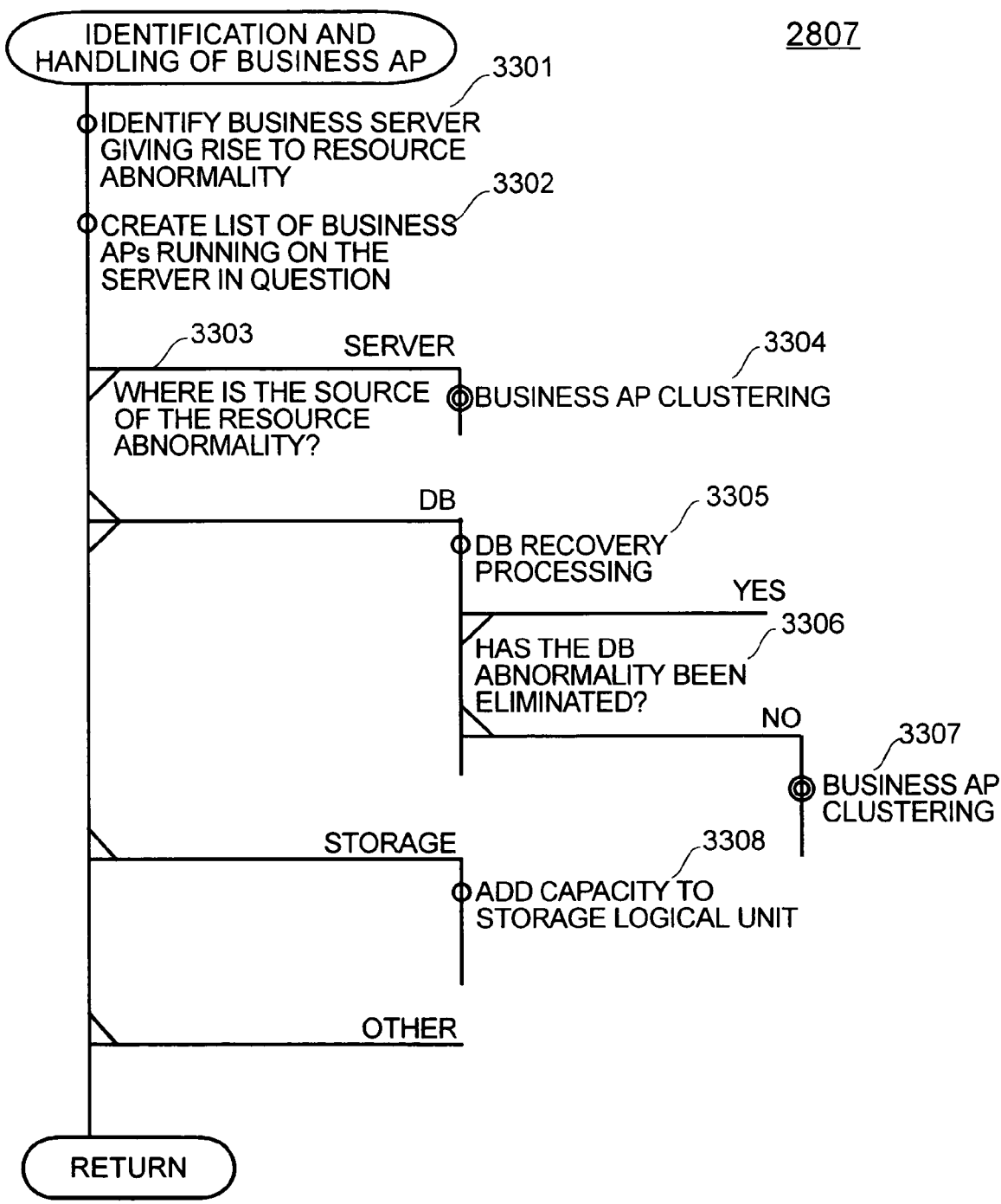
FIG. 33 illustrates processing for identifying and handling a business AP.

FIG. 33 illustrates processing (2807) for identifying and handling a business AP according to the present embodiment. At step 3301, the business server in which the resource abnormality occurred is identified, and at step 3302, a list of the business APs currently in operation on that server is created.

At step 3303, it is investigated where the resource abnormality occurred; and if it is an abnormality in the server, then the procedure advances to step 3304; if it is an abnormality in a DB, then the procedure advances to step 3305; and if it is an abnormality in a storage, then the procedure advances to step 3308.

At step 3304, processing for clustering business APs is carried out.

At step 3305, DB recovery processing is carried out, and at step 3306, it is investigated whether or not the DB abnormality has been eliminated by means of this recovery processing, and if it has not been eliminated, then at step 3307, processing for clustering the business APs is carried out.

Moreover, at step 3308, the capacity of the storage logical unit is added.

Figure 34:
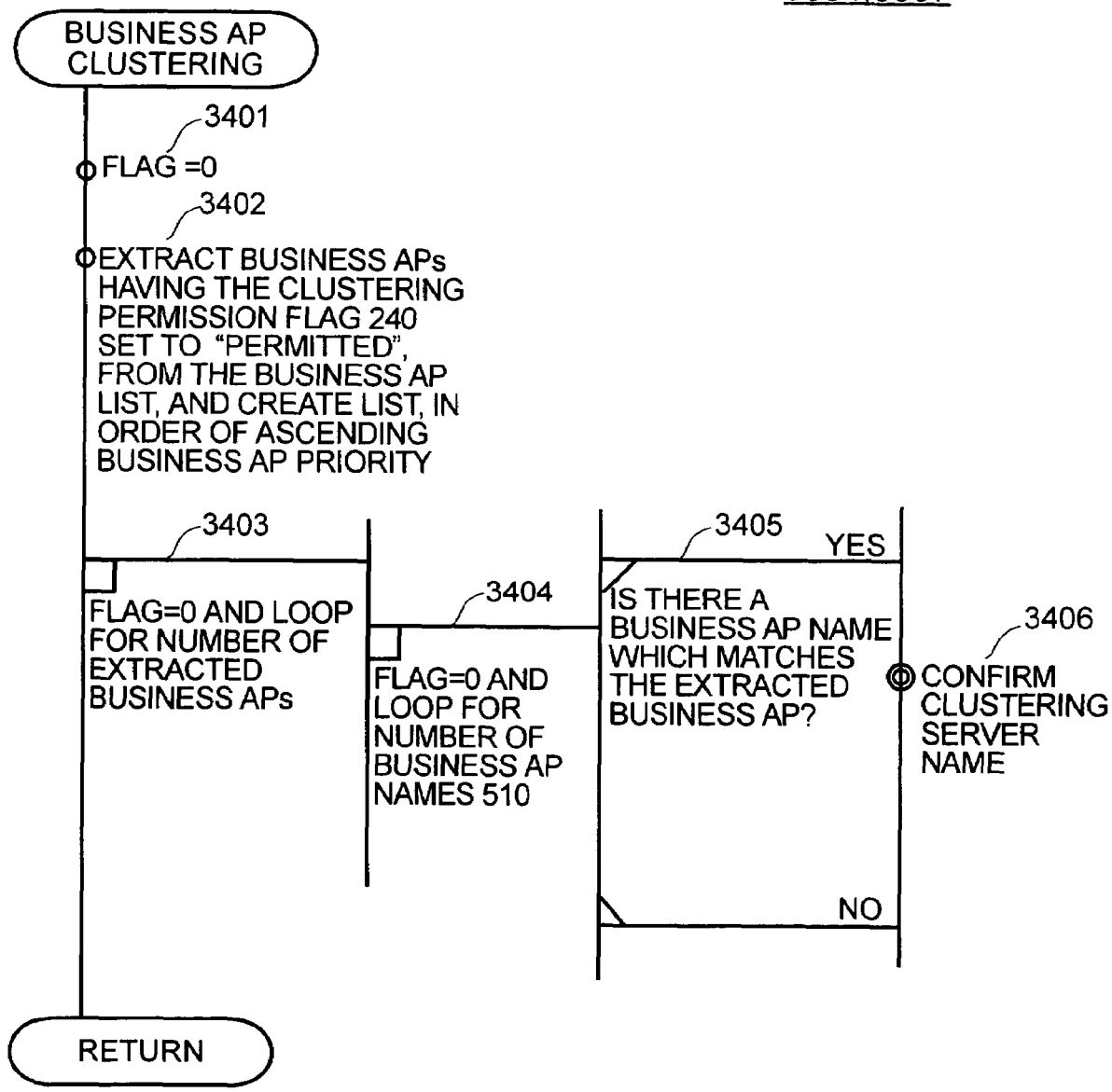
FIG. 34 illustrates a business AP clustering process.

FIG. 34 illustrates a business AP clustering process (3304, 3307) according to the present embodiment. At step 3401, the flag is set to "0"; and at step 3402, the business APs having a clustering permission flag 240 set to "permitted" are extracted from the list of business APs and the extracted business APs are listed in order of priority, starting from the business AP of lowest AP priority.

At step 3403, processing is performed for a number of loops corresponding to the number of extracted business APs, as long as the flag is "0", and at step 3404, processing is performed for a number of loops corresponding to the number of business AP names 510, as long as the flag is "0".

At step 3405, it is investigated whether or not there is a business AP name which matches the extracted business AP, and if there is a matching name, then the procedure advances to step 3406. At step 3406, processing for confirming the clustering server name is implemented.

Figure 35:
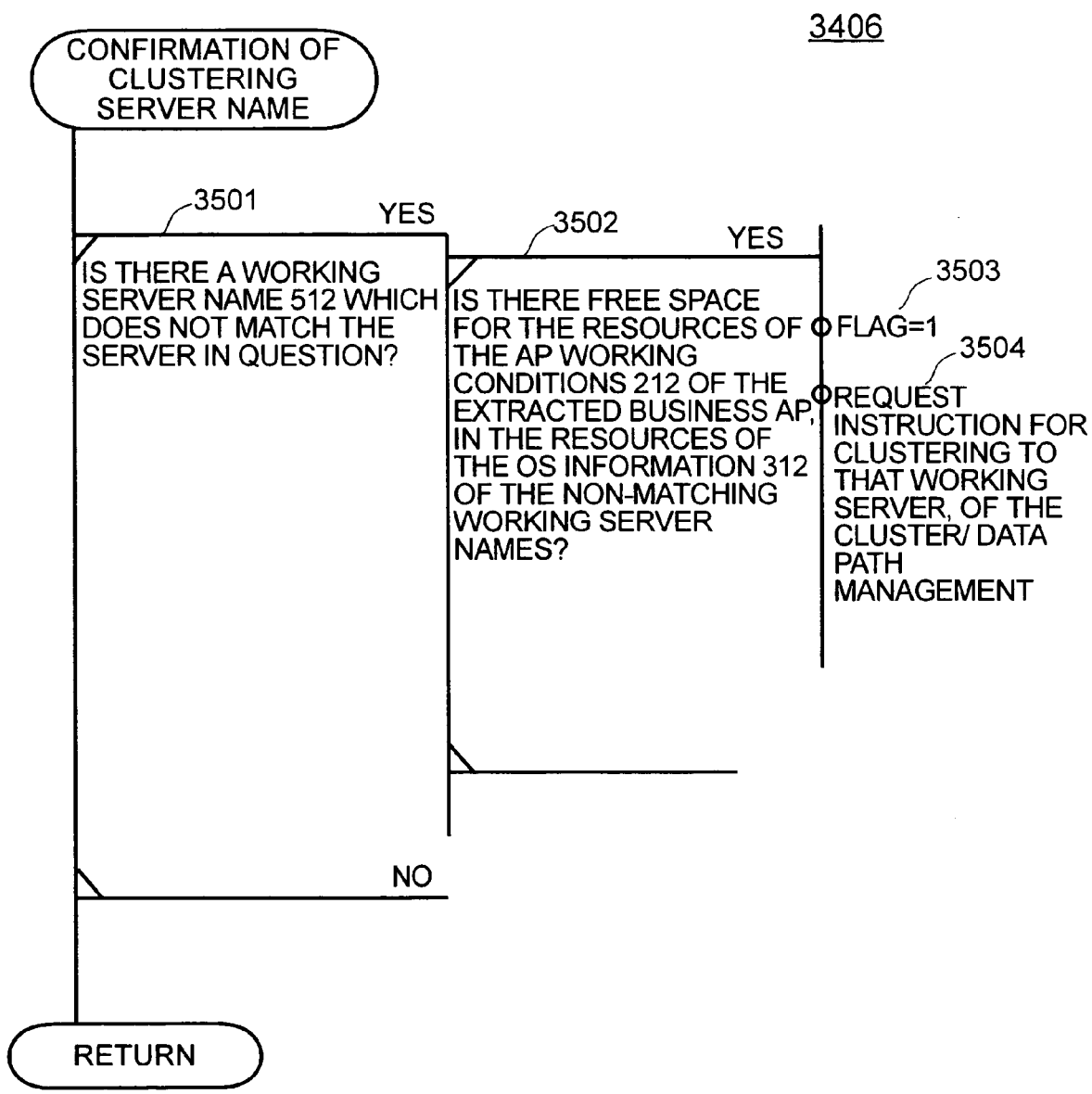
FIG. 35 illustrates clustering server name confirmation processing.

FIG. 35 illustrates clustering server name confirmation processing (3406) according to the present embodiment. At step 3501, it is investigated whether or not there is a working server name which matches the server in question, and if there is, then the procedure advances to step 3502.

At step 3502, it is investigated whether or not there is a free space for the AP working conditions 212 of the extracted business AP in the resource of the OS information 312 of the non-matching working server names, and if there is such free space, then the procedure advances to step 3503.

At step 3503, flag 1 is set to "1"; and at step 3504, an instruction for clustering to the working server in question is requested to the cluster/data path management processing section 46.

Next, a description is given of processing in the program allocation system according to the present embodiment, whereby surplus resources are managed by means of a private domain and public domain, and surplus resources which suit the operating conditions are provided upon start up of a business AP or in the event of a resource abnormality.

Figure 36:
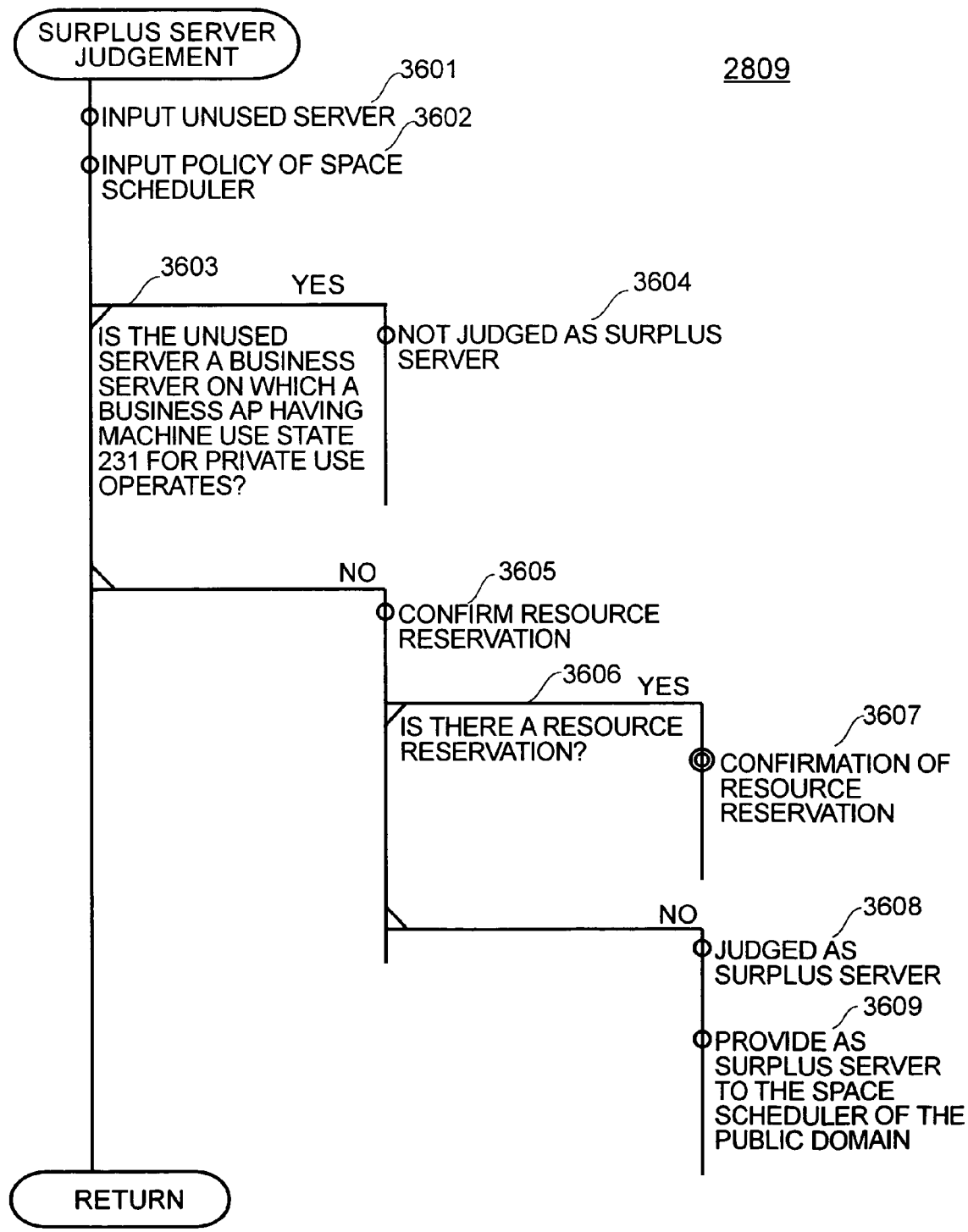
FIG. 36 shows processing for judging a surplus server.

FIG. 36 illustrates surplus server judgment processing (2809) according to the present embodiment. As shown in FIG. 36, the space scheduler 44 of a private domain management server 11 determines surplus resources.

At step 3601, an unused server is inputted; and at step 3602, the policy of the space scheduler 44 is inputted.

At step 3603, it is investigated whether or not the unused server is a business server on which a business AP having a machine use status 231 set to private use is run, and if it is a business server on which a private use business AP is run, then the procedure advances to step 3604 and returns to the source of the call, without that server being set as a surplus server.

At step 3605, the contents of the resource reservation are read out, and at step 3606, it is investigated whether or not there is a resource reservation for that server, and if there is a resource reservation, then the procedure advances to step 3607, whereas if there is no resource reservation, then the procedure advances to step 3608.

At step 3607, processing for confirming the resource reservation is implemented. Furthermore, at step 3608, the server is judged to be a surplus server, and at step 3609, the composition management information thereof is provided to the space scheduler 34 of the public domain 1 as surplus server information.

Figure 37:
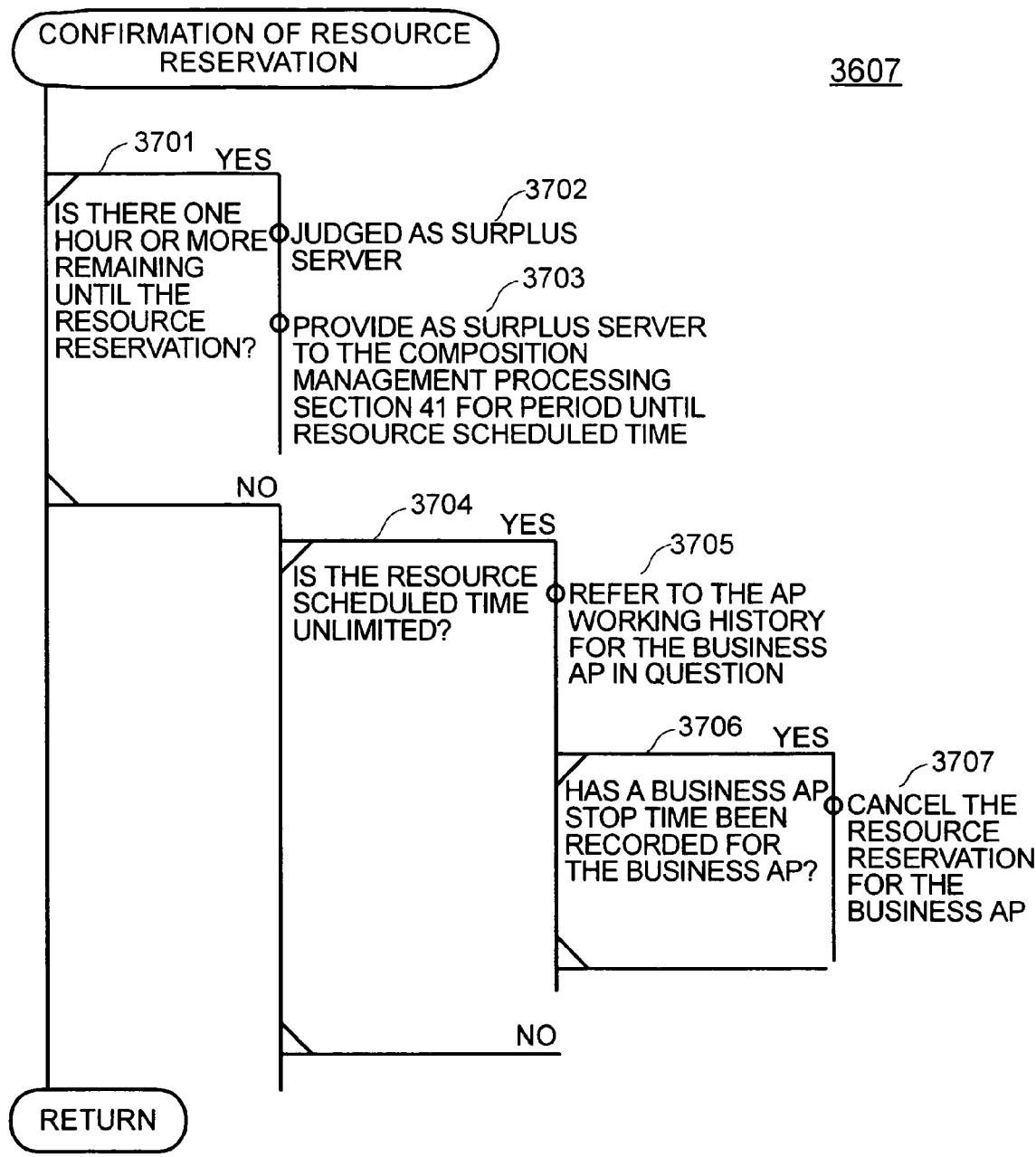
FIG. 37 illustrates resource reservation confirmation processing.

FIG. 37 illustrates resource reservation confirmation processing (3607) according to the present embodiment. At step 3701, it is investigated whether or not there remains one hour or more until the resource reservation, and if there remains one hour or more, then the procedure advances to step 3702.

At step 3702, the server is judged to be a surplus server; and at step 3703, it is supplied to the composition management processing section 41 as a surplus server for the period until the resource scheduled time.

At step 3704, it is investigated whether or not the resource scheduled time is limitless, and if it is limitless, then the procedure advances to step 3705.

At step 3705, the AP working history 213 of the business AP in question is referenced; and at step 3706, it is investigated whether or not a business AP stop time 259 for the business AP is recorded, and if a business AP stop time 259 has been recorded, then the procedure advances to step 3707 and the resource reservation for the business AP in question is cancelled.

Figure 38:
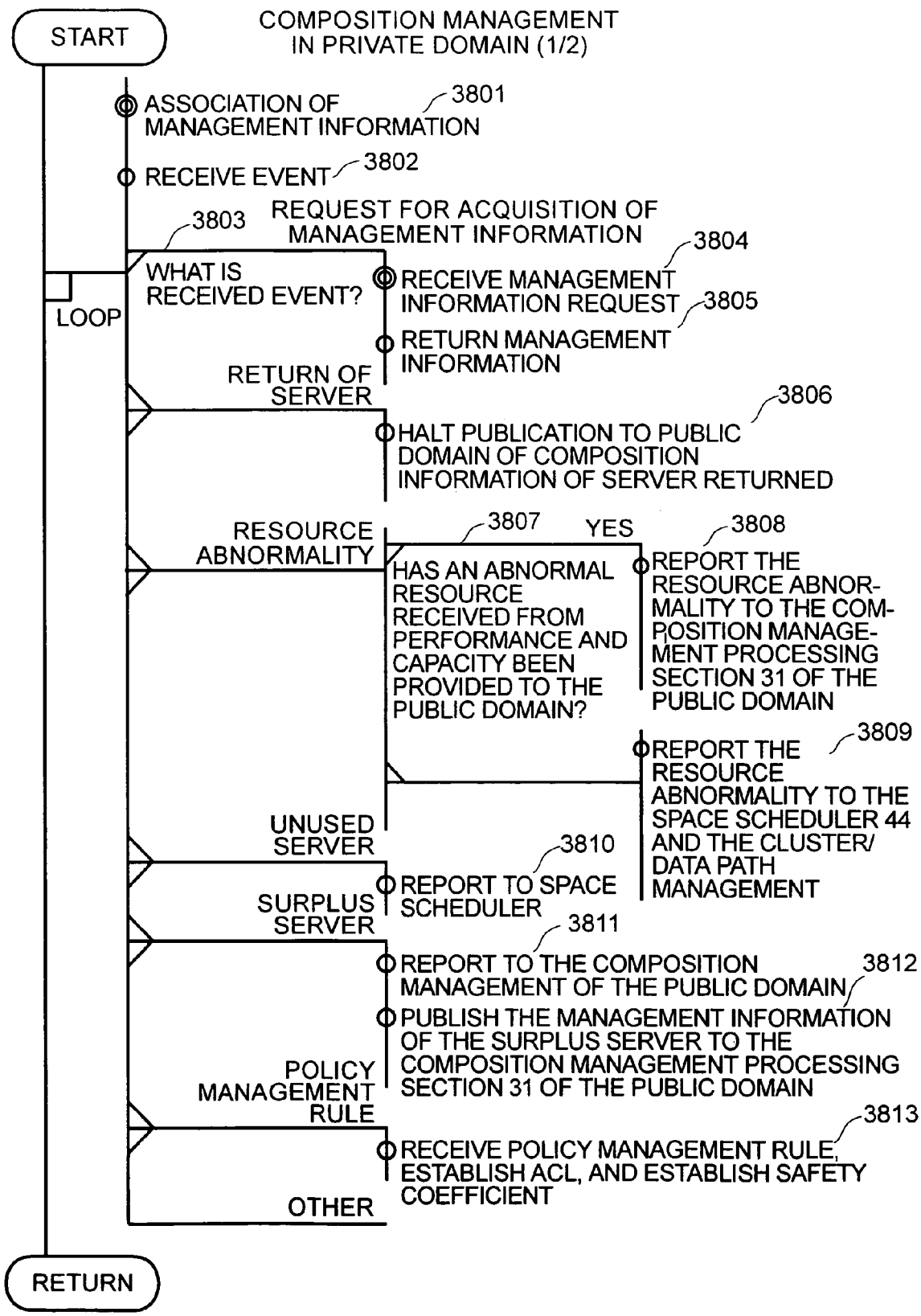
FIG. 38 illustrates the processing of the composition management processing section 41 of the private domain 2.

FIG. 38 illustrates the processing of the composition management processing section 41 of the private domain 2 according to the present embodiment. At step 3801, processing for associating management information is carried out.

At step 3802, an event is received; and at step 3803, the contents of the received event are investigated; and if the received event is a request for acquisition of management information, then the procedure advances to step 3804; if it is the return of a server, then the procedure advances to step 3806; if it is a resource abnormality, then the procedure advances to step 3807; if it is an unused server, then the procedure advances to step 3810; if it is a surplus server, then the procedure advances to step 3811; and if it is a policy management rule, then the procedure advances to step 3813.

At step 3804, processing for receiving the management information request is implemented; and at step 3805, management information is sent back to the source of the request.

At step 3806, the publication to the public domain of the composition management information of the returned server is halted.

At step 3807, it is investigated whether or not the abnormal resource received from the performance and capacity management processing section 47 has been provided to the public domain, and if it has been provided, then the procedure advances to step 3808, whereas if it has not, then the procedure advances to step 3809.

At step 3808, the resource abnormality is reported to the composition management processing section 31 of the public domain; and at step 3809, the resource abnormality is reported to the space scheduler 44 and the cluster/data path management processing section 46.

At step 3810, the unused server is reported to the space scheduler 44.

At step 3811, the surplus server is reported to the composition management processing section 31 of the public domain; and at step 3812, the management information of the surplus server is published to the composition management processing section 31 of the public domain 1.

At step 3813, the policy management rules are received and ACL settings and safety coefficients are established.

Figure 39:
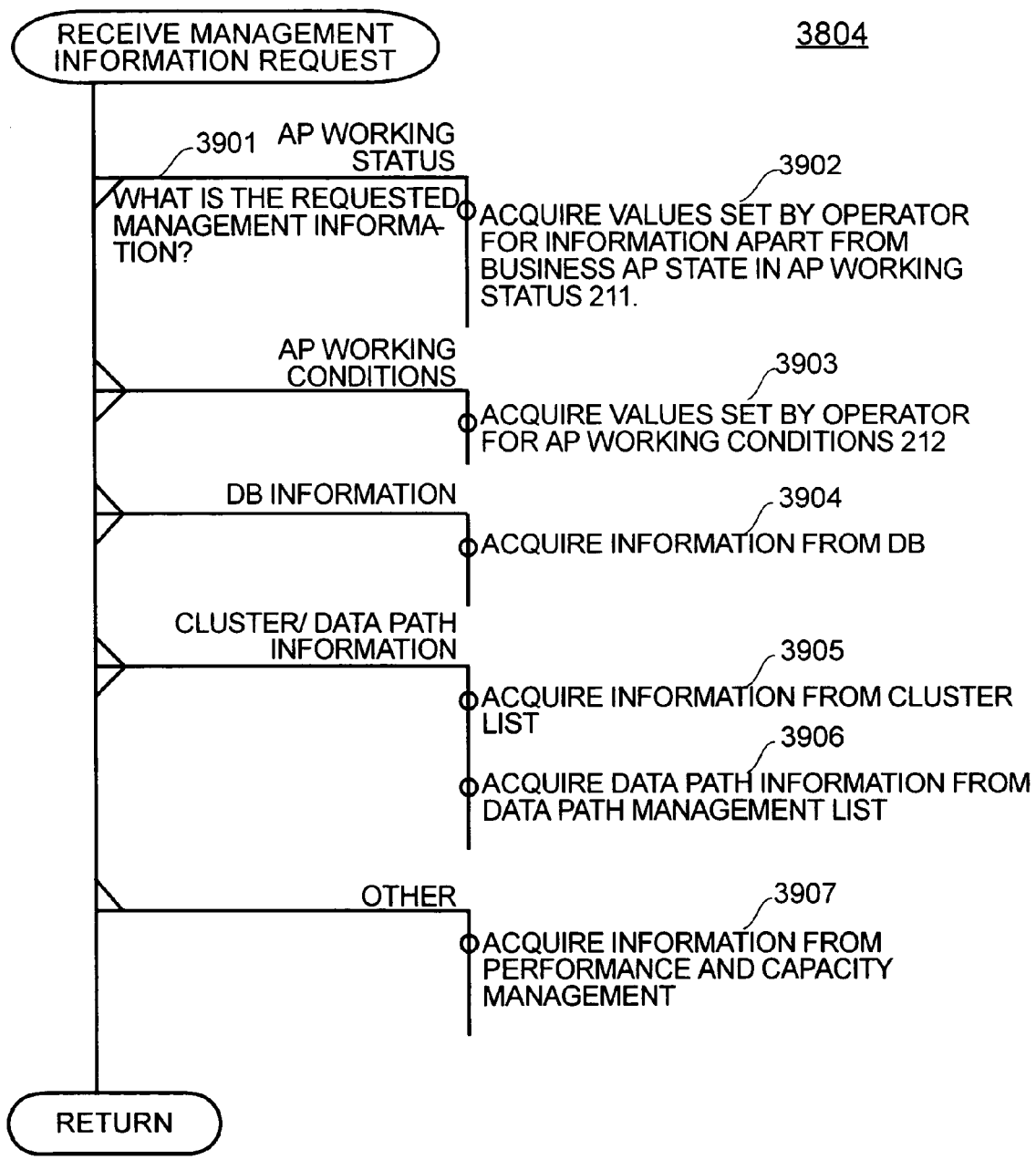
FIG. 39 shows management information request reception processing.

FIG. 39 shows management information request reception processing (3804) according to the present embodiment. At step 3901, the contents of the requested management information are investigated; and if the requested management information is the AP working status, then the procedure advances to step 3902; if it is the AP working conditions, then the procedure advances to step 3903; if it is the DB information, then the procedure advances to step 3904; if it is the cluster/data path information, then the procedure advances to step 3905; and if it is other information, then the procedure advances to step 3907.

At step 3902, values set by the operator are acquired for information apart from the business AP state in the AP working status 211; and at step 3903, values set by the operator are acquired for the AP working conditions 212.

Moreover, at step 3904, information is acquired from the DB; at step 3905, information is acquired from the cluster management program; at step 3906, data path information is acquired from the data path management program; and at step 3907, information is acquired from the performance and capacity management processing section 47.

The composition management processing section 31 of the public domain management server 21 according to the present embodiment receives composition management information for a resource which correspond to the rules for detecting surplus resources, from the composition management processing section 41 in the private domain 2, and it holds and manages this information as composition management information for a virtual resource 38 in the public domain 1.

Figure 40:
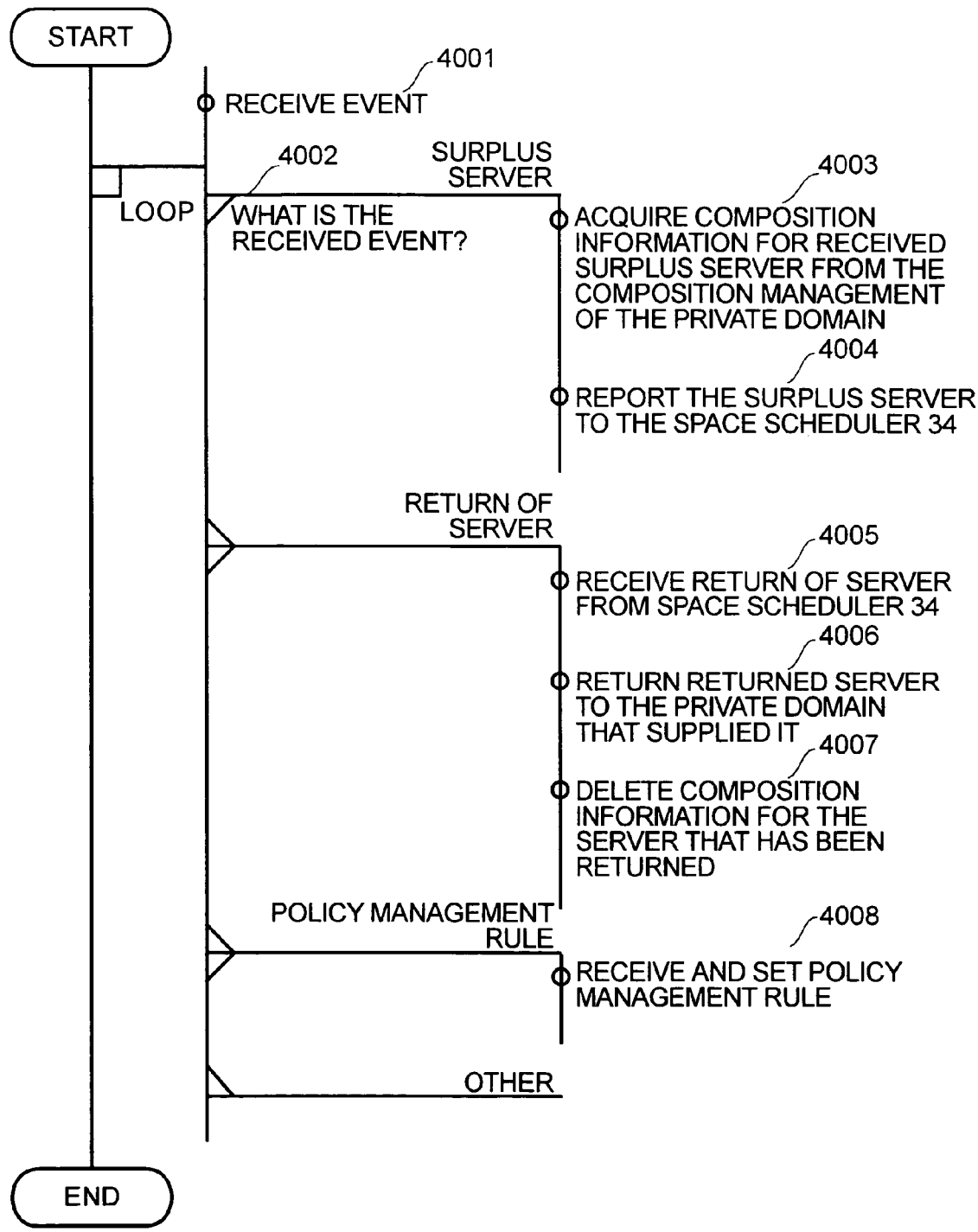
FIG. 40 illustrates the processing of the composition management processing section 31 of the public domain 1.

FIG. 40 illustrates the processing of the composition management processing section 31 of the public domain 1 according to the present embodiment. At step 4001, an event is received, and at step 4002, the received event is investigated; and if the received event is a surplus server, then the procedure advances to step 4003; if it is the return of a server, then the procedure advances to step 4005; and if it is a policy management rule, then the procedure advances to step 4008.

At step 4003, the composition information for the received surplus server is acquired from the composition management processing section 41 of the private domain 2.

At step 4004, the surplus server is reported to the space scheduler 34; at step 4005, the return of the server is received from the space scheduler 34; and at step 4006, the server to be returned is returned to the private domain 2 from which it was supplied. Moreover, at step 4007, the composition information for the server that has been returned is deleted; and at step 4008, the policy management rules are received and established.

If a resource having composition management information that satisfies the operating conditions of the business AP 48 is not found, then the space scheduler 34 of the public domain management server 21 receives a request to supply the transmitted resource from the space scheduler 44 on the private domain 2 side, and sends composition management information satisfying the operating conditions of the business AP 48 within the composition management information of the aforementioned virtual resources it is holding and managing.

Figure 41:
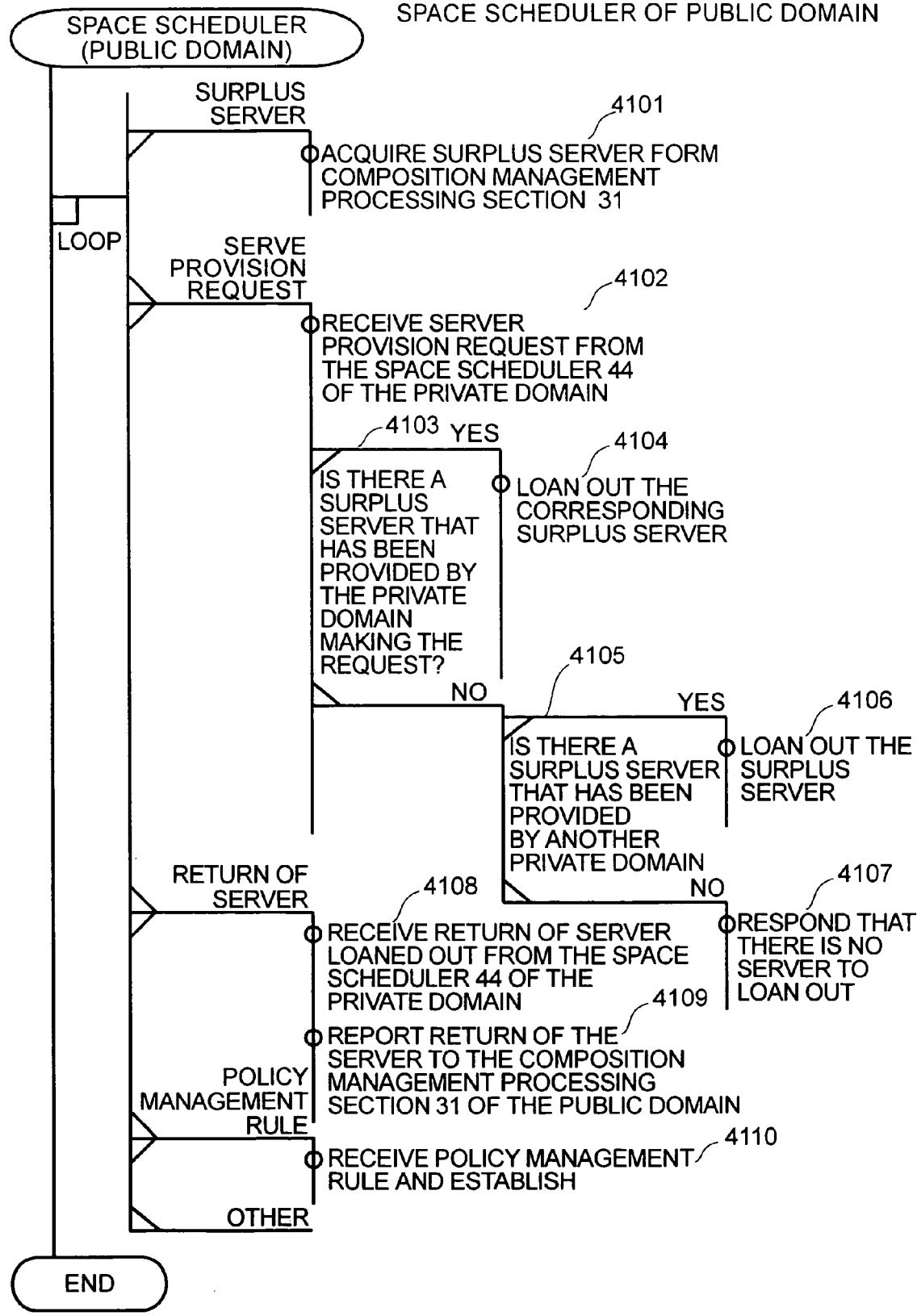
FIG. 41 illustrates processing in the space scheduler 34 of the public domain 1.

FIG. 41 illustrates the processing of the space scheduler 34 of the public domain 1 according to the present embodiment. At step 4101, the surplus server is acquired from the composition management processing section 31.

At step 4102, a server provision request is received from the space scheduler 44 of the private domain 2; at step 4103, it is investigated whether or not there is a surplus server provided by the requested private domain 2, and if there is, then the procedure advances to step 4104, whereas if there is not, then the procedure advances to step 4105.

At step 4104, the surplus server in question is loaned out; and at step 4105, it is investigated whether or not there is a surplus server provided by another private domain 2, and if there is, then the procedure advances to step 4106, whereas if there is not, then the procedure advances to step 4107. At step 4106, the surplus server is loaned out; and at step 4107, a report indicating that there is no loanable server is returned.

At step 4108, the return of a server that was loaned out by the space scheduler 44 of the private domain 2 is received; and at step 4109, the return of the server is reported to the composition management processing section 31 of the public domain 1.

Furthermore, at step 4110, the policy management rules are received and set.

Figure 42:
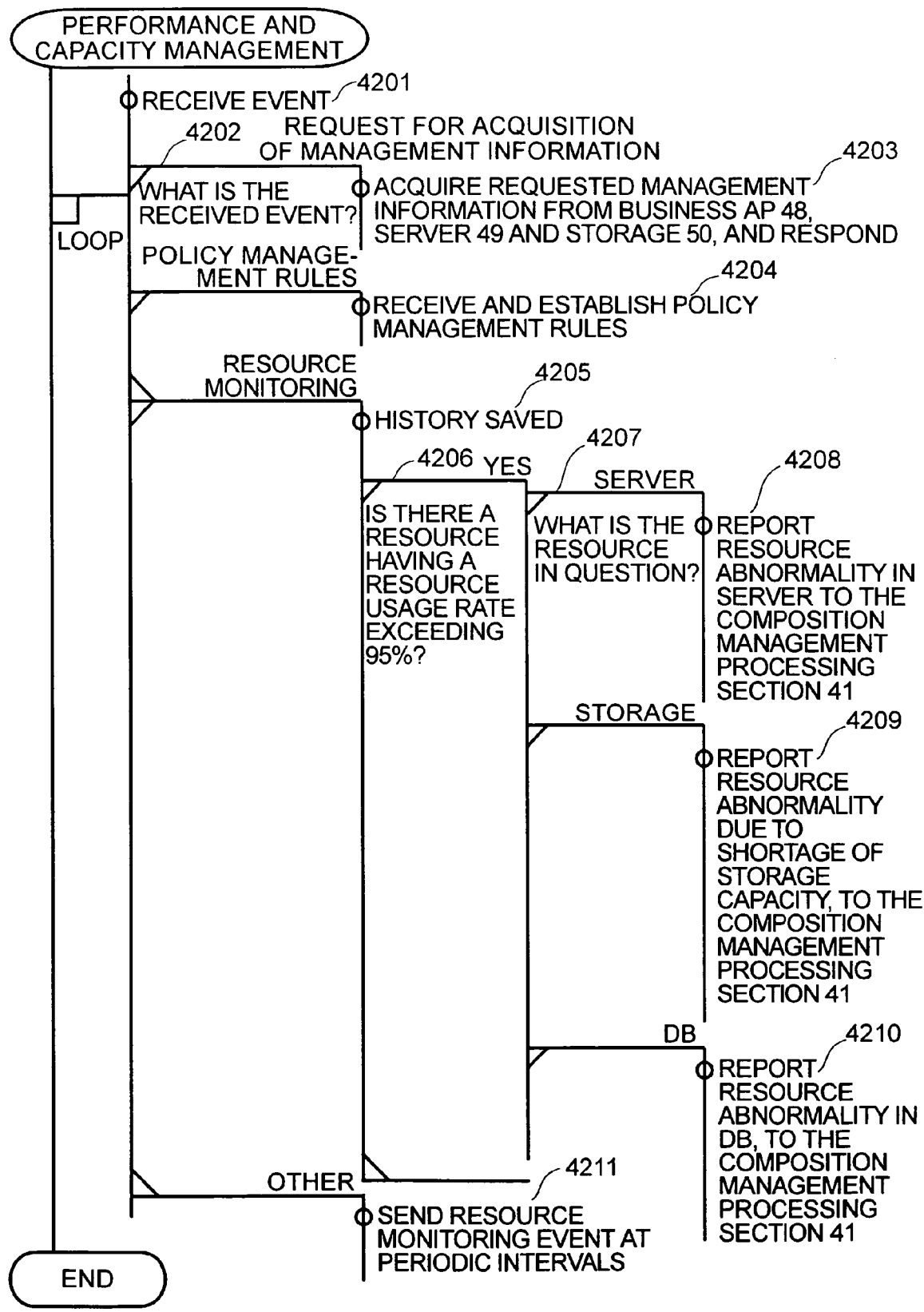
FIG. 42 illustrates the processing of the performance and capacity management processing section 47 of the private domain 2.

FIG. 42 illustrates the processing of the performance and capacity management processing section 47 of the private domain 2 according to the present embodiment. As shown in FIG. 42, the performance and capacity management processing section 47 gathers and administers management information indicating states relating to the performance of the respective servers 49 and the capacity of the storage 50, and the like.

At step 4201, an event is received; and at step 4202, the received event is investigated; and if the received event is a request for acquisition of management information, then the procedure advances to step 4203; whereas if it is a policy management rule, then the procedure advances to step 4204; if it is resource monitoring, then the procedure advances to step 4205; and if it is another kind of event, then the procedure advances to step 4211.

At step 4203, the requested management information is acquired respectively from the business AP 48, servers 49 and storages 50, and is sent as a response. Furthermore, at step 4204, the policy management rules are received and set.

At step 4205, the history is saved; and at step 4206, it is investigated whether or not there are any resources having a resource usage rate which has exceeded 95%, and if there are, then the procedure advances to step 4207. This value of a 95% resource usage rate can be changed by means of the policy management rules.

At step 4207, the resource in question is investigated; and if this resource is a server, then the procedure advances to step 4208; whereas if it is a storage then the procedure advances to step 4209; and if it is a DB, then the procedure advances to step 4210.

At step 4208, a resource abnormality in a server is reported to the composition management processing section 41; at step 4209 a resource abnormality due to shortage of storage capacity is reported to the composition management processing section 41; and at step 4210, a resource abnormality in a DB is reported to the composition management processing section 41.

Moreover, at step 4211, a resource monitoring event is sent at periodic time intervals.

Figure 43:
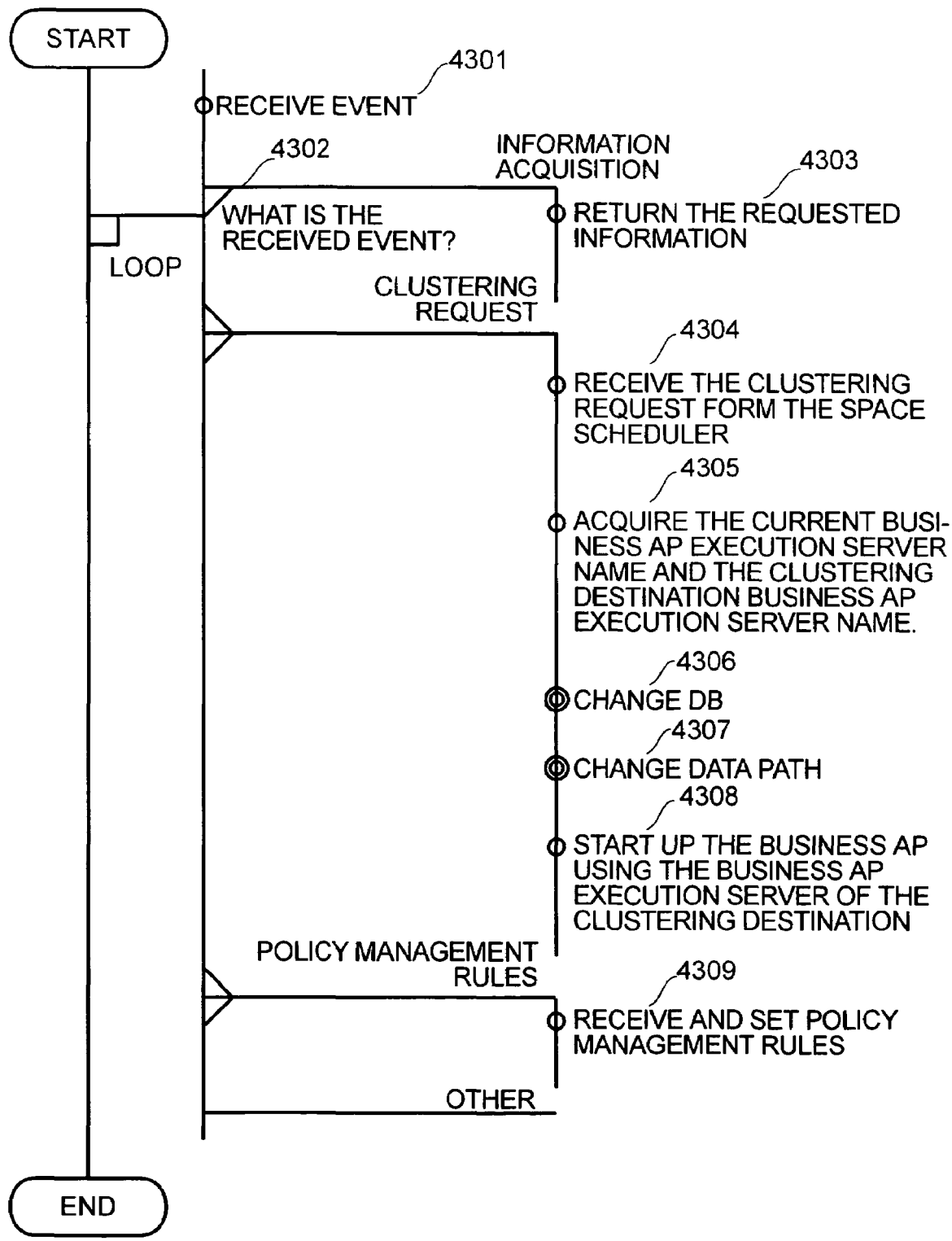
FIG. 43 illustrates the processing of the cluster/data path management processing section 46 of the private domain 2.

FIG. 43 illustrates the processing of the cluster/data path management processing section 46 of the private domain 2 according to the present embodiment. As shown in FIG. 43, the cluster/data path management processing section 46 of the private domain management server 11 manages the composition and state of the cluster management program, and manages the composition and state of the data path between the server 49 held by the data path management program and the storage 50, and instructions for changes in the data path.

At step 4301, an event is received; and at step 4302, the received event is investigated; and if the received event is information acquisition, then the procedure advances to step 4303; if it is a clustering request, then the procedure advances to step 4304; and if it is a policy management rule, then the procedure advances to step 4309.

At step 4303, the requested information is sent as a response.

At step 4304, a clustering request is received from the space scheduler 44; and at step 4305, the current business AP execution server name and the business AP execution server name of the clustering destination are acquired.

At step 4306, DB change processing is implemented; and at step 4307, data path change processing is implemented. Furthermore, at step 4308, the business AP is started up with the business AP execution server of the clustering destination.

At step 4309, the policy management rules are received and set.

Figure 44:
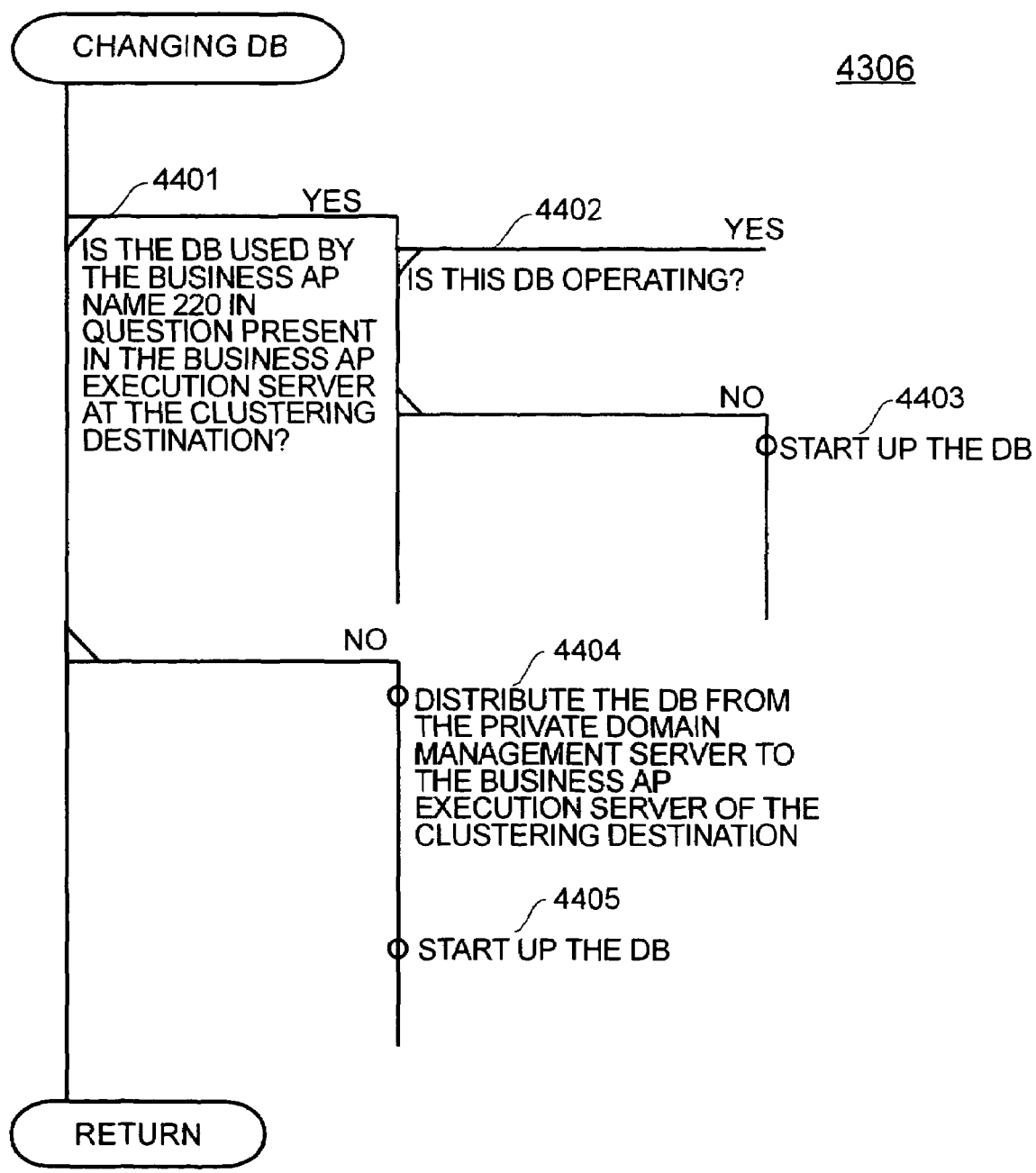
FIG. 44 shows DB change processing.

FIG. 44 illustrates DB change processing (4306) according to the present embodiment. At step 4401, it is investigated whether or not the DB used by the business AP 220 in question is present in the clustering destination business AP execution server, and if it is present, then the procedure advances to step 4402.

At step 4402, it is investigated whether or not the DB in question is operating, and if it is not operating, then the procedure advances to step 4403, and the DB is started up.

At step 4404, the DB is distributed from the private domain management server 11 to the clustering destination business AP execution server; and at step 4405, the DB is started up.

Figure 45:
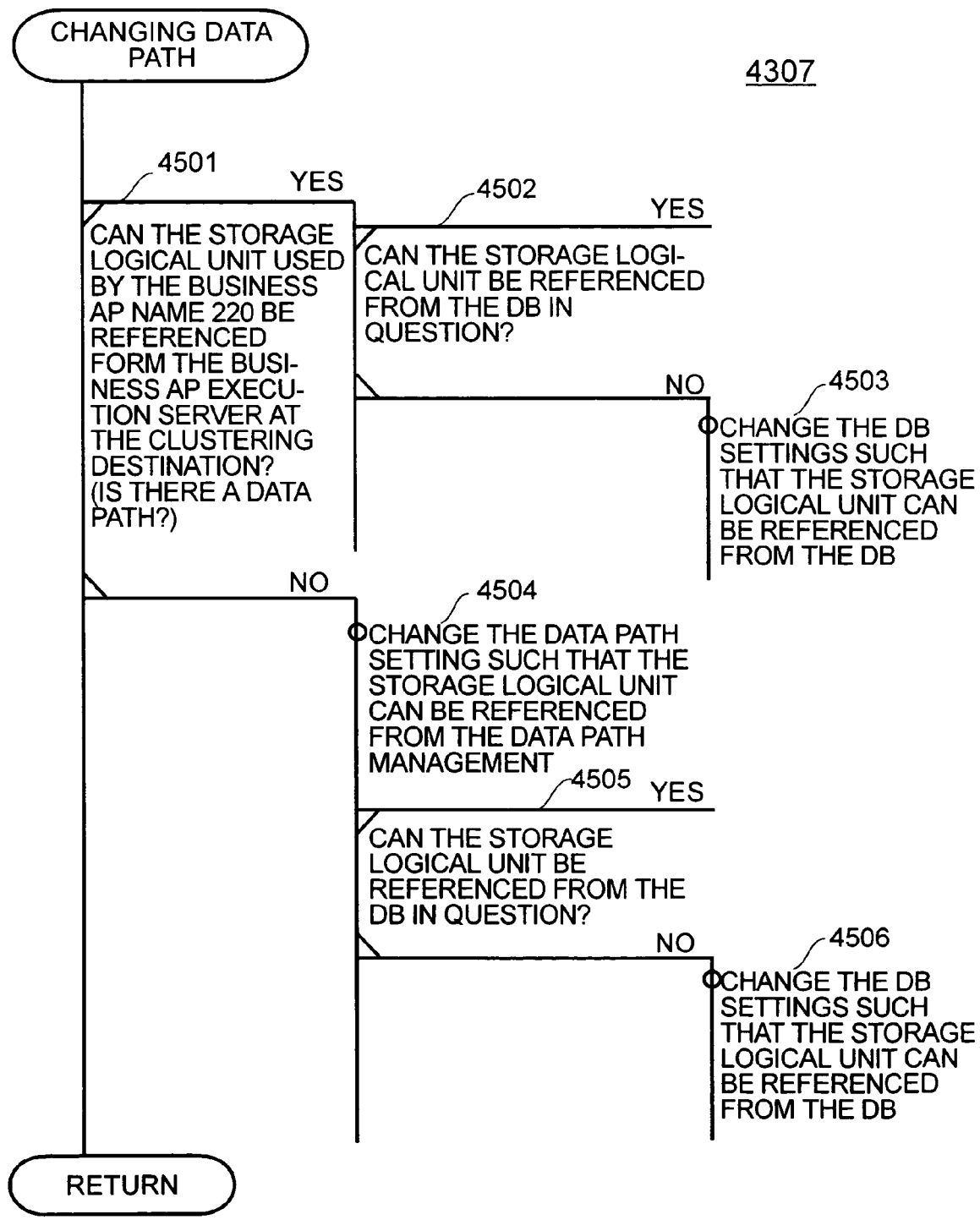
FIG. 45 shows data path change processing.

FIG. 45 illustrates data path change processing (4307) according to the present embodiment. At step 4501, it is investigated whether or not the storage logical unit used by the business AP 220 in question can be referenced from the clustering destination business AP execution server, (whether or not there is a data path), and if it can be referenced, then the procedure advances to step 4502.

At step 4502, it is investigated whether or not the storage logical unit can be referenced from the DB in question, and if it cannot be referenced, then the procedure advances to step 4503, and the DB setting is changed such that the storage logical unit can be referenced from the DB.

At step 4504, the data path settings are changed such that the storage logical unit can be referenced from the data path management. At step 4505, it is investigated whether or not the storage logical unit can be referenced from the DB in question, and if it cannot be referenced, then the procedure advances to step 4506, and the DB setting is changed such that the storage logical unit can be referenced from the DB.

Next, a description is given of processing in the program allocation system according to the present embodiment whereby changes in the operating state of resources are predicted and policy management rules are modified.

Figure 46:
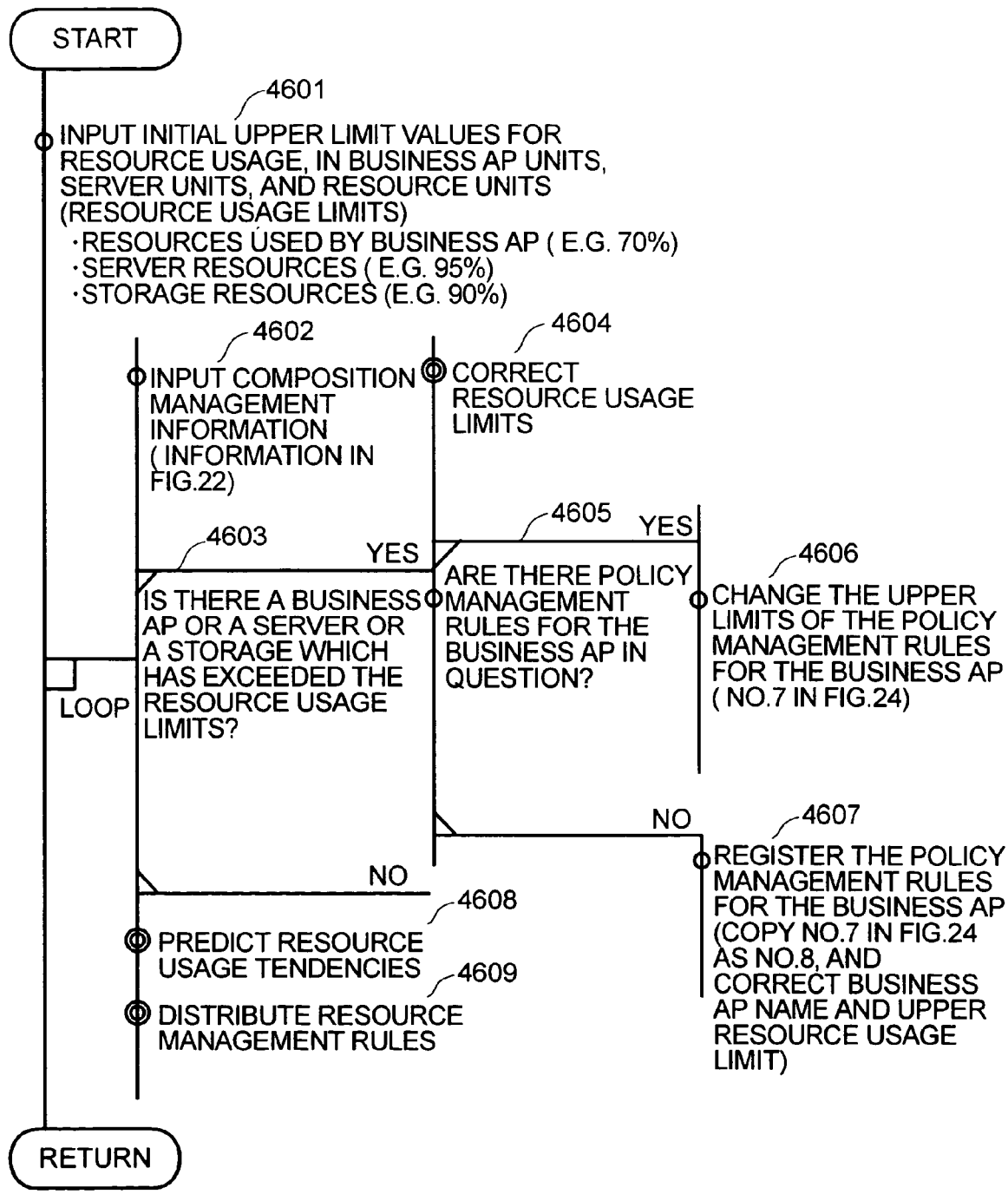
FIG. 46 shows policy management processing which reflects the prediction results.

FIG. 46 shows policy management processing which reflects the prediction results according to the present embodiment. At step 4601, the initial values of upper limits for resource usage are input in business AP units, server units and resource units.

At step 4602, the composition management information is inputted; and at step 4603, it is investigated whether or not there is a business AP, server or storage that exceeds the resource usage limit, and if there is, then the procedure advances to step 4604.

At step 4604, processing for correcting the resource usage limit is implemented. At step 4605, it is investigated whether or not there exist policy management rules for the business AP in question, and if they do exist, then the procedure advances to step 4606, whereas if they do not exist, then the procedure advances to step 4607.

At step 4606, the upper limit of the policy management rules for the business AP is modified; and at step 4607, the policy management rules for the business AP are registered.

At step 4608, processing for predicting the resource usage tendency is implemented; and at step 4609, processing for distributing the resource management rules is carried out.

Figures 47, 48:
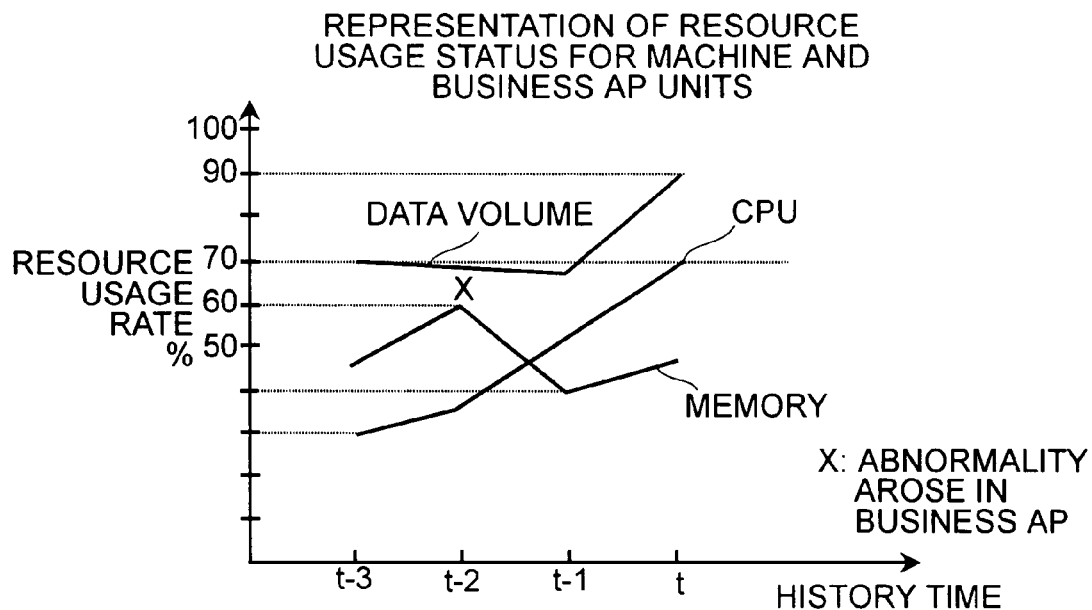
FIG. 47 shows an example of the grasping of resource usage statuses in machine and business AP units.
FIG. 48 shows an example of the permitted ranges for resource usage, in machine and business AP units.

FIG. 47 shows an example of the representation of resource usage statuses for machine and business AP units according to the present embodiment. As shown in FIG. 47, in the present embodiment, the resource usage status is indicated from the history information, such that the resource usage statuses for machine and business AP units can be perceived.

FIG. 48 shows an example of representation of permitted ranges for resource usage, in machine and business AP units, according to the present embodiment. As shown in FIG. 48, in the present embodiment, the permitted resource usage ranges are determined from the resource usage rates, in machine and business AP units, and the upper limits are set according to these permitted ranges.

Figure 49:
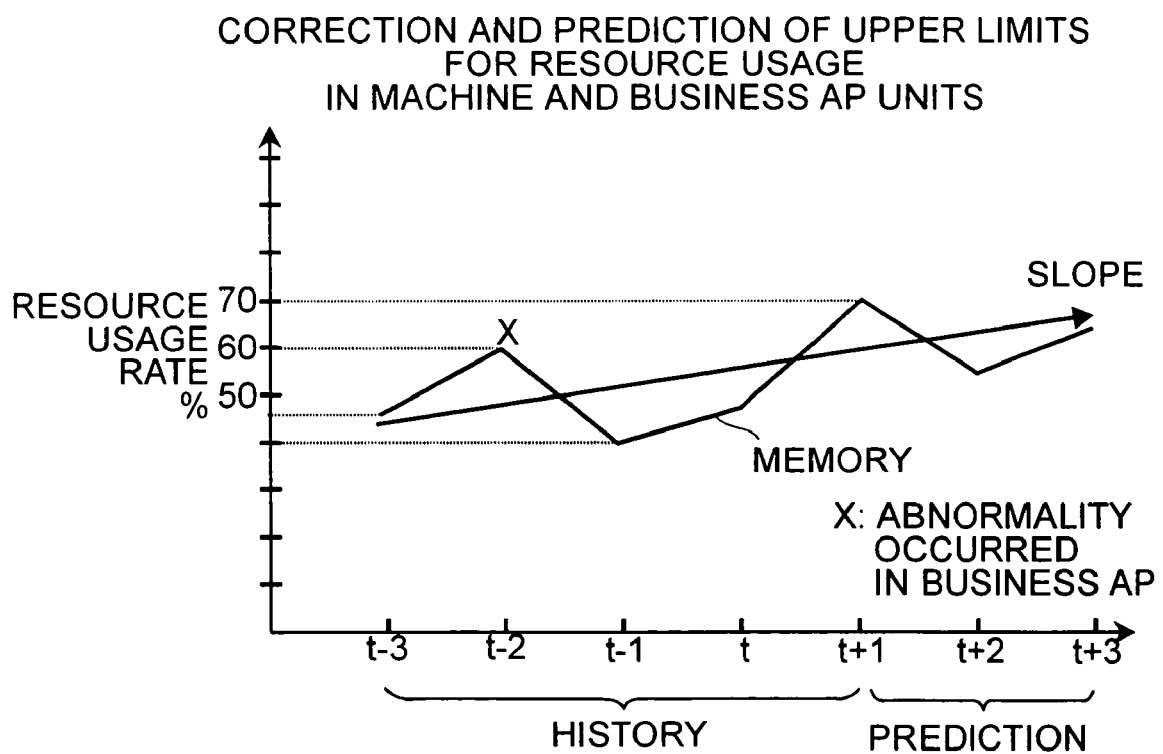
FIG. 49 shows an example of correction of the upper resource usage limits, in machine and business AP units.

FIG. 49 shows an example of correction of the upper resource usage limit, in terms of machine and business AP units, according to the present embodiment. As shown in FIG. 49, in the present embodiment, the long-term tendency of change is determined as indicated by the "slope" in the diagram, from the variations in the history information, and this is used to correct the upper resource usage limits, for machine and business AP units.

Figure 50:
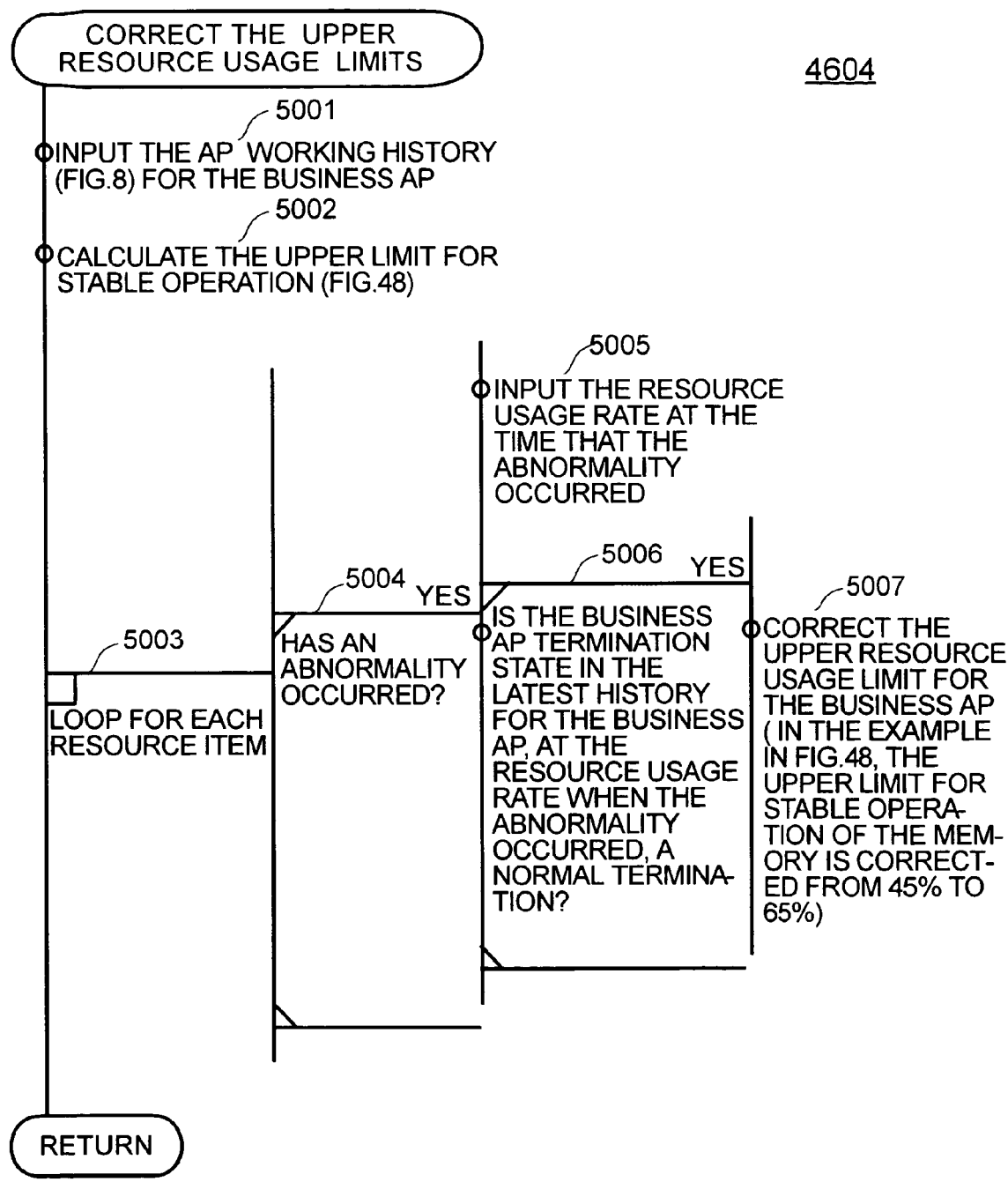
FIG. 50 shows upper resource usage limit correction processing.

FIG. 50 illustrates upper resource usage limit correction processing (4604) according to the present embodiment. At step 5001, the AP working history (FIG. 8) of the business AP in question is inputted; and at step 5002, the upper limit of stable operation is calculated (FIG. 48).

At step 5003, processing to perform loops corresponding to the number of resource items is implemented; and at step 5004, it is investigated whether or not an abnormality has occurred, and if an abnormality has occurred, then the procedure advances to step 5005.

At step 5005, the resource usage rate at the time that the abnormality occurred is inputted; and at step 5006, it is investigated whether or not the business AP termination state in the latest history of the business AP as implemented on the basis of the resource usage rate at the time that the abnormality occurred is a normal termination, and if it is a normal termination, then the procedure advances to step 5007.

At step 5007, the upper limit of the resource usage for the business AP in question is corrected (in the example in FIG. 48, the upper limit for stable operation of the memory is corrected from 45% to 65%).

Figure 51:
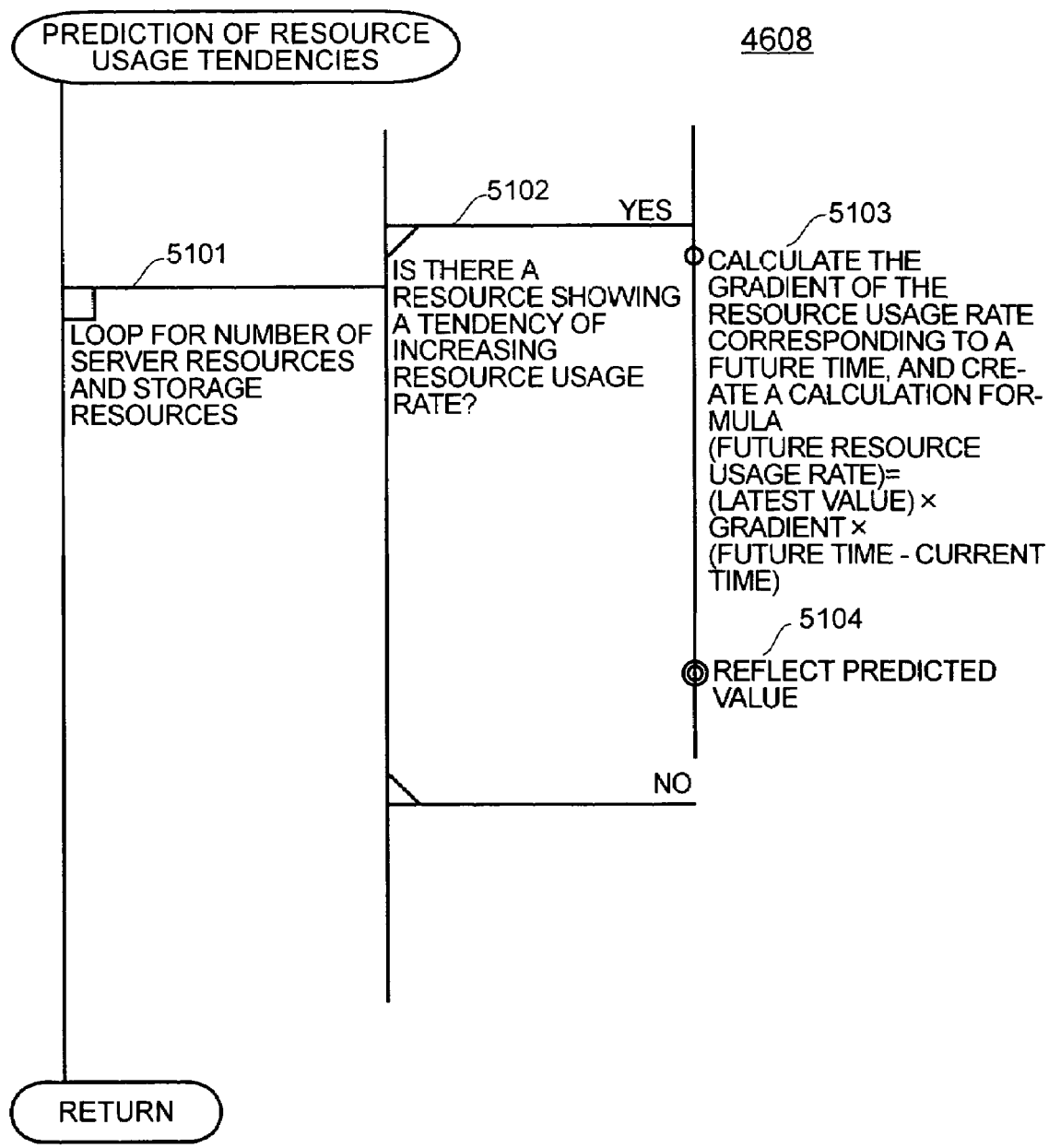
FIG. 51 illustrates resource usage tendency prediction processing.

FIG. 51 illustrates resource usage tendency prediction processing (4608) according to the present embodiment. At step 5101, processing for performing a loop for each of the server resources and storage resources is implemented; and at step 5102, it is investigated whether or not there is a resource having a resource usage rate showing a tendency to increase, and if there in such a resource, then the procedure advances to step 5103.

At step 5103, the gradient of the resource usage rate with respect to a future time is calculated, and a calculation formula (future resource usage rate)=(latest value)×gradient×(future time−current time) is created; and at step 5104, processing for reflecting the predicted value is implemented.

Figure 52:
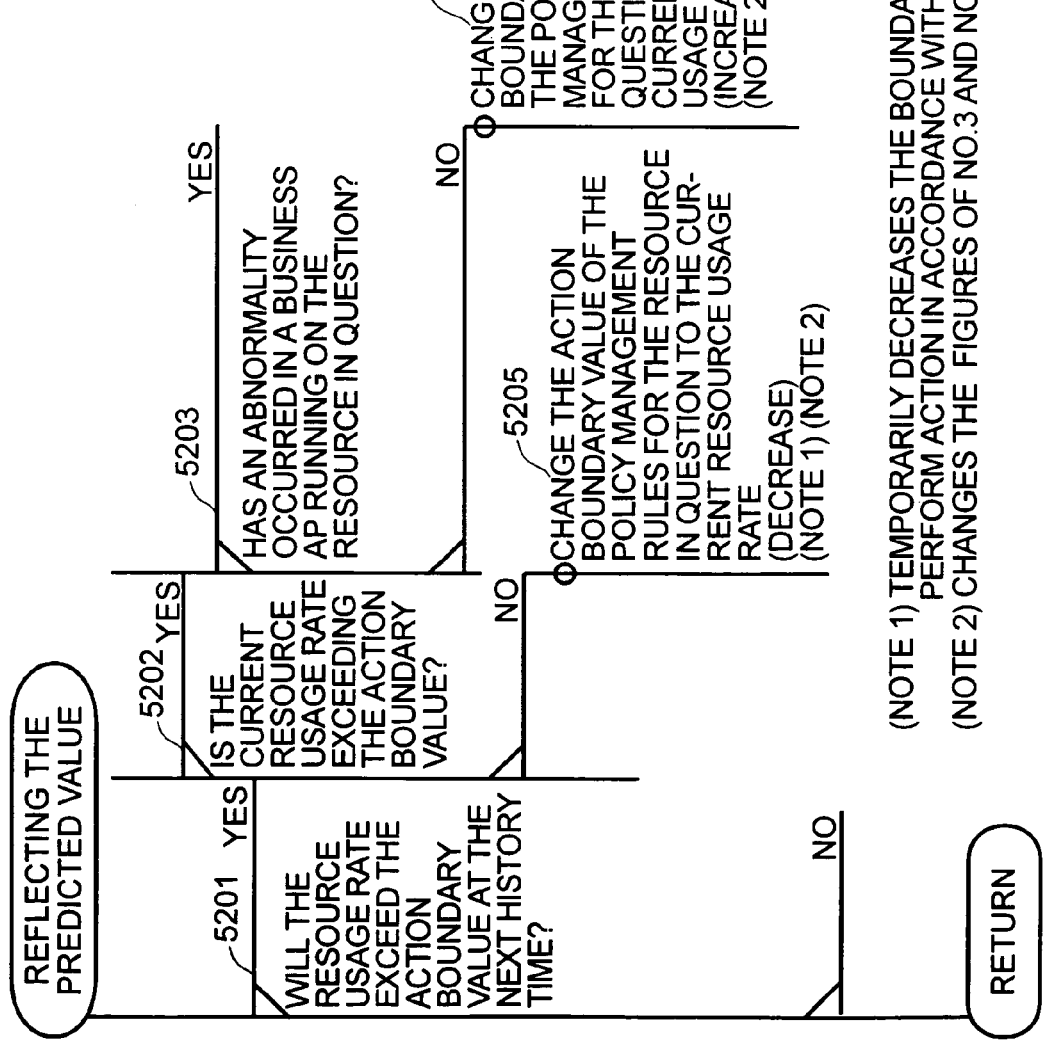
FIG. 52 illustrates predicted value reflection processing.
Figure 53:
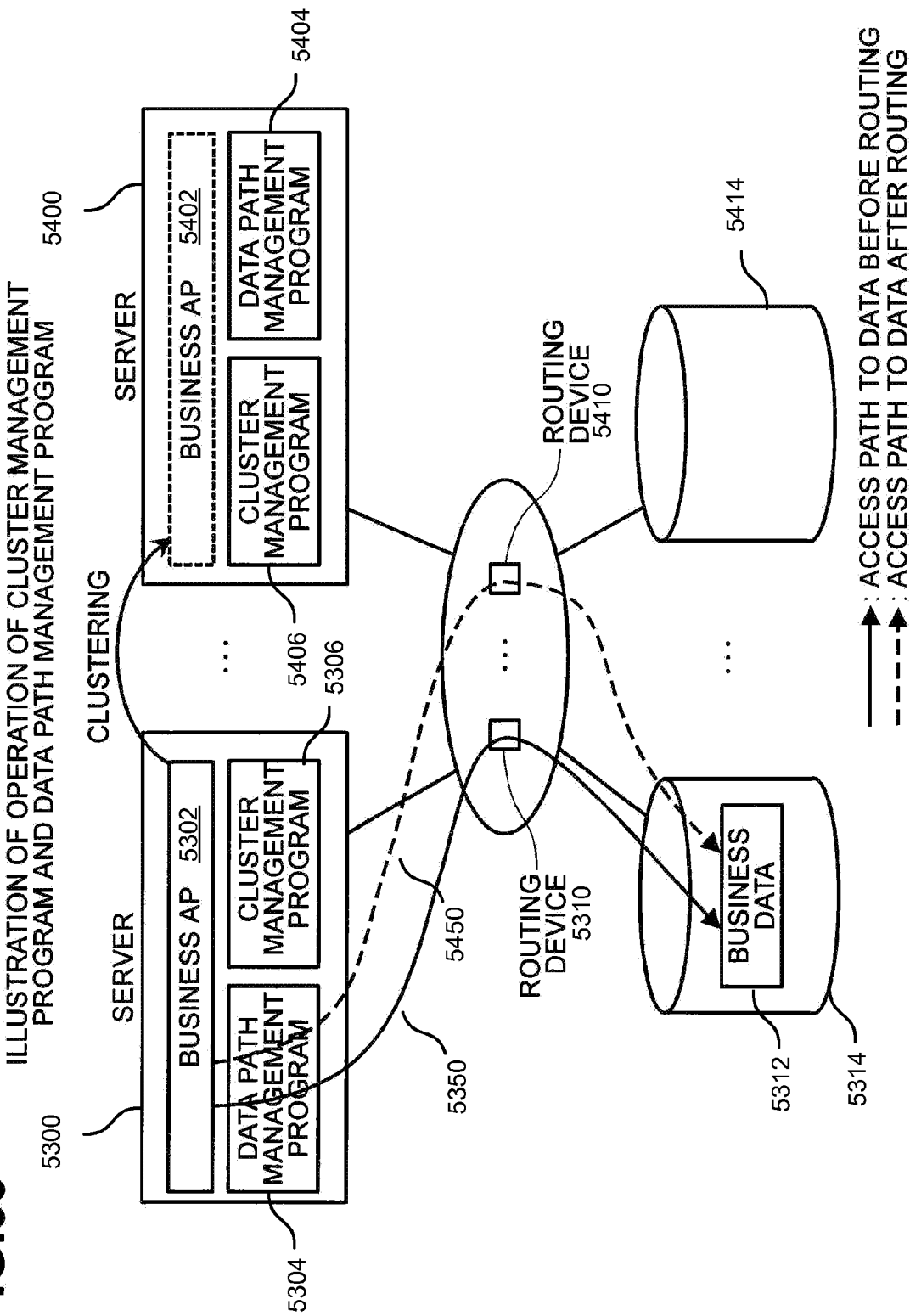
FIG. 53 is a diagram illustrating the operation of the cluster management program and the data path management program.

FIG. 52 illustrates predicted value reflection processing according to the present embodiment. At step 5201, it is investigated whether or not the resource usage rate will exceed the action boundary value at the next history time, and if it will exceed it, then the procedure advances to step 5202.

At step 5202, it is investigated whether or not the current resource usage rate exceeds the action boundary value, and if it does exceed it, then the procedure advances to step 5203, whereas if it does not, then it advances to step 5205.

At step 5203, it is investigated whether or not an abnormality has occurred in the business AP operating on the resource in question, and if an abnormality has not occurred, then the procedure advances to step 5204.

At step 5204, the action boundary value of the policy management rules for the resource in question is changed to the current resource usage rate. Moreover, at step 5205, the action boundary value of the policy management rules for the resource in question is changed to the current resource usage rate. The aforementioned action boundary value is the resource usage rate at which an abnormality occurs, as determined separately from practical experimentation and simulations, and the like.

As described above, according to the program allocation system of the present embodiment, since business application information which associates the composition management information of a business application with the composition management information of a resource is generated, and resources in use are managed in terms of business application units, it is possible to manage resources in accordance with the operating conditions of the respective business applications.

According to the present invention, resources can be managed in accordance with the operating conditions of business applications.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A method for allocating programs to resources suited to operating conditions thereof, comprising:
   generating composition management information for a plurality of resources based on management information relating to performance and capacity of each of the plurality of resources, the composition management information including identification information for the resources used by a plurality of programs;
   searching for and locating the composition management information of a resource identified by said identification information for each of the plurality of programs, based on the composition management information of the plurality of resources;
   generating program information which associates composition management information of each of the plurality of programs with the composition management information of said located resource;
   outputting information indicating that a resource abnormality has occurred with one of the plurality of programs, in cases where the composition management information of the resource which is associated with the program in the program information corresponds to one or more rules for detecting a resource abnormality in the program;
   sending the composition management information of a resource that corresponds to rules for detecting surplus resources, to a public domain system to hold and manage said information as composition management information for a virtual resource within a public domain; and
   if no resource having composition management information satisfying operating conditions of a program can be found, transmitting a request to the public domain system for provision of the resource having composition management information satisfying the operating conditions of said program by referring to the composition management information of said held and managed virtual resources.

2. The method for allocating programs according to claim 1, further comprising:
   receiving a program execution request for one of the plurality of programs;
   instructing reservation of a resource to be used in said program;
   reserving said resource as a resource for executing said program, if the composition management information of the resource associated with the program for which said reservation instruction has been issued satisfies operating conditions in the composition management information of said program; and
   starting up said program using said reserved resource.

3. The method for allocating programs according to claim 2, further comprising:
   if a resource abnormality is detected in a resource involved in execution of the program, searching for and locating another resource having composition management information satisfying the operating conditions in the composition management information of the program which occasioned a resource abnormality; and
   continuing processing of said program using said located resource.

4. The method for allocating programs according to claim 1, wherein the resources include servers and storages, and further comprising managing composition and status of data paths between the servers and storages, and instructions for changing the data paths.

5. The method for allocating a program according to claim 1, wherein policy management rules, including the rules for detecting resource abnormalities in a program and the rules for detecting surplus resources, are managed universally.

6. A system for allocating programs to resources suited to operating conditions thereof, comprising:
   a storage medium having stored thereon;
      a performance and capacity management processing module configured to gather and manage management information relating to performance and capacity of each of a plurality of resources;
      a composition management processing module configured to hold and manage composition management information for the plurality of resources by referring to said gathered management information and, by referring to the composition management information including identification information for the resources used by the programs and searching for and locating the composition management information of the resource identified by the identification information from the composition management information of the resources, to generate program information that associates the composition management information of said program with the composition management information of said located resource, and if the composition management information of the resource in said program information corresponds to rules for detecting a resource abnormality in the relevant program, to output information indicating that the resource abnormality has occurred with the program,
      an execution management processing module configured to receive a program execution request, instruct reservation of a resource to be used by said program, and start up said program using the resource that is reserved by said reservation; and
      a space scheduler configured to reserve said resource as a resource for executing said program, if the composition management information of the resource associated with the program for which said reservation instruction has been issued satisfies operating conditions in the composition management information of said program, wherein, if a resource abnormality has been detected in a resource engaged in the execution of the program, the space scheduler is configured to search for and locate another resource having composition management information satisfying the operating conditions in the composition management information of the program which has occasioned said resource abnormality, and Processing of said program is continued using the located resource.

7. The system for allocating programs according to claim 6, further comprising:
a public domain side composition management processing module configured to receive, when the composition management information of a resource corresponds to rules for detecting surplus resources, the composition management information of said resource and to hold and manage said composition management information as composition management information for a virtual resource within a public domain.

8. The system for allocating programs according to claim 7, further comprising:
a public domain side space scheduler configured to receive a request for provision of the resource transmitted from the space scheduler, when no resource having composition management information satisfying the operating conditions of a program can be found, and to transmit composition management information satisfying the operating conditions of said program from among the composition management information of said held and managed virtual resources.

9. The system for allocating programs according to claim 6, wherein the resources include servers and storages, and further comprising a data path management processing module configured to manage composition and status of data paths between the servers and storages, and instructions for changing the data paths.

10. In a computer storage medium storing a program for allocating programs to resources suited to operating conditions thereof, the program comprising:
code for gathering and managing management information relating to performance and capacity of each of a plurality of resources;
code for holding and managing composition management information for the plurality of resources by referring to said gathered management information and, by referring to the composition management information including identification information for the resources used by the programs and searching for and locating the composition management information of the resource identified by the identification information from the composition management information of the resources, generating program information that associates the composition management information of said program with the composition management information of said located resource, and if the composition management information of the resource in said program information corresponds to rules for detecting a resource abnormality in the relevant program, outputting information indicating that the resource abnormality has occurred with the program;
code for receiving a program execution request instructing reservation of a resource to be used by said program, and starting up said program using the resource that is reserved by said reservation;
code for reserving said resource as a resource for executing said program, if the composition management information of the resource associated with the program for which said reservation instruction has been issued satisfies operating conditions in the composition management information of said program; and
code for, if a resource abnormality has been detected in a resource engaged in the execution of the program, searching for and locating another resource having composition management information satisfying the operating conditions in the composition management information of the program which has occasioned said resource abnormality, and processing of said program is continued using the located resource.

11. The program of claim 10, wherein the resources include servers and storages, and further comprising code for managing composition and status of data paths between the servers and storages, and instructions for changing the data paths.

12. A method for allocating programs to resources suited to operating conditions thereof, the resources each including composition management information relating to performance and capacity thereof, the programs including composition management information, the method comprising:
generating the composition management information for a plurality of resources based on management information relating to performance and capacity of each of the plurality of resources, the composition management information including identification information for the resources used by a plurality of programs and operating conditions;
receiving the composition management information of a resource that corresponds to rules for detecting surplus resources, into a public domain system to hold and manage said information as composition management information for a virtual resource within a public domain; and
if no resource having composition management information satisfying the operating conditions of a program can be found, receiving a request into the public domain system and providing the resource having composition management information satisfying the operating conditions of said program by referring to the composition management information of said held and managed virtual resources.

13. The method according to claim 12, wherein a resource abnormality is detected in a resource involved in execution of the program for which no resource having composition management information satisfying the operating conditions thereof can be found, the resource abnormality being detected where the composition management information of the resource which is associated with the program corresponds to one or more rules for detecting a resource abnormality in the program.

14. The method according to claim 13, wherein policy management rules, including the rules for detecting resource abnormalities in a program and the rules for detecting surplus resources, are managed universally.

15. A system for allocating programs to resources suited to operating conditions thereof, the resources each including composition management information relating to performance and capacity thereof, the programs including composition management information, the system comprising:
a public domain side server configured to receive the composition management information, the composition management information being generated for a plurality of resources based on management information relating to performance and capacity of each of the plurality of resources, the composition management information including identification information for the resources used by a plurality of programs and operating condition;

a storage medium in the public domain side server having stored thereon:
- a public domain side composition management processing module configured to receive, when the composition management information of a resource corresponds to rules for detecting surplus resources, the composition management information of said resource and to hold and manage said composition management information as composition management information for a virtual resource within a public domain; and
- a public domain side space scheduler configured to receive a request for provision of the resource transmitted from a private domain side space scheduler when no resource having composition management information satisfying the operating conditions of a program can be found, and to transmit to the private domain side space scheduler the virtual resource whose composition management information satisfies the operating conditions of said program from among the composition management information of said held and managed virtual resources.

16. The system according to claim 15, further comprising a composition management processing module configured to hold and manage composition management information for the plurality of resources and, by referring to the composition management information including identification information for the resources used by the programs and searching for and locating the composition management information of the resource identified by the identification information from the composition management information of the resources, to generate program information that associates the composition management information of said program with the composition management information of said located resource, and if the composition management information of the resource in said program information corresponds to rules for detecting a resource abnormality in the relevant program, to output information indicating that the resource abnormality has occurred with the program.

17. In a computer storage medium storing a program for allocating programs to resources suited to operating conditions thereof, the resources each including composition management information relating to performance and capacity thereof, the programs including composition management information, the program comprising:
- code for receiving the composition management information of a resource that corresponds to rules for detecting surplus resources, into a public domain system to hold and manage said information as composition management information for a virtual resource within a public domain, the composition management information being generated for a plurality of resources based on management information relating to performance and capacity of each of the plurality of resources, the composition management information including identification information for the resources used by a plurality of programs and operating conditions; and
- code for, if no resource having composition management information satisfying the operating conditions of a program can be found, receiving a request into the public domain system and providing the resource having composition management information satisfying the operating conditions of said program by referring to the composition management information of said held and managed virtual resources.

18. The program of claim 17, further comprising code for universally managing policy management rules including the rules for detecting surplus resources.

19. A system for allocating programs to resources suited to operating conditions thereof, comprising:
- at least one storage medium having stored thereon:
  - a private domain side performance and capacity management processing module configured to gather and manage management information relating to performance and capacity of each of a plurality of resources; and
  - a private domain side composition management processing module configured to hold and manage composition management information for the plurality of resources by referring to said gathered management information;
  - a private domain side execution management processing module configured to receive a program execution request, instruct reservation of a resource to be used by said program, and start up said program using the resource that is reserved by said reservation;
  - a private domain side space scheduler configured to reserve said resource as a resource for executing said program, if the composition management information of the resource associated with the program for which said reservation instruction has been issued satisfies operating conditions in the composition management information of said program;
  - a public domain side composition management processing module configured to detect a surplus resource, and to hold and manage composition management information of the surplus resource as composition management information for a virtual resource within a public domain; and
  - a public domain side space scheduler configured to receive a request for provision of the resource transmitted from the private domain side space scheduler for a program and to transmit composition management information satisfying operating conditions of said program from among the composition management information of said held and managed virtual resources.

20. The method of claim 19 wherein the private domain side composition management processing module is configured, by referring to the composition management information, to detect a resource abnormality in a program and to output information indicating that the resource abnormality has occurred with the program; and wherein, if a resource abnormality has been detected in a resource engaged in the execution of the program, the space scheduler is configured to search for and locate another resource having composition management information satisfying the operating conditions in the composition management information of the program which has occasioned said resource abnormality, and processing of said program is continued using the located resource.

* * * * *